US010351771B2

(12) United States Patent
Goebel et al.

(10) Patent No.: US 10,351,771 B2
(45) Date of Patent: Jul. 16, 2019

(54) LIQUID-CRYSTALLINE MEDIUM

(71) Applicant: Merck Patent GmbH, Darmstadt (DE)

(72) Inventors: Mark Goebel, Darmstadt (DE); Lars Lietzau, Rossdorf (DE); Sabine Schoen, Herten (DE); Andreas Pohle, Pfungstadt (DE)

(73) Assignee: Merck Patent GmbH, Darmstadt (DE)

( * ) Notice: Subject to any disclaimer, the term of this patent is extended or adjusted under 35 U.S.C. 154(b) by 307 days.

(21) Appl. No.: 14/458,312

(22) Filed: Aug. 13, 2014

(65) Prior Publication Data
US 2015/0048276 A1 Feb. 19, 2015

(30) Foreign Application Priority Data

Aug. 16, 2013 (DE) .................. 10 2013 013 500

(51) Int. Cl.
| | | |
|---|---|---|
| G02F 1/1333 | (2006.01) | |
| C09K 19/04 | (2006.01) | |
| C09K 19/14 | (2006.01) | |
| C09K 19/20 | (2006.01) | |
| C09K 19/30 | (2006.01) | |
| C09K 19/44 | (2006.01) | |
| C09K 19/12 | (2006.01) | |
| C09K 19/34 | (2006.01) | |

(52) U.S. Cl.
CPC .......... C09K 19/0403 (2013.01); C09K 19/14 (2013.01); C09K 19/20 (2013.01); C09K 19/3003 (2013.01); C09K 19/3068 (2013.01); C09K 19/44 (2013.01); C09K 2019/0407 (2013.01); C09K 2019/0414 (2013.01); C09K 2019/0448 (2013.01); C09K 2019/0466 (2013.01); C09K 2019/122 (2013.01); C09K 2019/123 (2013.01); C09K 2019/301 (2013.01); C09K 2019/3004 (2013.01); C09K 2019/3016 (2013.01); C09K 2019/3083 (2013.01); C09K 2019/3422 (2013.01)

(58) Field of Classification Search
CPC .... C09K 19/0403; C09K 19/14; C09K 19/20; C09K 19/3003; C09K 19/3068; C09K 19/44; C09K 2019/0448; C09K 2019/0466; C09K 2019/122; C09K 2019/123; C09K 2019/3004; C09K 2019/301; C09K 2019/3016; C09K 2019/3083; C09K 2019/3422; C09K 2019/0407; C09K 2019/0414; G02F 1/1333
USPC .................................................. 252/299.61
See application file for complete search history.

(56) References Cited

U.S. PATENT DOCUMENTS

| | | | |
|---|---|---|---|
| 5,993,692 A * | 11/1999 | Tarumi ............... | C09K 19/3003 252/299.63 |
| 6,399,164 B1 | 6/2002 | Yanai | |
| 7,704,409 B2 | 4/2010 | Haseba et al. | |
| 7,838,090 B2 * | 11/2010 | Wittek ................... | C09K 19/42 252/299.61 |
| 7,989,035 B2 | 8/2011 | Klasen-Memmer | |
| 8,075,960 B2 | 12/2011 | Fujita et al. | |
| 8,147,929 B2 | 4/2012 | Saito | |
| 8,277,907 B2 | 10/2012 | Klasen-Memmer | |
| 8,632,696 B2 | 1/2014 | Saito | |
| 8,632,861 B2 | 1/2014 | Saito | |
| 9,701,903 B2 | 7/2017 | Klasen-Memmer | |
| 2002/0066887 A1 | 6/2002 | Yanai et al. | |
| 2008/0308768 A1 | 12/2008 | Klasen-Memmer | |
| 2009/0065739 A1 | 3/2009 | Haseba et al. | |
| 2009/0194739 A1 | 8/2009 | Wittek et al. | |
| 2010/0294992 A1 | 11/2010 | Fujita et al. | |
| 2010/0294993 A1 | 11/2010 | Fujita et al. | |
| 2010/0302498 A1 | 12/2010 | Saito | |
| 2011/0096285 A1 | 4/2011 | Saito | |
| 2011/0253937 A1 | 10/2011 | Klasen-Memmer | |
| 2011/0253938 A1 | 10/2011 | Klasen-Memmer | |
| 2011/0278502 A1 | 11/2011 | Klasen-Memmer | |
| 2012/0145961 A1 | 6/2012 | Saito | |
| 2012/0248374 A1 | 10/2012 | Klasen-Memmer | |
| 2013/0335693 A1 | 12/2013 | Klasen-Memmer | |
| 2015/0284636 A1 * | 10/2015 | Czanta ................... | C09K 19/04 252/299.61 |

FOREIGN PATENT DOCUMENTS

| | | |
|---|---|---|
| CN | 101508896 A | 8/2009 |
| CN | 101864318 A | 10/2010 |
| EP | 1122292 B1 | 6/2003 |
| EP | 2028252 A1 | 2/2009 |
| EP | 2256178 A1 | 12/2010 |
| JP | 2009185285 A | 8/2009 |
| JP | 2010275390 A | 12/2010 |

(Continued)

OTHER PUBLICATIONS

European Search Report for European Patent Application No. EP14002547 dated Jan. 21, 2015.

(Continued)

Primary Examiner — Geraldina Visconti
(74) Attorney, Agent, or Firm — Millen White Zelano and Branigan, PC; John Sopp

(57) ABSTRACT

The invention relates to a liquid-crystalline medium comprising at least one compound of the formula I,

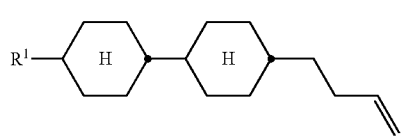

in which $R^1$ has the meanings indicated in Claim 1, and to the use thereof in liquid-crystalline media and in electro-optical liquid-crystal displays.

24 Claims, No Drawings

(56) References Cited

FOREIGN PATENT DOCUMENTS

| JP | 2011024664 A1 | 1/2013 |
| WO | 2006002952 A1 | 1/2006 |
| WO | 2011/024664 A1 | 3/2011 |
| WO | 2011024664 A1 | 3/2011 |

OTHER PUBLICATIONS

Chinese Search Report for China Patent Application No. 201410401181.9 dated Sep. 28, 2017.
Taiwan Search Report dated Feb. 2, 2018 issued in corresponding TW 103128186 application (1 page).
Search Report in corresponding JP Patent Application No. 2014-165440 dated Jul. 30, 2018. (pp. 1-9).
English version of Office Action/Search Report in corresponding JP Patent Application No. 2014-165440 dated Apr. 9, 2019. (pp. 1-5).

* cited by examiner

LIQUID-CRYSTALLINE MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a "twisted nematic" structure, STN ("super-twisted nematic") cells, SBE ("superbirefringence effect") cells and OMI ("optical mode interference") cells. The commonest display devices are based on the Schadt-Helfrich effect and have a twisted nematic structure. In addition, there are also cells which work with an electric field parallel to the substrate and liquid-crystal plane, such as, for example, IPS ("in-plane switching") cells. TN, STN, FFS (fringe field switching) and IPS cells, in particular, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKI-GUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

For TV and video applications, displays having fast response times are required in order to be able to reproduce multimedia content, such as, for example, films and video games, in near-realistic quality. Such short response times can be achieved, in particular, if liquid-crystal media having low values for the viscosity, in particular the rotational viscosity $Y_1$, and having high optical anisotropy (Δn) are used.

In order to achieve 3D effects by means of shutter spectacles, use is made of, in particular, fast-switching mixtures having low rotational viscosities and correspondingly high optical anisotropy (Δn). Electro-optical lens systems by means of which a 2-dimensional representation of a display can be converted into a 3-dimensional autostereoscopic representation can be achieved using mixtures having high optical anisotropy (Δn).

Thus, there continues to be a great demand for MLC displays having very high specific resistance at the same time as a large working-temperature range, short response times, even at low temperatures, and a low threshold voltage which do not exhibit these disadvantages or only do so to a reduced extent.

In the case of TN (Schadt-Helfrich) cells, media are desired which facilitate the following advantages in the cells:
- extended nematic phase range (in particular down to low temperatures)
- the ability to switch at extremely low temperatures (outdoor use, automobiles, avionics)
- increased resistance to UV radiation (longer lifetime)
- low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

One of the most important properties of modern LCDs is correct reproduction of moving images. If the response speed of the liquid-crystalline medium used is too slow, this causes undesired artefacts in the display of such content. The physical parameters which essentially determine the response time of a liquid-crystal mixture are the rotational viscosity $γ_1$ and the elastic constants. The latter are also particularly important for ensuring a good black state of the LCD. In general, however, it is observed that the clearing point of the mixture and thus the rotational viscosity of the mixture is also increased with an increase in the elastic constants, meaning that an improvement in the response time is not possible. In particular in the case of LC displays for TV and video applications (for example LCD TVs, monitors, PDAs, notebooks, games consoles), a significant reduction in the response times is desired. A reduction in the layer thickness d ("cell gap") of the LC medium in the LC cell theoretically results in faster response times, but requires LC media having higher birefringence Δn in order to ensure an adequate optical retardation (d·Δn). However, the LC materials of high birefringence known from the prior art generally also have high rotational viscosity at the same time, which in turn has an adverse effect on the response times.

There is therefore a demand for LC media which simultaneously have fast response times, low rotational viscosities and relatively high birefringence.

The invention is based on the object of providing media, in particular for MLC, TN, STN, OCB, positive VA, FFS, PS (=polymer stabilised)-FFS, IPS, PS-IPS displays of this type, which have the desired properties indicated above and do not exhibit the disadvantages indicated above or only do so to a reduced extent. In particular, the LC media should have fast response times and low rotational viscosities at the same time as relatively high birefringence. In addition, the LC media should have a high clearing point, high dielectric anisotropy, a low threshold voltage and very good low-temperature stability (LTS).

It has now been found that this object can be achieved if LC media comprising one or more compounds of the formula I are used.

The invention relates to a liquid-crystalline medium, characterised in that it comprises one or more compounds of the formula I,

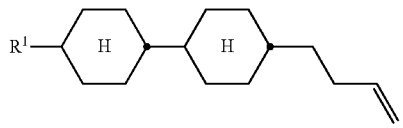

I in which
$R^1$ denotes an alkyl or alkoxy radical having 1 to 15 C atoms, where, in addition, one or more $CH_2$ groups in these radicals may each be replaced, independently of one another, by —C≡C—, —$CF_2$O—, —CH=CH—,

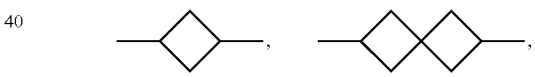

—O—, —CO—O—, —O—CO— in such a way that O atoms are not linked directly to one another, and in which, in addition, one or more H atoms may be replaced by halogen.

The compounds of the formula I result in LC mixtures having the desired properties indicated above, in particular in LC mixtures having very low rotational viscosity. The mixtures according to the invention have very large elastic constants and thus facilitate very good response times. Furthermore, the mixtures according to the invention are stable at at least −20° C. and exhibit no tendency towards crystallisation. The rotational viscosities $γ_1$ are preferably <120 mPa·s. Furthermore, the mixtures according to the invention are distinguished by a very good ratio of rotational viscosity $γ_1$ and clearing point, a high value for the optical anisotropy Δ∈ and high birefringence Δn, as well as fast response times, a low threshold voltage, a high clearing point, a high positive dielectric anisotropy and a broad nematic phase range. Furthermore, the compounds of the formula I are very readily soluble in liquid-crystalline media.

The compounds of the formula I have a broad range of applications and are distinguished, in particular, by their very large elastic constants. Depending on the choice of substituents, they can serve as base materials of which liquid-crystalline media are predominantly composed; however, liquid-crystalline base materials from other classes of compound can also be added to the compounds of the formula I in order, for example, to influence the dielectric and/or optical anisotropy of a dielectric of this type and/or to optimise its threshold voltage and/or its rotational viscosity. The result are LC mixtures according to the invention which support a good black state of the display, which is crucial for the contrast of the display, owing to high elastic constants and at the same time facilitate very good response times.

$R^1$ in the compounds of the formula I and the sub-formulae preferably denotes a straight-chain alkyl radical, in particular having 3-5 C atoms. In a further preferred embodiment, one or more $CH_2$ groups in the alkyl radical may also be replaced by —CH=CH—.

Particularly preferred compounds of the formula I are shown below:

I-1
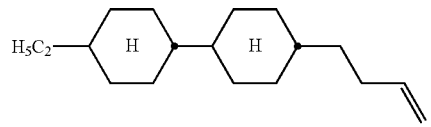

I-2
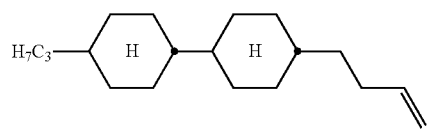

I-3
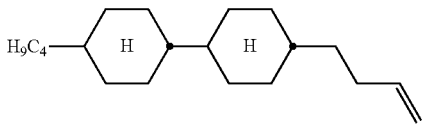

I-4
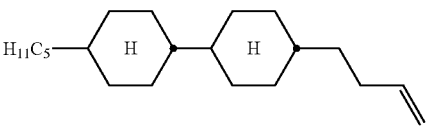

I-5
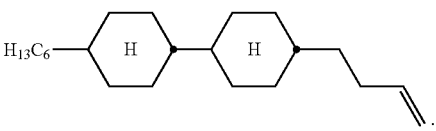

Very particular preference is given to the compound of the formula I-2.

In the pure state, the compounds of the formula I are colourless and form liquid-crystalline mesophases in a temperature range which is favourably located for electro-optical use. They are stable chemically, thermally and to light.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail. The compounds of the formula I can be prepared, for example, as follows:

Scheme 1

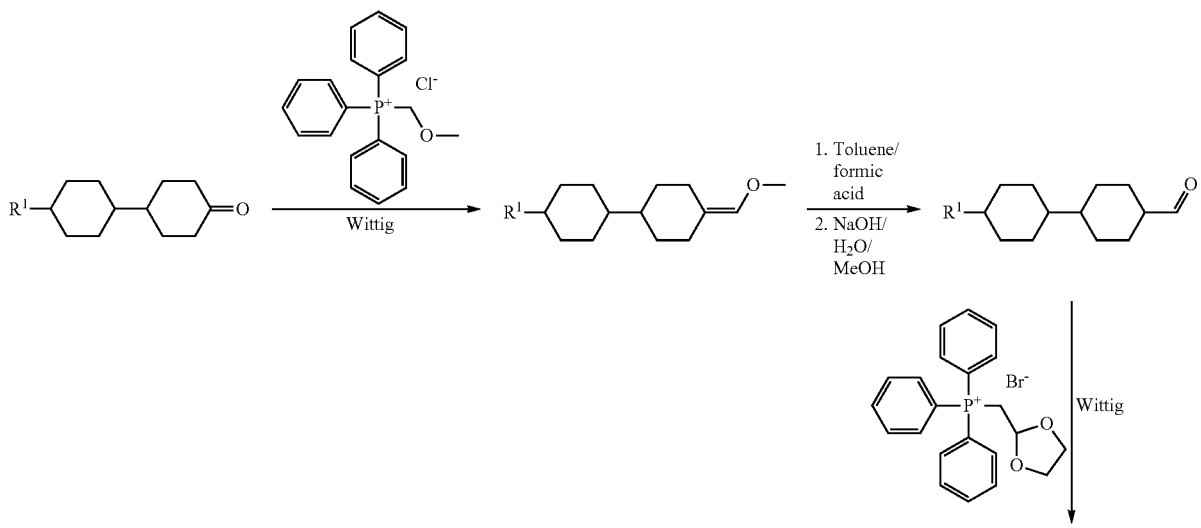

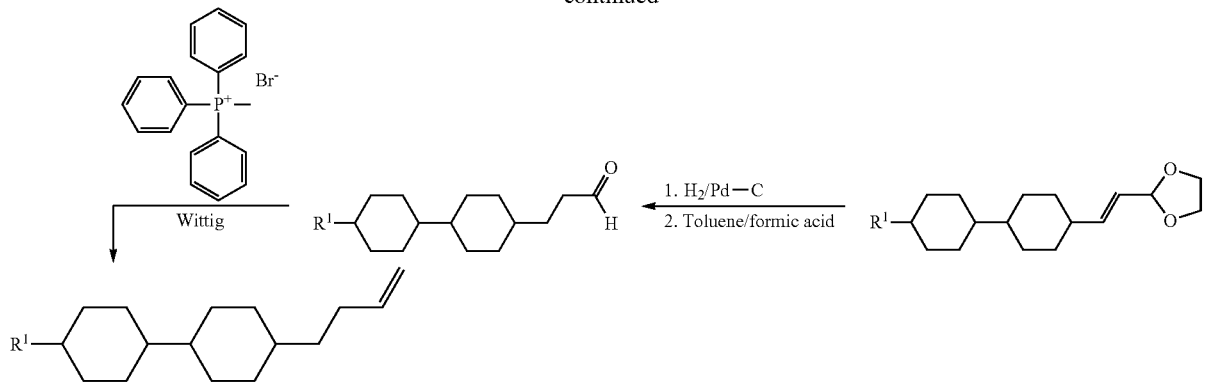

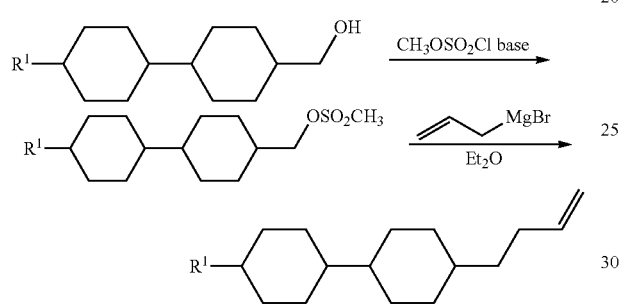

If R¹ in the formulae above and below denotes an alkyl radical and/or an alkoxy radical, this may be straight-chain or branched. It is preferably straight-chain, has 2, 3, 4, 5, 6, or 7 C atoms and accordingly preferably denotes ethyl, propyl, butyl, pentyl, hexyl, heptyl, ethoxy, propoxy, butoxy, pentoxy, hexoxy or heptoxy, furthermore, nonyl, decyl, undecyl, dodecyl, tridecyl, tetradecyl, pentadecyl, methoxy, octoxy, nonoxy, decoxy, undecoxy, dodecoxy, tridecoxy or tetradedoxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxaheptyl, 2-, 3-, 4- or 5-oxahexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl, 2-, 3-, 4-, 5-, 6-, 7-, 8- or 9-oxadexyl.

If R¹ denotes an alkyl radical in which one CH₂ group has been replaced by —CH═CH—, this may be straight-chain or branched. It is preferably straight-chain and has 2 to 10 C atoms. Accordingly, it denotes, in particular, vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl. These radicals may also be mono- or polyhalogenated. Preferred fluorinated radicals are CH═CF₂, CF═CF₂, CF═CHF, CH═CHF.

If R¹ denotes an alkyl or alkenyl radical which is at least monosubstituted by halogen, this radical is preferably straight-chain and halogen is preferably F or Cl. In the case of polysubstitution, halogen is preferably F. The resultant radicals may also include perfluorinated radicals. In the case of monosubstitution, the fluorine or chlorine substituent can be in any desired position, but is preferably in the ω position.

Further preferred embodiments are indicated below:
The medium additionally comprises one or more neutral compounds of the formulae II and/or III,

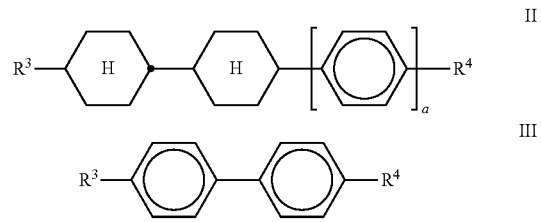

in which
A denotes 1,4-phenylene or trans-1,4-cyclohexylene,
a is 0 or 1,
R³ denotes alkenyl having 2 to 9 C atoms,
and R⁴ has the meaning indicated for R¹ in formula I and preferably denotes alkyl having 1 to 12 C atoms or alkenyl having 2 to 9 C atoms.
The compounds of the formula II are preferably selected from the compounds of the following formulae,

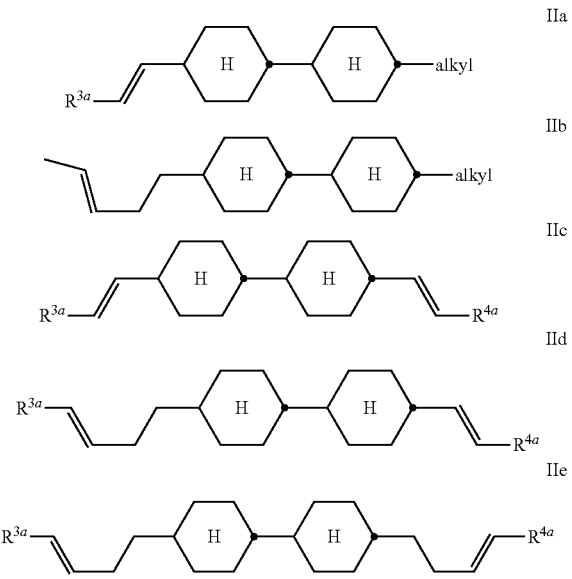

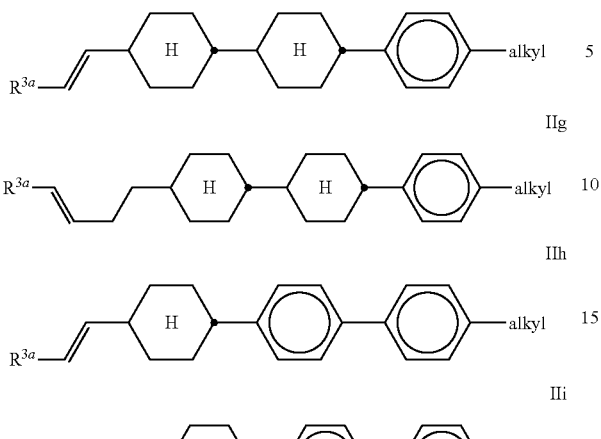

in which $R^{3a}$ and $R^{4a}$ each, independently of one another, denote H, $CH_3$, $C_2H_5$ or $C_3H_7$, and "alkyl" denotes a straight-chain alkyl group having 1 to 8 C atoms. Particular preference is given to compounds of the formulae IIa and IIf, in particular in which $R^{3a}$ denotes H or $CH_3$, and compounds of the formula IIc, in particular in which $R^{3a}$ and $R^{4a}$ denote H, $CH_3$ or $C_2H_5$.

Preference is furthermore given to compounds of the formula II which have a non-terminal double bond in the alkenyl side chain:

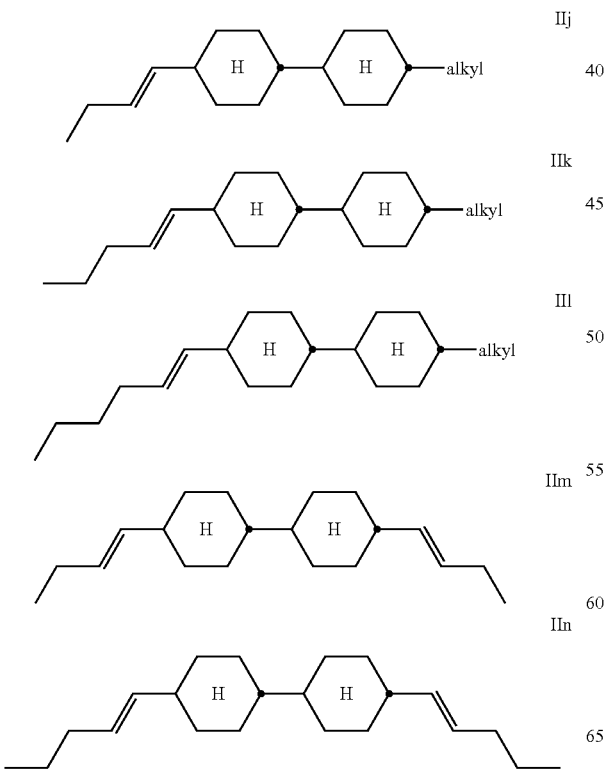

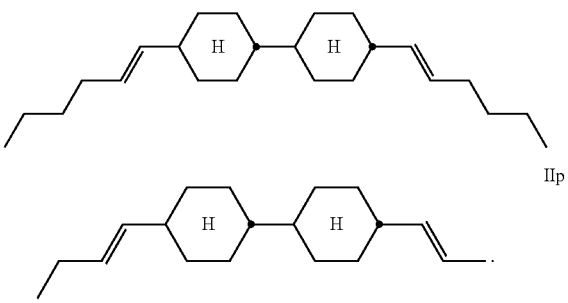

Very particularly preferred compounds of the formula II are the compounds of the formulae

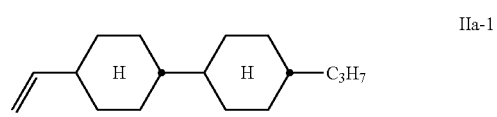

IIa-1

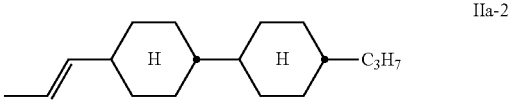

IIa-2

IIa-3

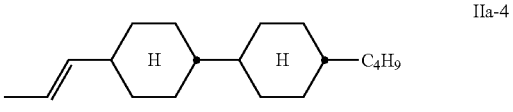

IIa-4

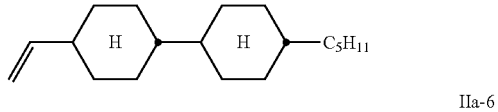

IIa-5

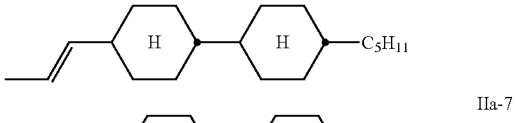

IIa-6

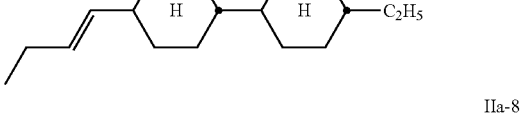

IIa-7

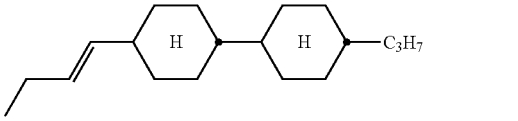

IIa-8

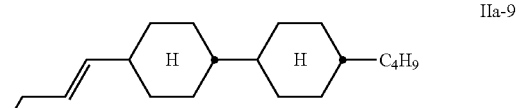

IIa-9

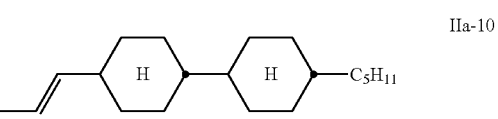

IIa-10

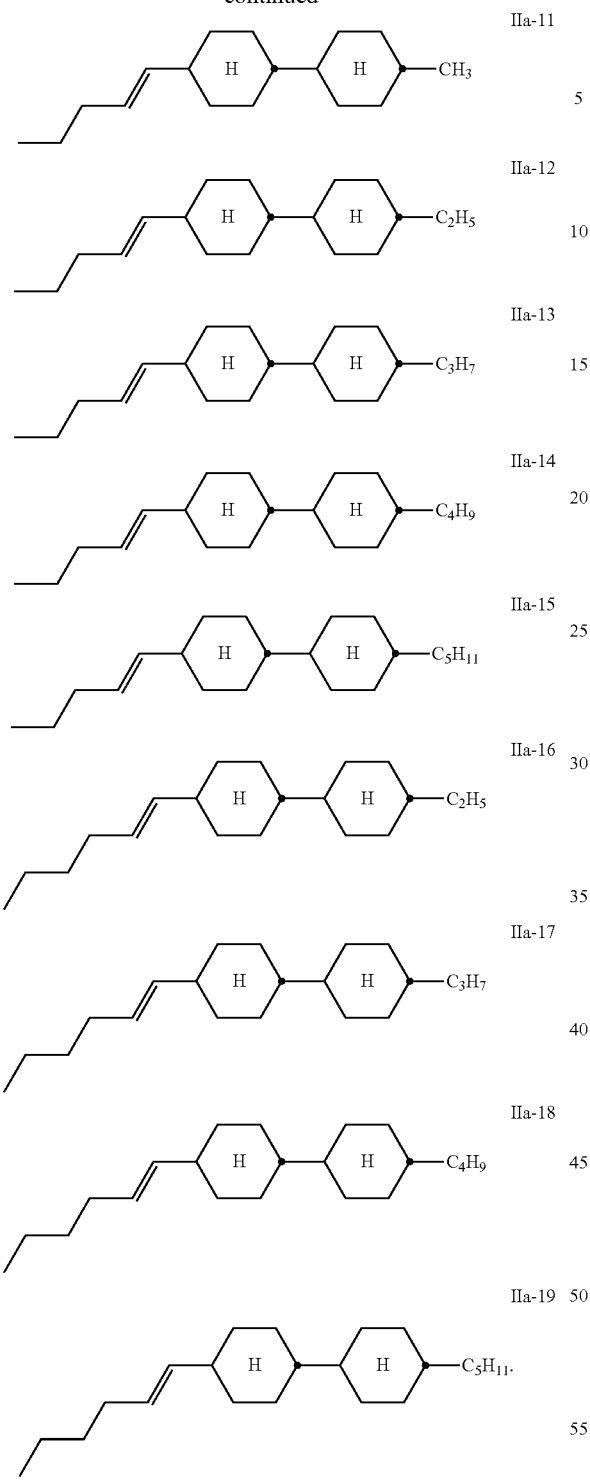

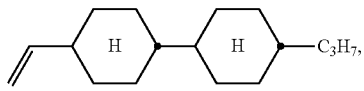

preferably in concentrations of 5-70% by weight, in particular 10-50% by weight and very particularly preferably 20-45% by weight, based on the mixture.

Preferred compounds of the formula IIb are the compounds of the formulae

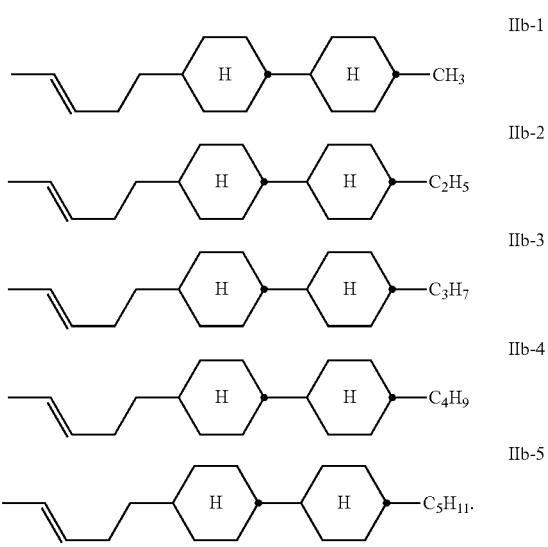

Preferred compounds of the formula IIc are the compounds of the formulae

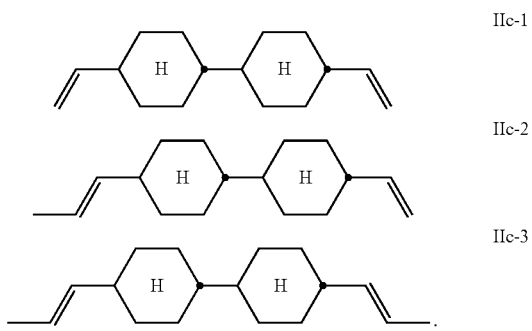

The compounds of the formula III are preferably selected from the following formulae,

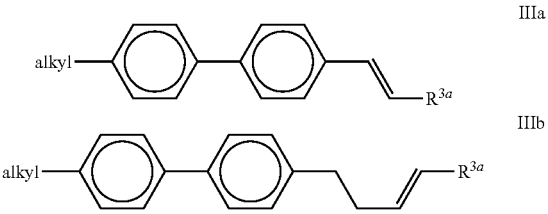

Of the compounds of the formulae IIa-1 to IIa-19, particular preference is given, in particular, to the compounds of the formulae IIa-1, IIa-2, IIa-3 and IIa-5.

Besides one or more compounds of the formula I, the liquid-crystalline media according to the invention particularly preferably additionally comprise the compound of the formula (CC-3-V), in which "alkyl" and $R^{3a}$ have the meanings indicated above, and $R^{3a}$ preferably denotes H or $CH_3$. Particular preference is given to compounds of the formula IIIb;

Very particular preference is given to the compound of the formula IIIb-1,

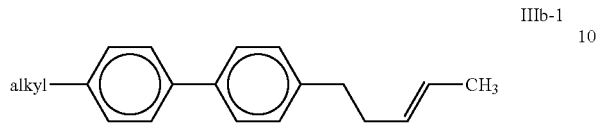

IIIb-1 in which "alkyl" has the meaning indicated above and preferably denotes $CH_3$, furthermore $C_2H_5$ or n-$C_3H_7$.

The medium preferably additionally comprises one or more compounds selected from the following formulae IV to VIII,

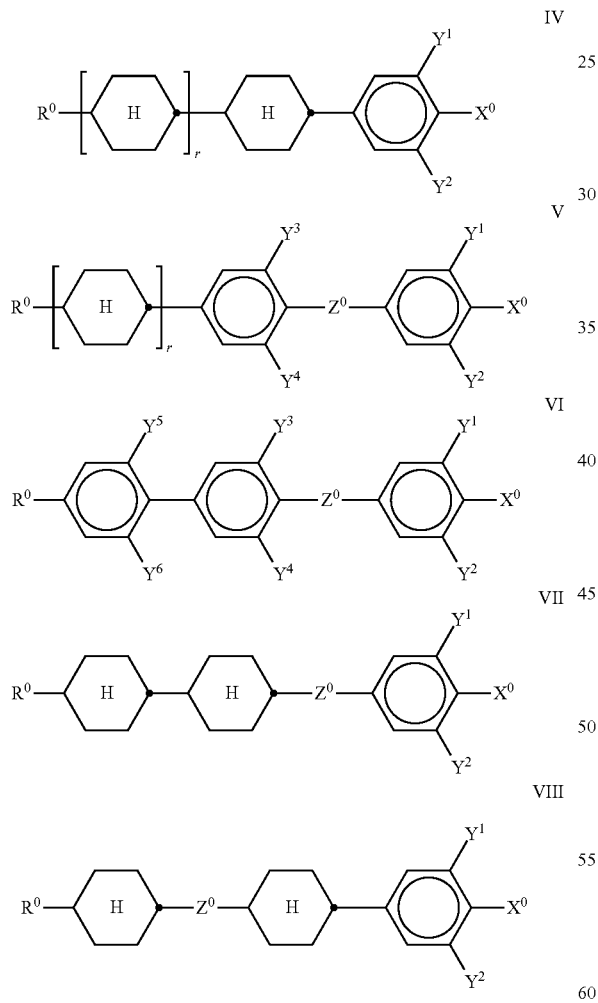

in which
$R^0$ denotes an alkyl or alkoxy radical having 1 to 15 C atoms, where, in addition, one or more $CH_2$ groups in these radicals may each be replaced, independently of one another, by —C≡C—, —$CF_2$O—, —CH=CH—,

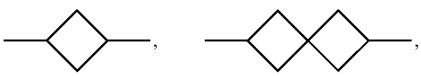

—O—, —CO—O— or —O—CO— in such a way that O atoms are not linked directly to one another, and in which, in addition, one or more H atoms may be replaced by halogen, $X^0$ denotes F, Cl, a mono- or polyfluorinated alkyl or alkoxy radical, in each case having 1 to 6 C atoms, a mono- or polyfluorinated alkenyl or alkenyloxy radical, in each case having 2 to 6 C atoms.

$Y^{1-6}$ each, independently of one another, denote H or F, $Z^0$ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO—, —$CF_2O$— or —$OCF_2$—, and in the formulae V and VI also a single bond, and r denotes 0 or 1.

In the above formulae, $X^0$ is preferably F, Cl or a mono- or polyfluorinated alkyl or alkoxy radical having 1, 2 or 3 C atoms or a mono- or polyfluorinated alkenyl radical or alkenyloxy radical having 2 or 3 C atoms. $X^0$ is particularly preferably F, Cl, $CF_3$, $CHF_2$, $OCF_3$, $OCHF_2$, $OCHFCF_3$, $OCHFCHF_2$, $OCHFCH_2F$, $OCF_2CH_3$, $OCF_2CHF_2$, $OCF_2CH_2F$, $OCF_2CF_2CHF_2$, $OCF_2CF_2CH_2F$, $OCFHCF_2CF_3$, $OCFHCF_2CHF_2$, $OCH=CF_2$, $OCF=CF_2$, $OCF_2CHFCF_3$, $OCF_2CF_2CF_3$, $OCF_2CF_2CClF_2$, $OCClFCF_2CF_3$, $CF=CF_2$, CF=CHF, $OCH=CF_2$, $OCF=CF_2$, or $CH=CF_2$.

In the compounds of the formulae IV to VIII, $X^0$ preferably denotes F or $OCF_3$, furthermore $OCHF_2$, $CF_3$, $CF_2H$, Cl, $OCH=CF_2$. $R^0$ is preferably straight-chain alkyl or alkenyl having up to 6 C atoms.

The compounds of the formula IV are preferably selected from the following formulae,

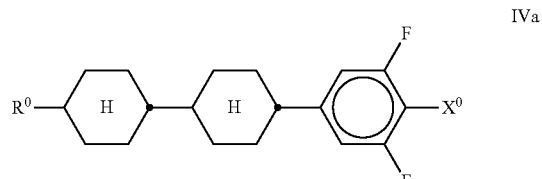

IVa

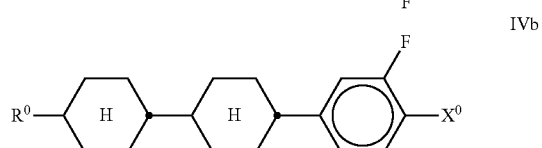

IVb

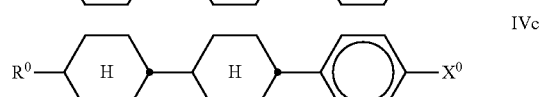

IVc

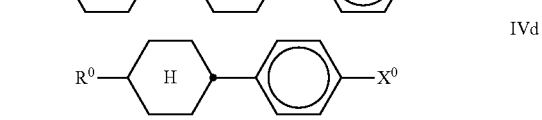

IVd

IVe

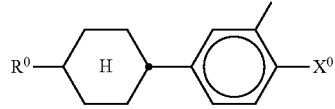

IVf
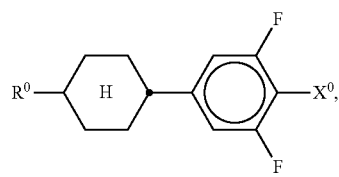

in which R⁰ and X⁰ have the meanings indicated above.

Preferably, R⁰ in formula IV denotes alkyl having 1 to 8 C atoms and X⁰ denotes F, Cl, OCHF$_2$ or OCF$_3$, furthermore OCH=CF$_2$. In the compound of the formula IVb, R⁰ preferably denotes alkyl or alkenyl.

In the compound of the formula IVd, X⁰ preferably denotes Cl, furthermore F.

The compounds of the formula V are preferably selected from the formulae Va to Vj, Va
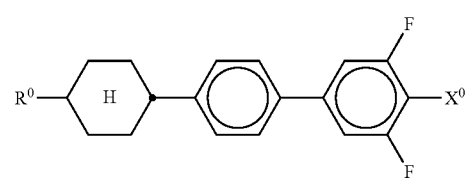

Vb
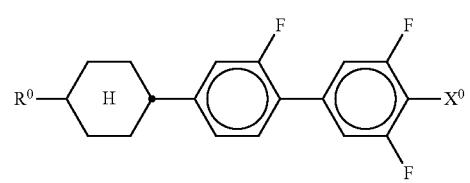

Vc
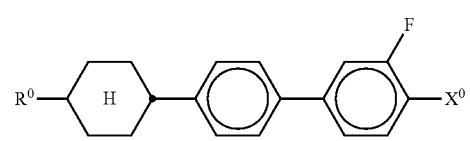

Vd
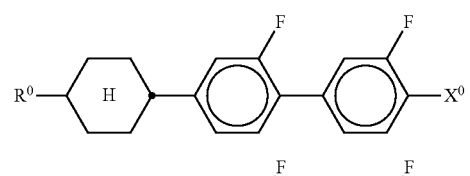

Ve
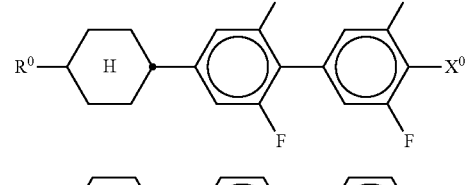

Vf
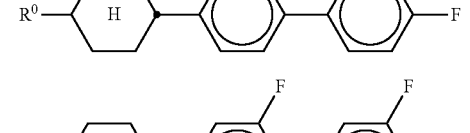

Vg
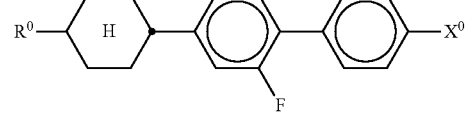

Vh
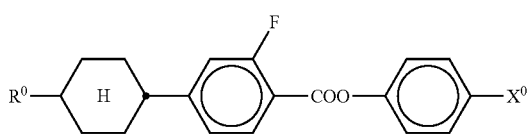

Vi
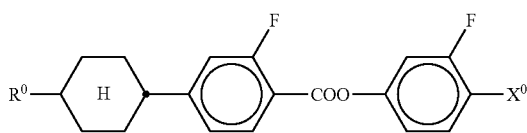

Vj
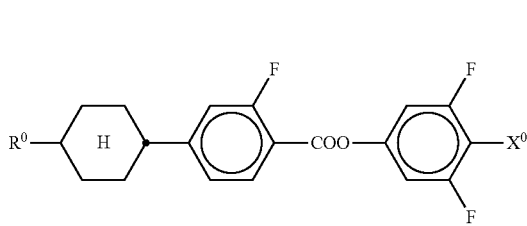

in which R⁰ and X⁰ have the meanings indicated above. Preferably, R⁰ in formula V denotes alkyl having 1 to 8 C atoms and X⁰ denotes F, OCF$_3$ or OCH=CF$_2$.

The medium comprises one or more compounds of the formula VI-1,

VI-1
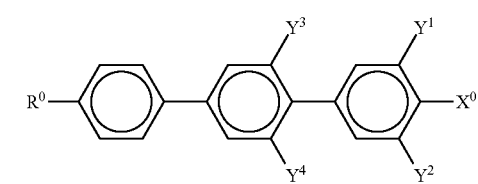

particularly preferably those selected from the following formulae:

VI-1a
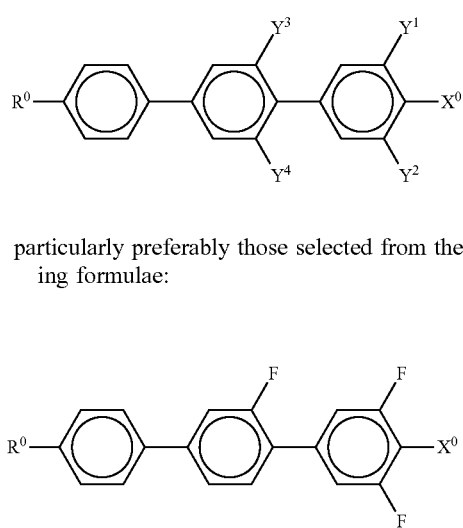

VI-1b
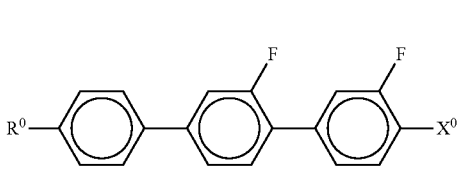

VI-1c
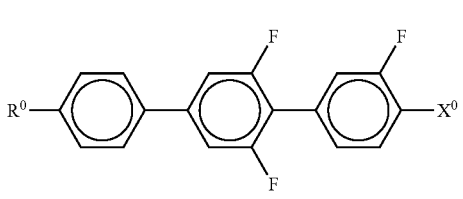

VI-1d

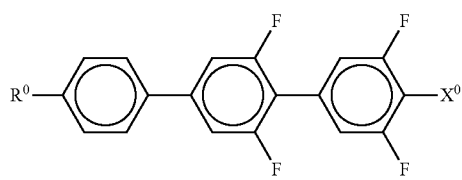

in which R⁰ and X⁰ have the meanings indicated above. Preferably, R⁰ in formula VI denotes alkyl having 1 to 8 C atoms and X⁰ denotes F, furthermore CF$_3$ and OCF$_3$.

The medium comprises one or more compounds of the formula VI-2,

VI-2

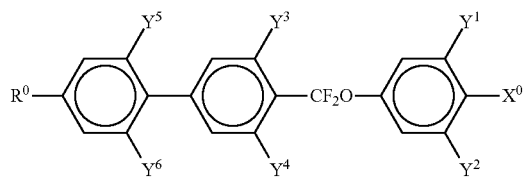

particularly preferably those selected from the following formulae,

VI-2a

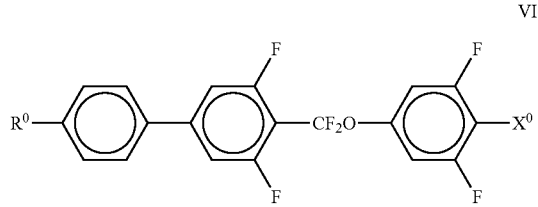

VI-2b

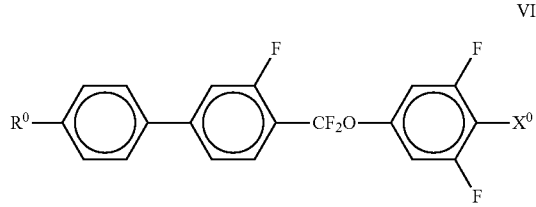

VI-2c

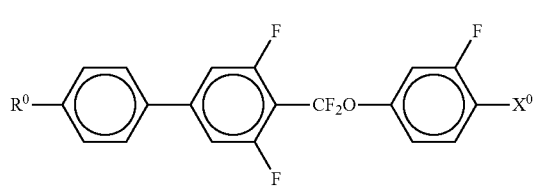

VI-2d

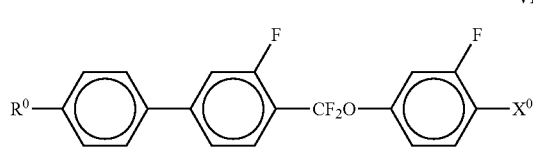

VI-2e

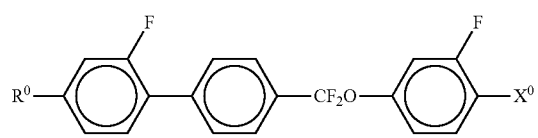

VI-2f

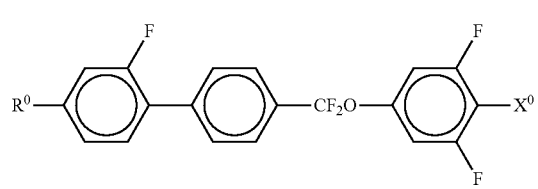

VI-2g

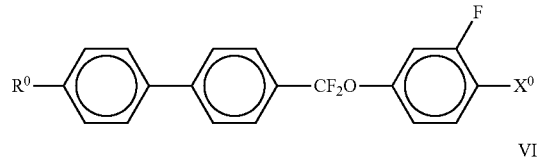

VI-2h

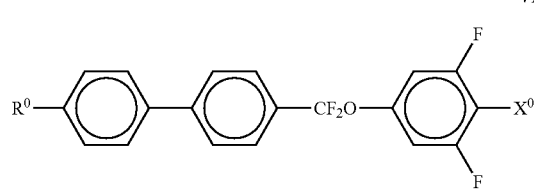

in which R⁰ and X⁰ have the meanings indicated above. Preferably, R⁰ in formula VI denotes alkyl having 1 to 8 C atoms and X⁰ denotes F;

The medium preferably comprises one or more compounds of the formula VII in which Z⁰ denotes —CF$_2$O—, —CH$_2$CH$_2$— or —COO—, particularly preferably those selected from the following formulae, VII-1a

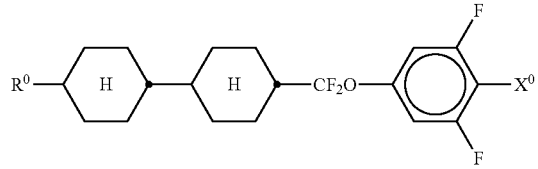

VII-1b

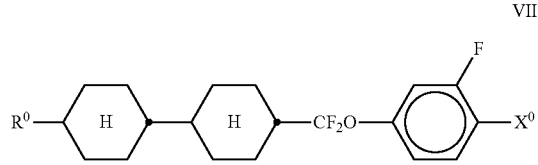

VII-1c

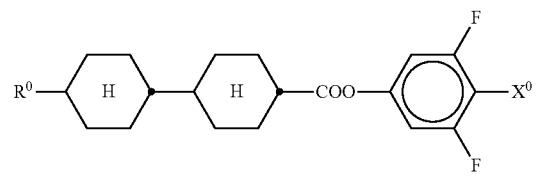

VII-1d

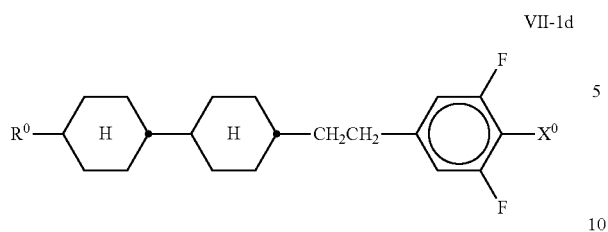

in which R⁰ and X⁰ have the meanings indicated above. Preferably, R⁰ in formula VII denotes alkyl having 1 to 8 C atoms and X⁰ denotes F, furthermore OCF$_3$ and CF$_3$.

The compounds of the formula VIII are preferably selected from the following formulae, VIIIa

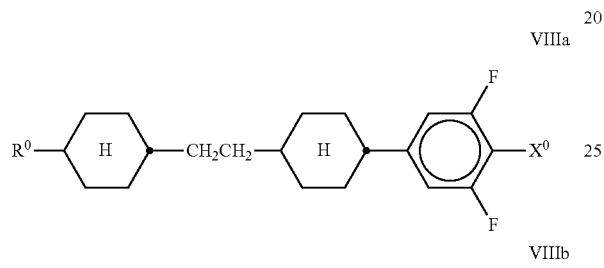

VIIIb

VIIIc

VIIId

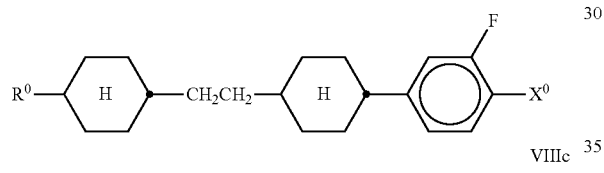

VIIIe

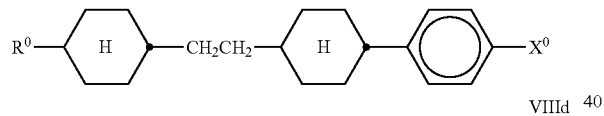

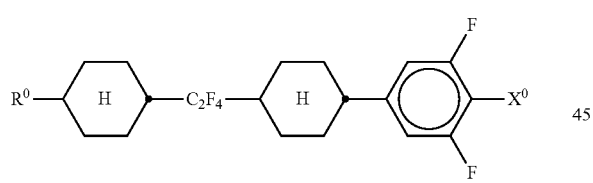

VIIIf

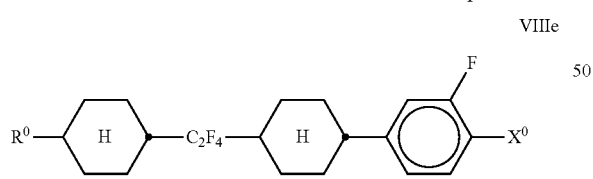

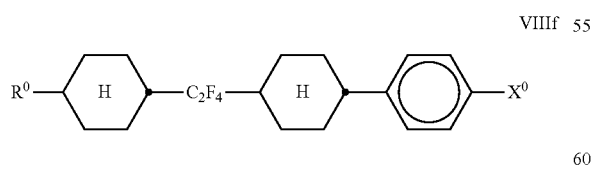

in which R⁰ and X⁰ have the meanings indicated above. R⁰ in formula VIII preferably denotes a straight-chain alkyl radical having 1 to 8 C atoms. X⁰ preferably denotes F.

The medium additionally comprises one or more compounds of the following formula,

IX

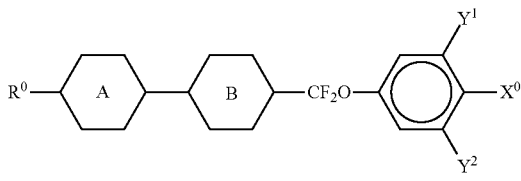

in which R⁰, X⁰, Y¹ and Y² have the meaning indicated above, and

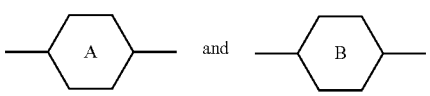

each, independently of one another, denote

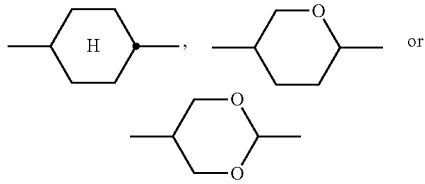

where the rings A and B do not both simultaneously denote 1,4-cyclohexylene;

The compounds of the formula IX are preferably selected from the following formulae, IXa

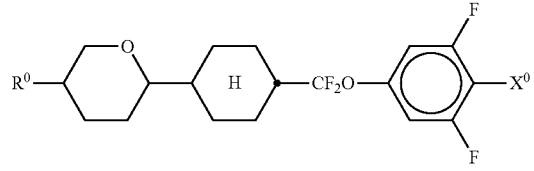

IXb

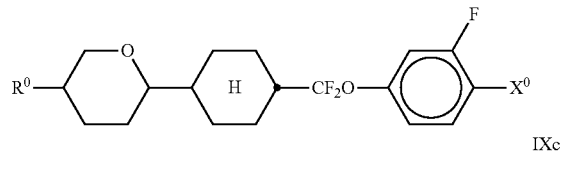

IXc

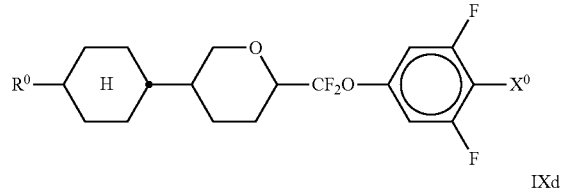

IXd

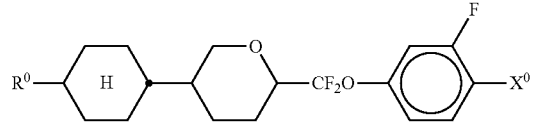

-continued

IXe
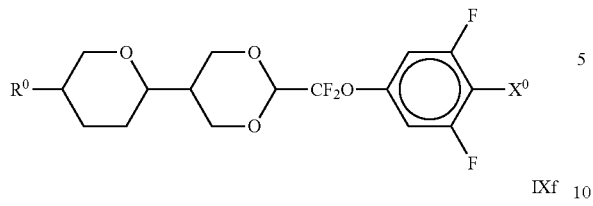

IXf
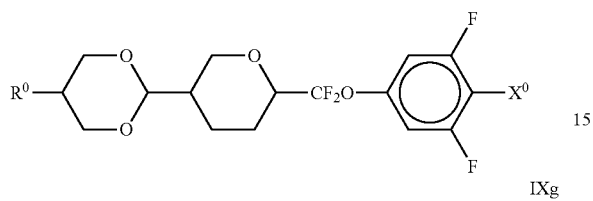

IXg
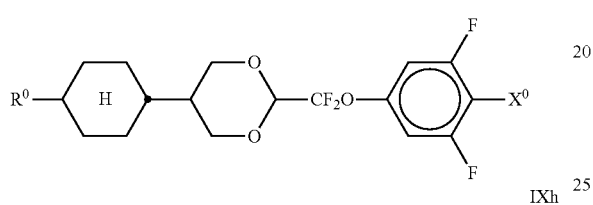

IXh
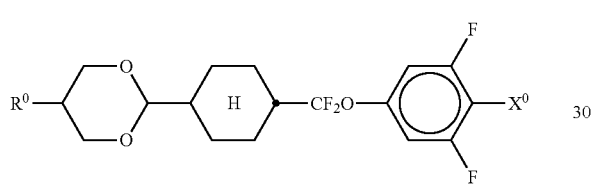

in which $R^0$ and $X^0$ have the meanings indicated above. Preferably, $R^0$ in formula IX denotes alkyl having 1 to 8 C atoms and $X^0$ denotes F. Particular preference is given to compounds of the formula IXa;

The medium additionally comprises one or more compounds selected from the following formulae, X
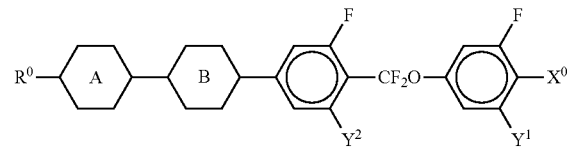

XI
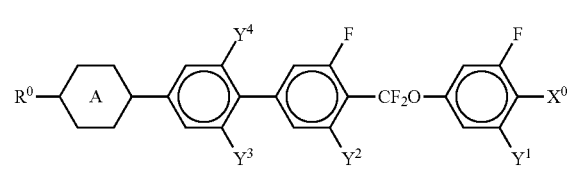

in which $R^0$, $X^0$ and $Y^{1-4}$ have the meanings indicated above, and

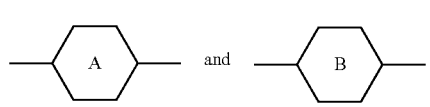

each, independently of one another, denote

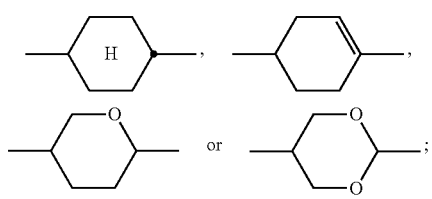

The compounds of the formulae X and XI are preferably selected from the following formulae, Xa
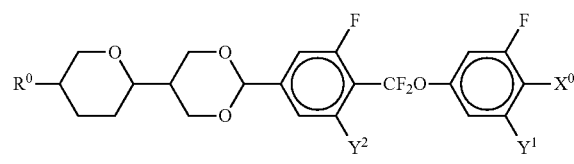

Xb
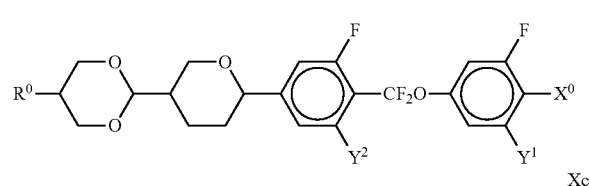

Xc
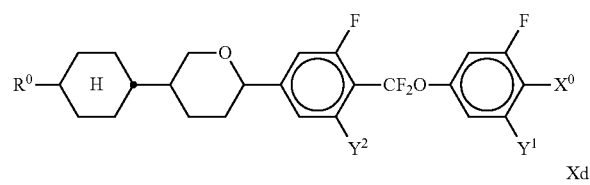

Xd
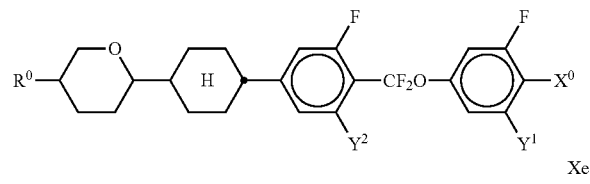

Xe
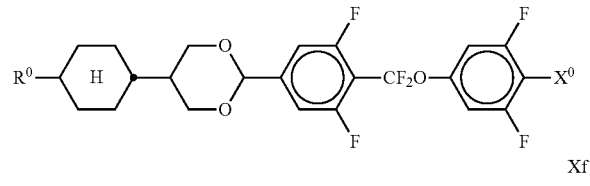

Xf
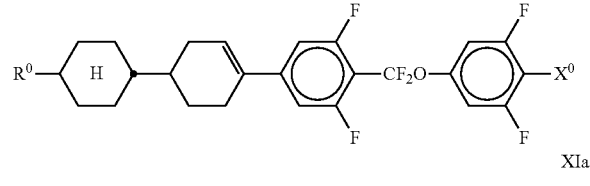

XIa
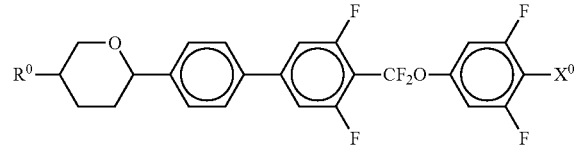

-continued

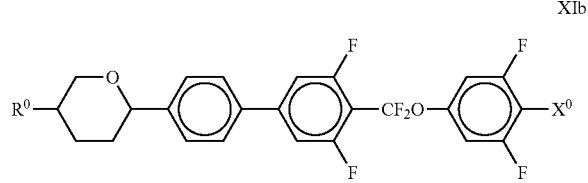
XIb in which R⁰ and X⁰ have the meanings indicated above. Preferably, R⁰ denotes alkyl having 1 to 8 C atoms and X⁰ denotes F. Particularly preferred compounds are those in which $Y^1$ denotes F and $Y^2$ denotes H or F, preferably F.

The medium additionally comprises one or more compounds of the following formula XII,

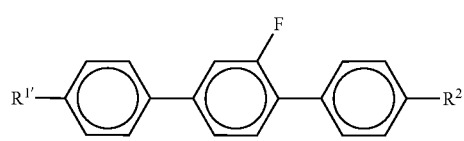
XII in which $R^1$ and $R^2$ each, independently of one another, denote alkyl, alkenyl, alkoxy, oxaalkyl, fluoroalkyl or alkenyloxy, each having up to 9 C atoms, and preferably each, independently of one another, denote alkyl or alkenyl having 1 to 8 C atoms or 2 to 8 C atoms respectively.

Preferred compounds of the formula XII are the compounds of the formulae

XII-1
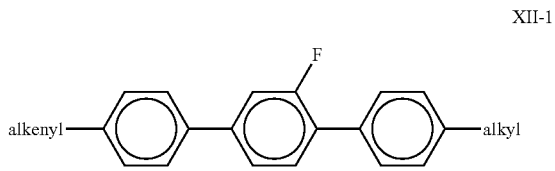

XII-2
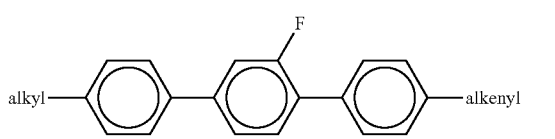

XII-3
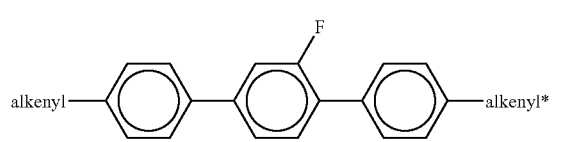

XII-4
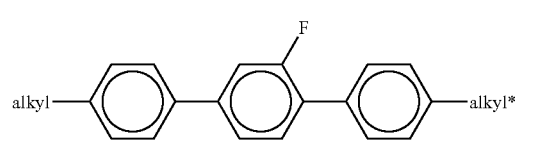

in which
alkyl and alkyl* each, independently of one another, denote a straight-chain alkyl radical having 1 to 8 C atoms, and
alkenyl and
alkenyl* each, independently of one another, denote a straight-chain alkenyl radical having 2 to 8 C atoms.

Particular preference is given to the compounds of the formulae XII-2 and XII-4.

Particularly preferred compounds of the formula XII-2 are the compounds of the formulae XII-2a, XII-2b and XII-2c:

XII-2a
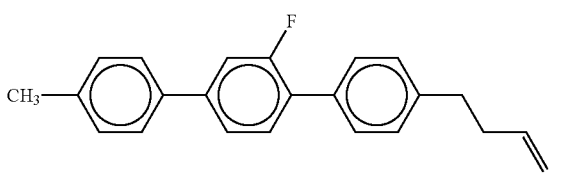

XII-2b
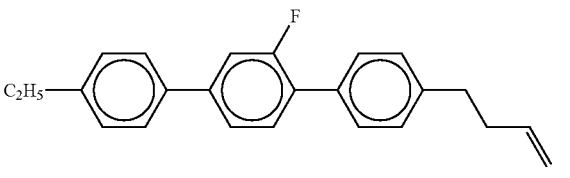

XII-2c
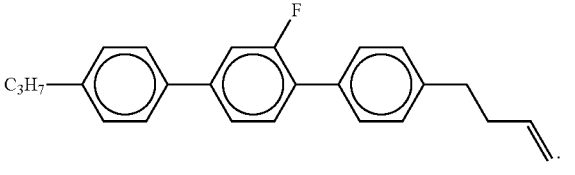

Particularly preferred compounds of the formula XII-4 are the compounds of the formulae XII-4-a, XII-4-b and XII-4-c:

XII-4a
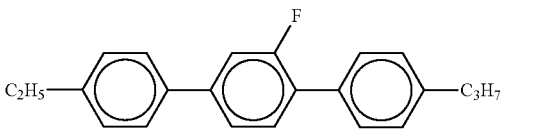

XII-4b
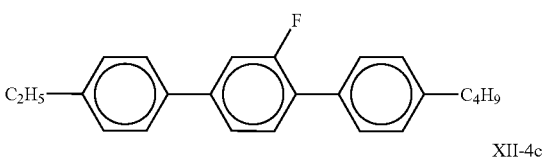

XII-4c
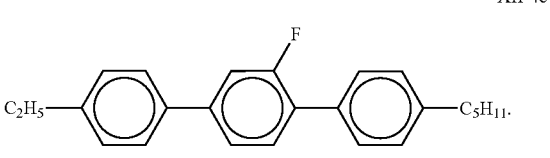

The compound(s) of the formula XII are preferably employed in amounts of 3-40% by weight.

The medium additionally comprises one or more compounds selected from the following formulae,

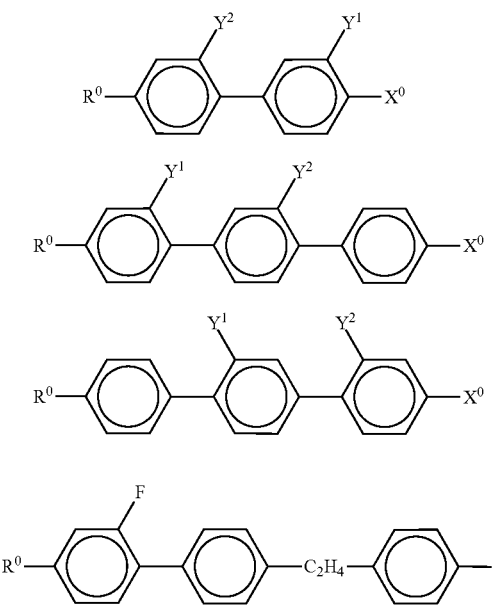

XIII

XIV

XV

XVI in which $R^0$, $X^0$, $Y^1$ and $Y^2$ have the meanings indicated above. Preferably, $R^0$ denotes alkyl having 1 to 8 C atoms and $X^0$ denotes F or Cl;

The compounds of the formulae XIII and XIV are preferably selected from the compounds of the formulae

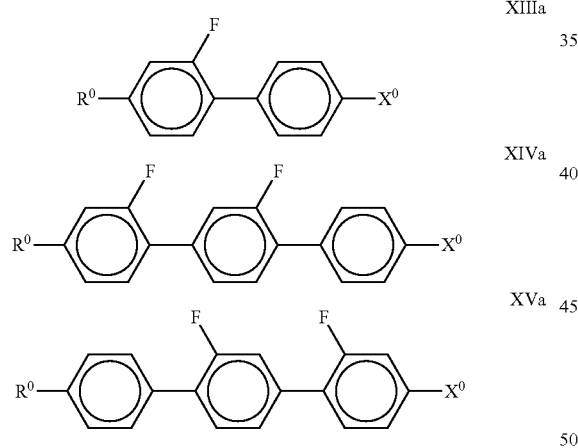

XIIIa

XIVa

XVa in which $R^0$ and $X^0$ have the meanings indicated above. $R^0$ preferably denotes alkyl having 1 to 8 C atoms. In the compounds of the formula XIII, $X^0$ preferably denotes F or Cl.

The medium additionally comprises one or more compounds of the formulae D1, D2, D3, D4 and/or D5,

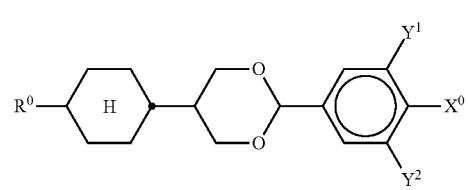

D1

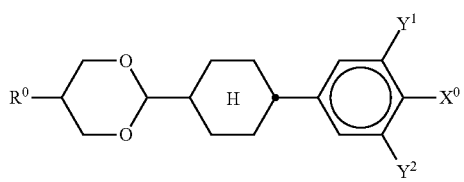

D2

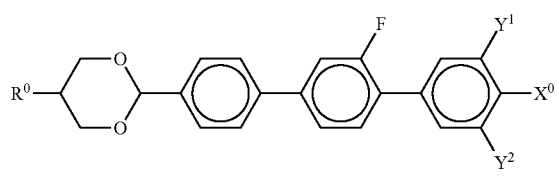

D3

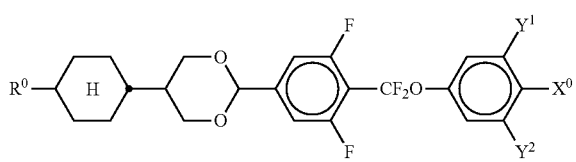

D4

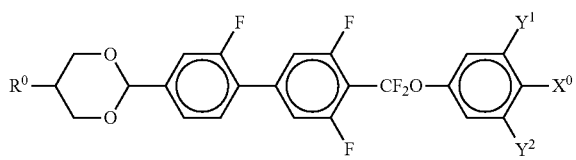

D5 in which $Y^1$, $Y^2$, $R^0$ and $X^0$ have the meanings indicated above. Preferably, $R^0$ denotes alkyl having 1 to 8 C atoms and $X^0$ denotes F.

Particular preference is given to compounds of the formulae

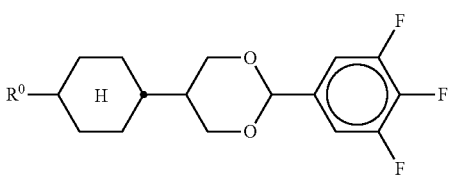

D1-1

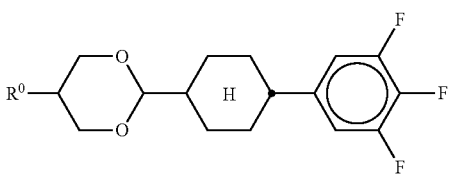

D2-1

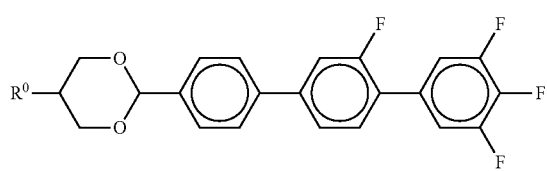

D3-1

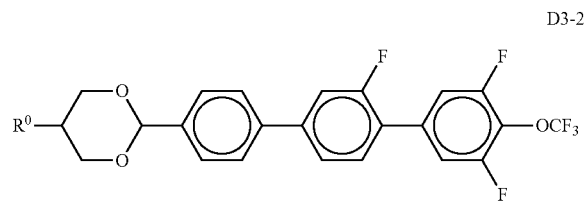
D3-2

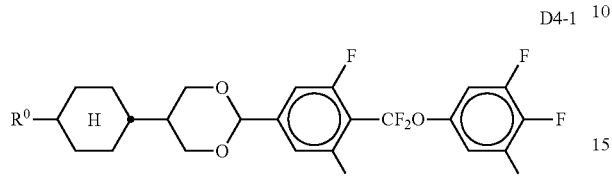
D4-1

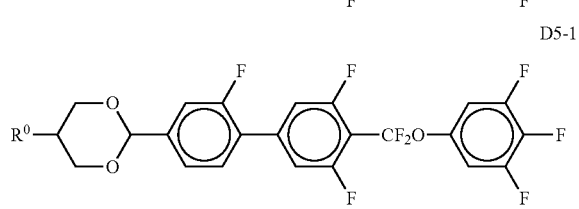
D5-1 in which R⁰ has the meanings indicated above and preferably denotes straight-chain alkyl having 1 to 6 C atoms, in particular $C_2H_5$, n-$C_3H_7$ or n-$C_5H_{11}$.

The medium additionally comprises one or more compounds of the following formula XVII,

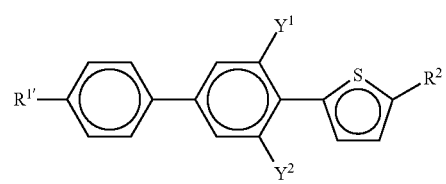
XVII in which $Y^1$, $Y^2$, $R^1$ and $R^2$ have the meanings indicated above. $R^1$ and $R^2$ preferably each, independently of one another, denote alkyl or alkenyl having 1 or 2 to 8 C atoms; $Y^1$ and $Y^2$ preferably both denote F. The compound(s) of the formula XVII are preferably employed in amounts of 3-30% by weight, based on the medium.

The medium additionally comprises one or more compounds of the following formula:

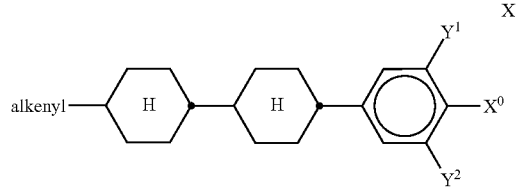
XVIII in which $X^0$, $Y^1$ and $Y^2$ have the meanings indicated above, and "alkenyl" denotes $C_{2-7}$-alkenyl. Particular preference is given to compounds of the following formula:

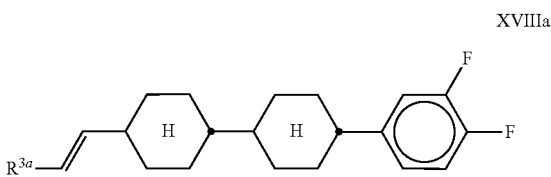
XVIIIa in which $R^{3a}$ has the meaning indicated above and preferably denotes H;

The medium additionally comprises one or more tetracyclic compounds selected from the formulae XIX to XXVIII,

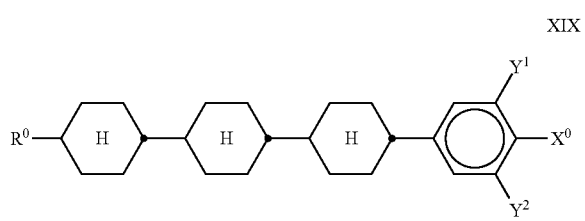
XIX

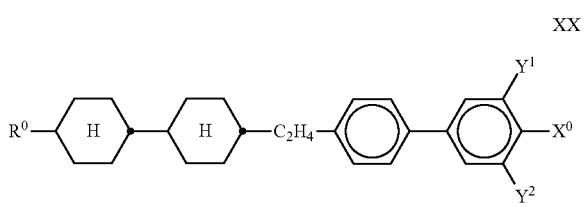
XX

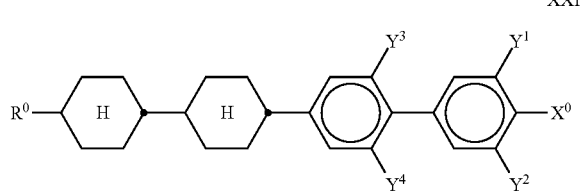
XXI

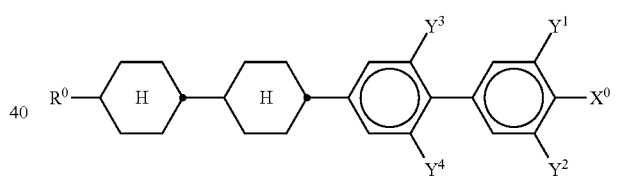
XXII

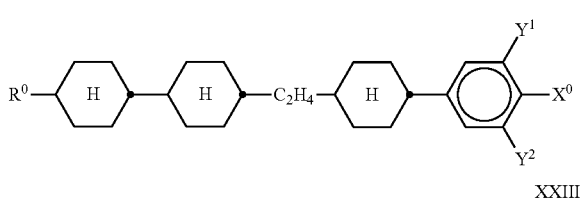
XXIII

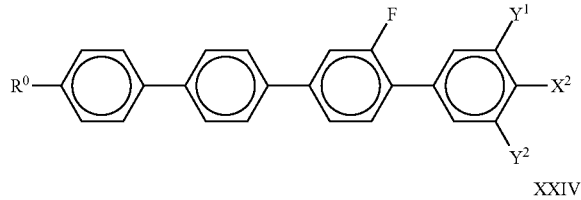
XXIV

-continued

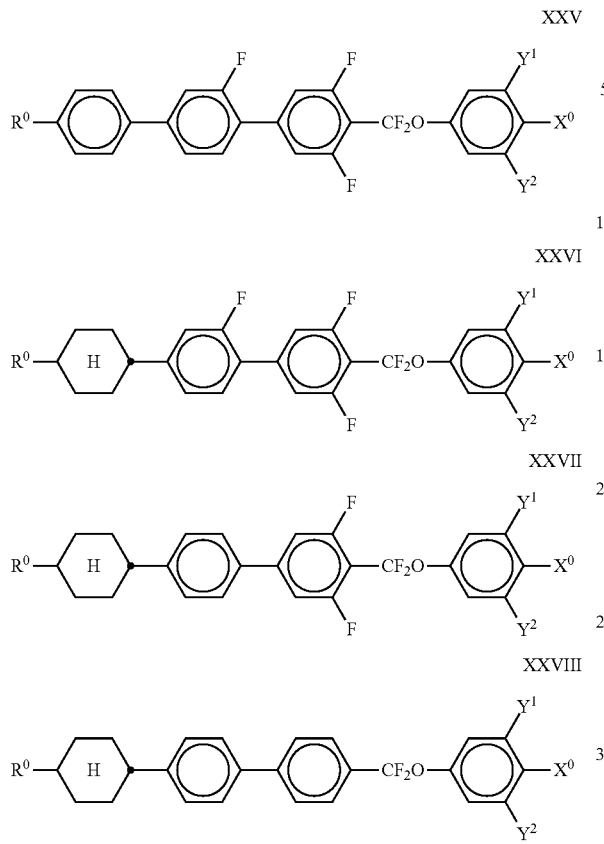

in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

In the compounds of the formulae XIX to XXVIII, $R^0$ preferably denotes straight-chain alkyl. $X^0$ is preferably F or $OCF_3$, furthermore $CF_3$. $Y^1$ and $Y^2$ preferably denote $Y^1$=F and $Y^2$=H or $Y^1$=$Y^2$=F.

Particularly preferred compounds of the formula XIX to XXVIII are the compounds of the formula XXV in which $X^0$ preferably denotes F, furthermore $OCF_3$.

Preferred mixtures comprise at least one compound from the group S-1, S-2, S-3 and S-4,

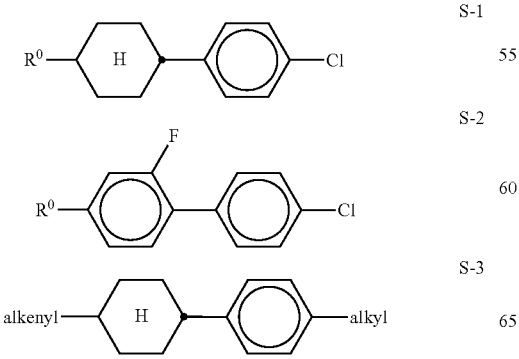

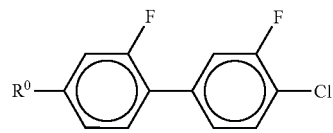

since these compounds help, inter alia, to suppress the smectic phases of the mixtures.

The medium preferably comprises one or more neutral compounds of the general formula N,

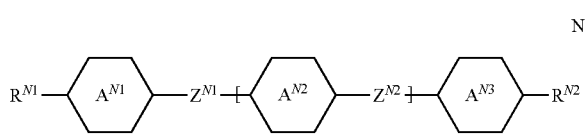

in which
$R^{N1}$ and $R^{N2}$ each, independently of one another, denote an alkyl or alkoxy radical having 1 to 15 C atoms, where, in addition, one or more $CH_2$ groups in these radicals may each be replaced, independently of one another, by —C≡C—, —$CF_2$O—,

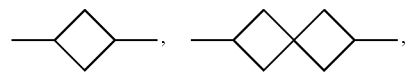

—O—, —CO—O—, —O—CO— in such a way that O atoms are not linked directly to one another, and in which, in addition, one or more H atoms may be replaced by halogen,
rings $A^{N1}$, $A^{N2}$ and $A^{N3}$ each, independently of one another, denote 1,4-phenylene, 2-fluoro-1,4-phenylene, 3-fluoro-1,4-phenylene, trans-1,4-cyclohexylene, in which, in addition, one or two $CH_2$ groups may be replaced by —O—, or 1,4-cyclohexenylene,
$Z^{N1}$ and $Z^{N2}$ each, independently of one another, denote a single bond, —$CH_2CH_2$—, —COO—, —OCO—, —C≡C—, —$CH_2$O—, —O$CH_2$—, —$CF_2$O—, —OC$F_2$—, or —CH=CH—,
n denotes 0, 1 or 2.
Preferred compounds of the formula N are shown below:

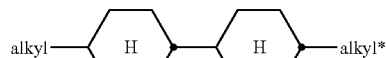

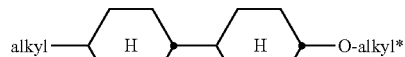

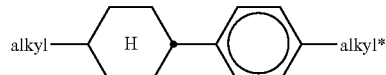

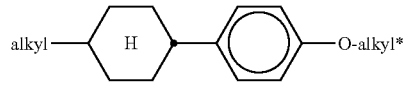

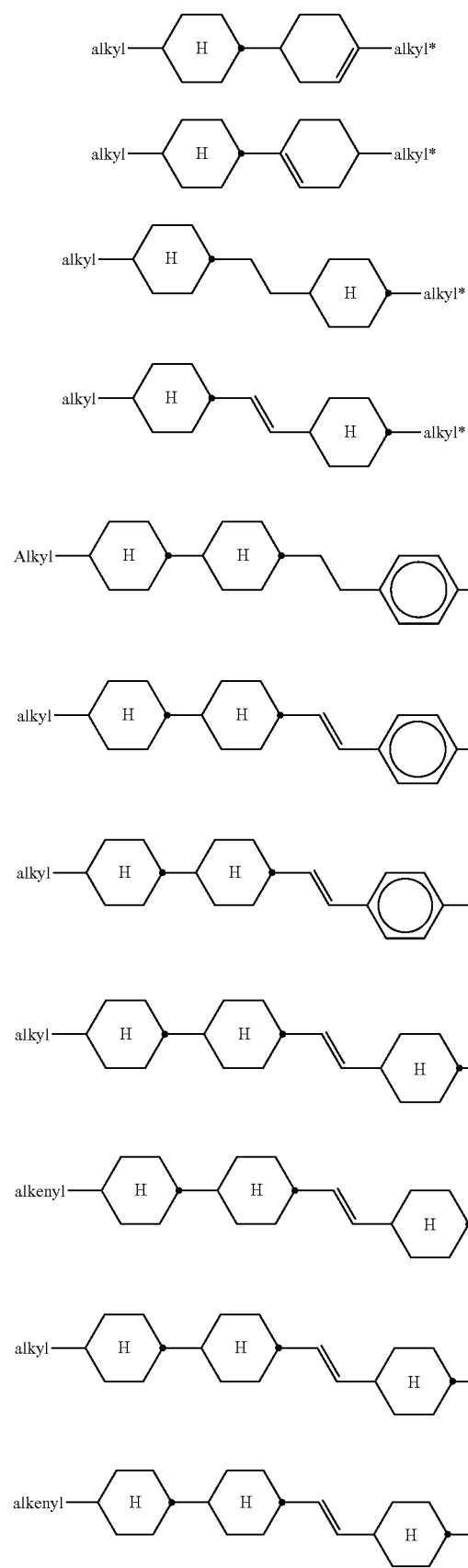
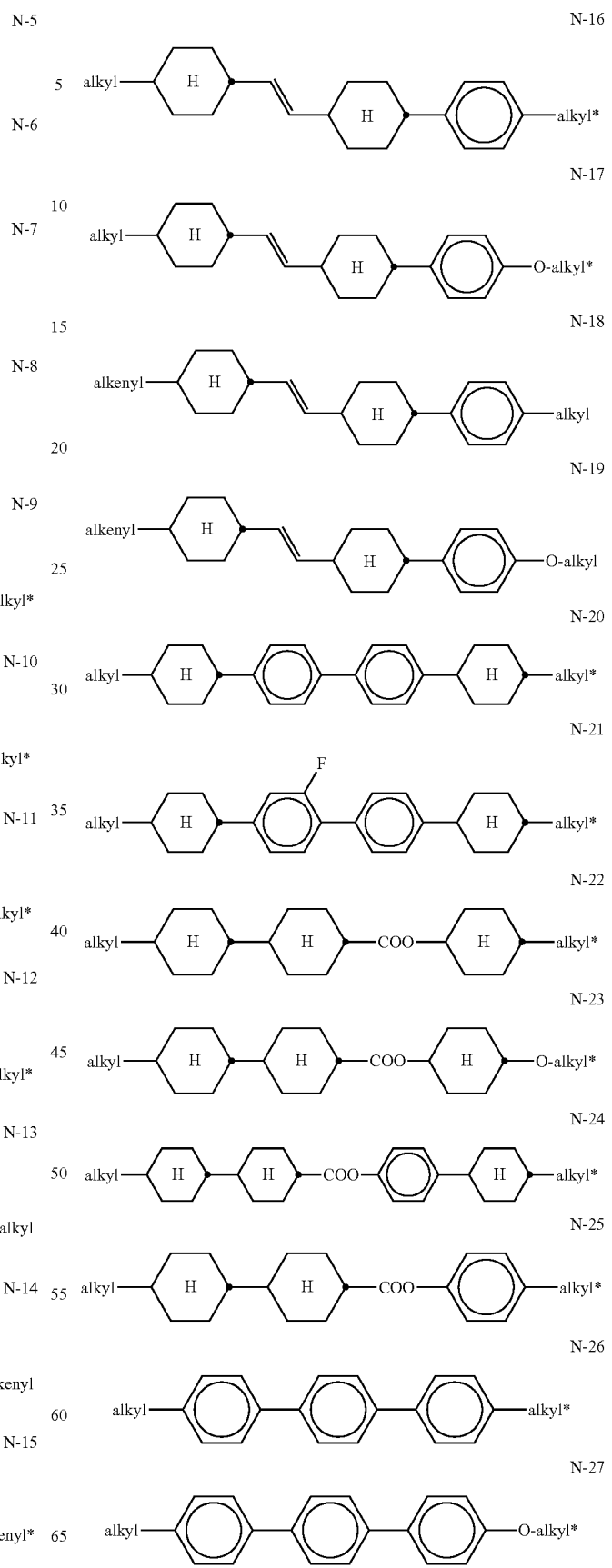

in which alkyl and alkyl* each, independently of one another, denote a straight-chain alkyl radical having 1 to 9 C atoms, preferably 2 to 6 C atoms, and alkenyl and alkenyl* each, independently of one another, denote a straight-chain alkenyl radical having 2-6 C atoms Of the compounds of the formula N, particular preference is given to the compounds of the formulae N-1, N-2, N-3, N-4, N-8, N-9, N-14, N-15, N-17, N-18, N-19, N-20, N-21, N-22, N-23, N-24, N-25, N-31, N-33 and N-36.

The medium additionally comprises one or more compounds of the formulae St-1 to St-3, in which $R^0$, $Y^1$, $Y^2$ and $X^0$ have the meanings indicated above. $R^0$ preferably denotes straight-chain alkyl, preferably having 1-6 C atoms. $X^0$ is preferably F, $CF_3$ or $OCF_3$. $Y^1$ preferably denotes F. $Y^2$ preferably denotes F. Furthermore, preference is given to compounds in which $Y^1$=F and $Y^2$=H. The compounds of the formulae St-1 to St-3 are preferably employed in the mixtures according to the invention in a concentration of 3-30% by weight, in particular 5-25% by weight.

The medium additionally comprises one or more pyrimidine or pyridine compounds of the formulae Py-1 to Py-5, -continued Py-4

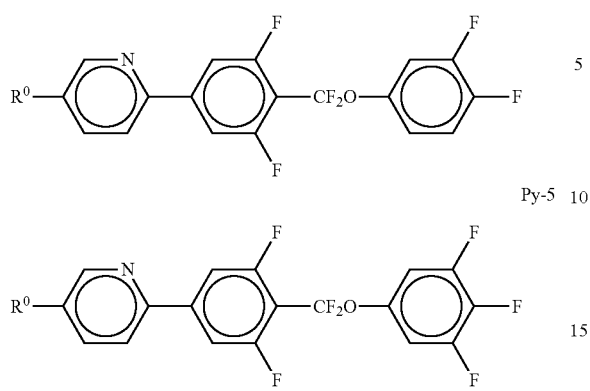

Py-5 in which R⁰ has the meaning given above and is preferably straight-chain alkyl having 2-5 C atoms. x denotes 0 or 1, preferably x=1. Preferred mixtures comprise 3-30% by weight, in particular 5-20% by weight, of this (these) pyri(mi)dine compound(s).

The medium additionally comprises one or more compounds selected from the group of the compounds of the formulae Y-1, Y-2, Y-3 and Y-4,

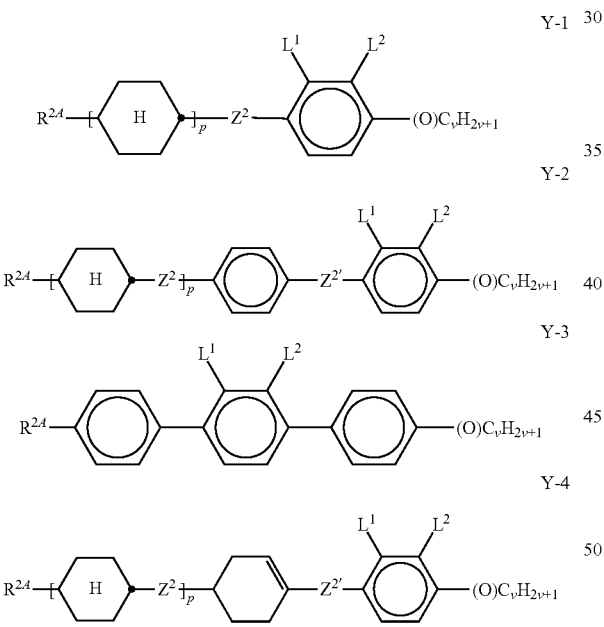

in which
- $R^{2A}$ denotes H, an alkyl or alkoxy radical having 1 to 15 C atoms, where, in addition, one or more $CH_2$ groups in these radicals may each be replaced, independently of one another, by —C≡C—, —$CF_2O$—, —CH=CH—,

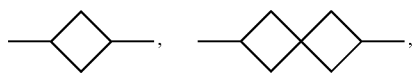

—O—, —CO—O—, —O—CO— in such a way that O atoms are not linked directly to one another, and in which, in addition, one or more H atoms may be replaced by halogen,
- $L^{1-2}$ each, independently of one another, denote F, Cl, $CF_3$ or $CHF_2$, preferably each denote F,
- $Z^2$ and $Z^{2'}$ each, independently of one another, denote a single bond, —$CH_2CH_2$—, —CH=CH—, —$CF_2O$—, —$OCF_2$—, —$CH_2O$—, —$OCH_2$, —COO—, —OCO—, —$C_2F_4$—, —CF=CF—, —CH=$CHCH_2O$—,
- p denotes 0, 1 or 2,
- q denotes 0 or 1,
- $(O)C_vH_{2v+1}$ denotes $OC_vH_{2v+1}$ or $C_vH_{2v+1}$, and
- v denotes 1 to 6.

Particularly preferred compounds of the formulae Y-1 to Y-4 are shown below:

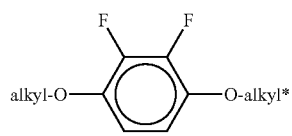

Y-1a

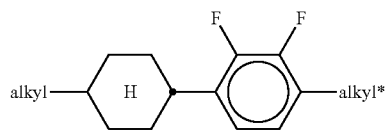

Y-1b

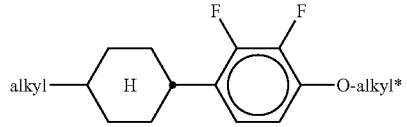

Y-1c

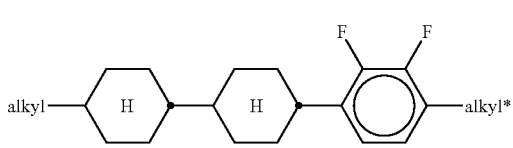

Y-1d

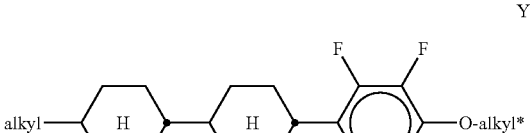

Y-1e

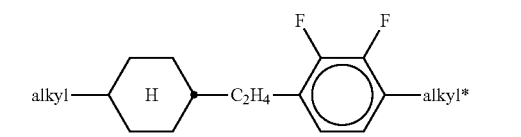

Y-1f

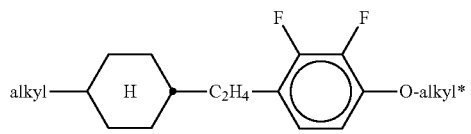

Y-1g

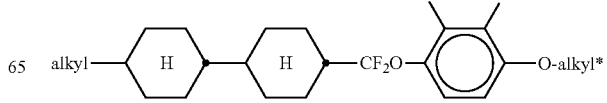

Y-1h

Y-1i
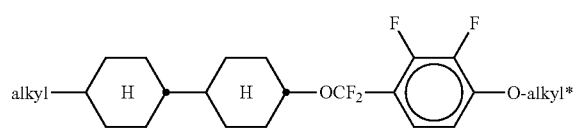
Y-1j
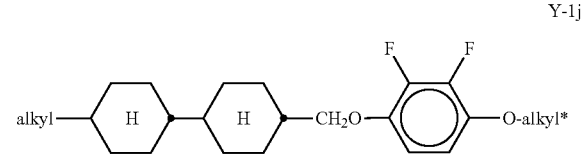
Y-1k
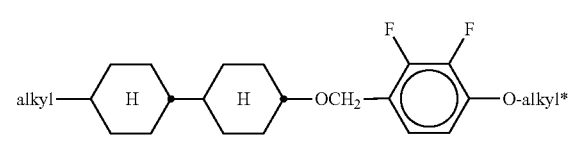
Y-1l
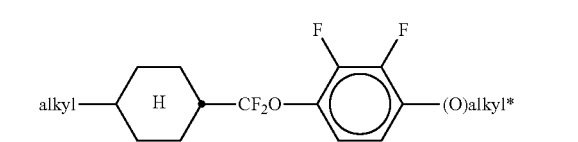
Y-1m
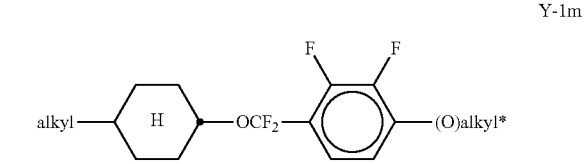
Y-1n
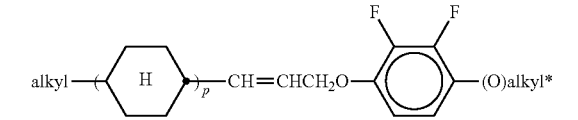
Y-1o
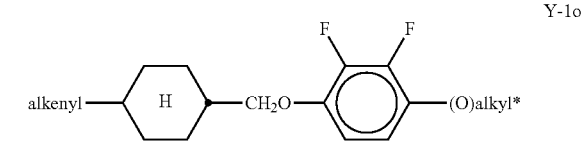
Y-1p
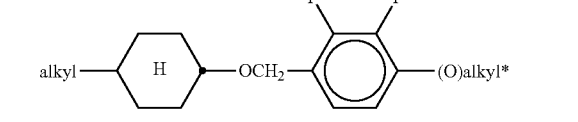
Y-1q
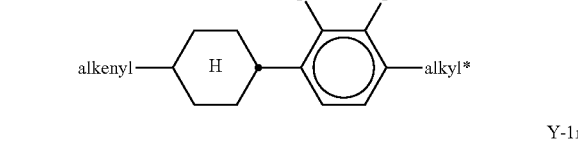
Y-1r
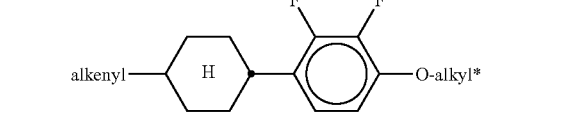
Y-1s
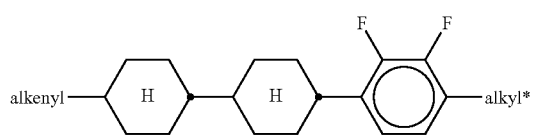
Y-1t
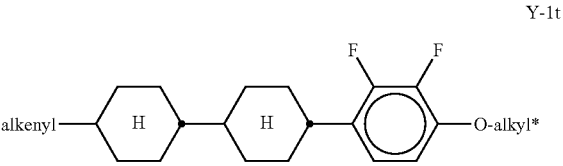
Y-1u
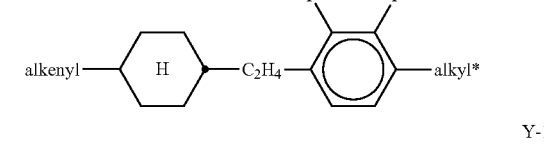
Y-1v
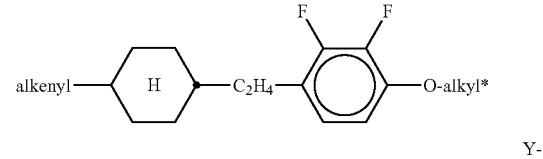
Y-2a
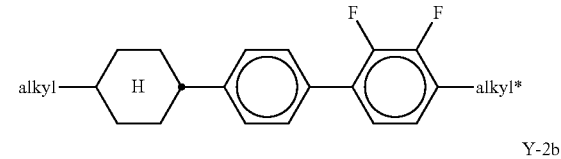
Y-2b
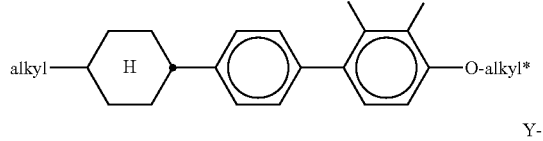
Y-2c
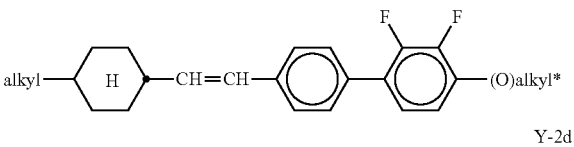
Y-2d
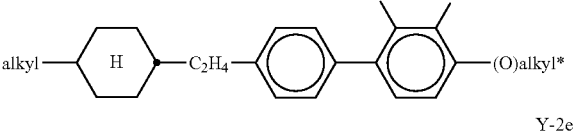
Y-2e
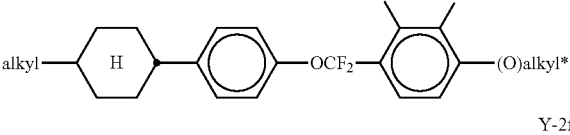
Y-2f
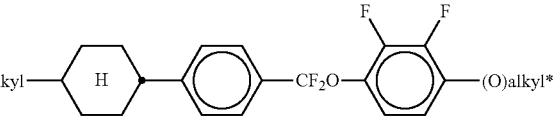

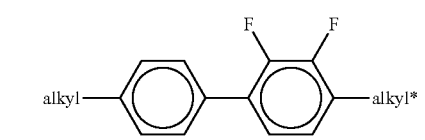
Y-2g

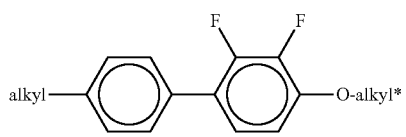
Y-2h

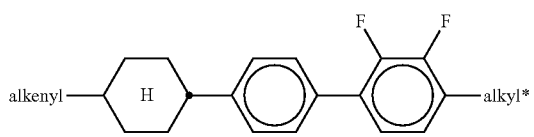
Y-2i

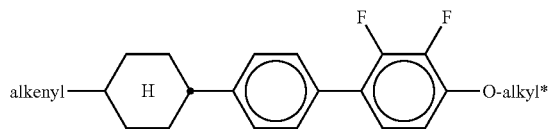
Y-2j

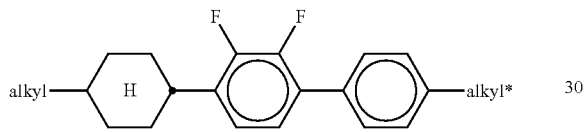
Y-3a

Of the compounds shown, particular preference is given to the compounds of the formulae Y-1a, Y-1c, Y-1e, Y-1g, Y-1j, Y-1r, Y-1t, Y-2b, Y-2h, Y-2j and Y-3a.

The proportion of the compounds of the formulae Y-1 to Y-3 in the mixtures according to the invention is preferably 0-30% by weight.

In the formulae given above and below,

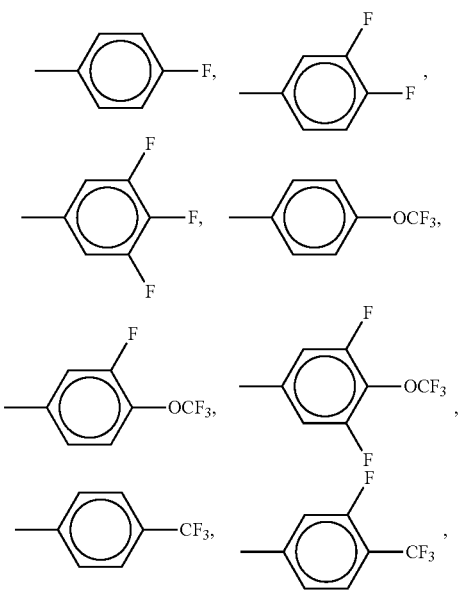

preferably denotes

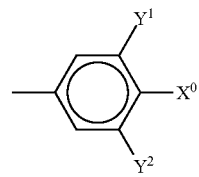

$R^0$ is preferably straight-chain alkyl or alkenyl having 2 to 7 C atoms;

$X^0$ is preferably F, furthermore $OCF_3$, $OCH=CF_2$, $C_1$ or $CF_3$;

The medium preferably comprises one, two or three compounds of the formula I;

The medium preferably comprises one or more compounds selected from the group of the compounds of the formulae I, II, III, V, VI-1, VI-2, XII, XIII, XIV, XVII, XXIII, XXV;

The medium preferably comprises one or more compounds of the formula VI-1;

The medium preferably comprises one or more compounds of the formula VI-2;

The medium preferably comprises 1-30% by weight, preferably 2-20% by weight, particularly preferably 2-15% by weight, of compounds of the formula I;

The proportion of compounds of the formulae II-XXVII in the mixture as a whole is preferably 20 to 99% by weight;

The medium preferably comprises 25-80% by weight, particularly preferably 30-70% by weight, of compounds of the formulae II and/or III;

The medium preferably comprises 0-70% by weight, particularly preferably 20-60% by weight, of compounds of the formula IIa-1;

The medium preferably comprises 0-25% by weight, particularly preferably 5-25% by weight, of compounds of the formula IIa-2;

The medium preferably comprises 0-30% by weight, particularly preferably 5-25% by weight, of compounds of the formula IIa-3;

The medium preferably comprises 0-25% by weight, particularly preferably 5-25% by weight, of compounds of the formula IIa-5;

The medium preferably comprises 5-40% by weight, particularly preferably 10-30% by weight, of compounds of the formula V;

The medium preferably comprises 3-30% by weight, particularly preferably 6-25% by weight, of compounds of the formula VI-1;

The medium preferably comprises 2-30% by weight, particularly preferably 4-25% by weight, of compounds of the formula VI-2;

The medium preferably comprises 5-40% by weight, particularly preferably 10-30% by weight, of compounds of the formula XII;

The medium preferably comprises 1-25% by weight, particularly preferably 2-15% by weight, of compounds of the formula XIII;

The medium preferably comprises 5-45% by weight, particularly preferably 10-35% by weight, of compounds of the formula XIV;

The medium preferably comprises 1-20% by weight, particularly preferably 2-15% by weight, of compounds of the formula XVI;

The medium preferably comprises 5-30% by weight, particularly preferably 8-22% by weight, of compounds of the formula Va in which $X^0$=OCH=$CF_2$;

The medium preferably comprises the compound of the formula CC-3-2V and the compound of the formula CC-3-V and/or CC-3-V1.

The medium preferably comprises the compound of the formula CC-3-2V and the compound of the formula APUQU-2-F and/or APUQU-3-F.

The medium preferably comprises the compound CC-3-2V and the compound of the formula CC-3-2V1.

The medium preferably comprises the compound CC-3-2V and the compound of the formula PP-1-2V1.

The medium preferably comprises the compound CC-3-2V and at least one compound of the formula PGUQU-n-F, where n=3, 4 or 5.

The medium preferably comprises the compound CC-3-2V and at least one compound of the formula DPGU-n-F, where n=2, 3, 4, or 5.

It has been found that even a relatively small proportion of compounds of the formula I mixed with conventional liquid-crystal materials, but in particular with one or more compounds of the formulae II to XXVIII, results in a significant increase in the low-temperature stability without the rotational viscosity $\gamma_1$ being influenced or only being influenced slightly. The liquid-crystalline medium according to the invention is furthermore distinguished by its relatively high values for the birefringence and by its light stability, with broad nematic phases having low smectic-nematic transition temperatures being observed at the same time, improving the shelf life. At the same time, the mixtures exhibit very low threshold voltages and very good values for the VHR on exposure to UV.

The expression "alkyl" or "alkyl*" in this application encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The expression "O-alkyl" in this application encompasses straight-chain and branched alkoxy groups.

The expression "alkenyl" or "alkenyl*" in this application encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The expression "fluoroalkyl" in this application encompasses straight-chain groups having at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The expression "oxaalkyl" or "alkoxy" in this application encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^1$ in formula I, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae IV to VIII in which $X^0$ denotes F, $OCF_3$, $OCHF_2$, OCH=$CF_2$, OCF=$CF_2$ or $OCF_2$—$CF_2H$. A favourable synergistic action with the compounds of the formula I results in particularly advantageous properties. In particular, mixtures comprising compounds of the formulae I and VI, or I and XI, or I and VI and XI are distinguished by their low threshold voltages.

The individual compounds of the above-mentioned formulae and the sub-formulae thereof which can be used in the media according to the invention are either known or can be prepared analogously to the known compounds.

The invention also relates to electro-optical displays, such as, for example, TN, STN, TFT, OCB, IPS, PS-IPS, FFS, PS-FFS, positive VA or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

Furthermore, the mixtures according to the invention are also suitable for positive VA applications, also referred to as HT-VA applications. These are taken to mean electro-optical displays having an in-plane drive electrode configuration and homeotropic arrangement of the liquid-crystal medium having positive dielectric anisotropy. The mixtures according to the invention are particularly preferably suitable for TN-TFT display applications having a low operating voltage, i.e. particularly preferably for notebook applications.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and high-Δn TFT applications, such as, for example, PDAs, notebooks, LCD TVs and monitors.

The liquid-crystal mixtures according to the invention, while retaining the nematic phase preferably down to −20° C., more preferably down to −30° C., particularly preferably down to −40° C., and the clearing point ≥70° C., preferably ≥74° C., at the same time allow rotational viscosities $\gamma_1$ of ≤120 mPa·s, particularly preferably 60 mPa·s, to be achieved, enabling excellent MLC displays having fast response times to be achieved.

The dielectric anisotropy $\Delta\epsilon$ of the liquid-crystal mixtures according to the invention is preferably ≥+3, particularly preferably ≥+4. In addition, the mixtures are characterised by low operating voltages. The threshold voltage of the liquid-crystal mixtures according to the invention is preferably ≤2.5 V, in particular ≤2.2 V.

The birefringence $\Delta n$ of the liquid-crystal mixtures according to the invention is preferably ≥0.08, in particular ≥0.10.

The nematic phase range of the liquid-crystal mixtures according to the invention preferably has a width of at least 90°, in particular at least 100°. This range preferably extends at least from −20° C. to +70° C.

If the mixtures according to the invention are used in IPS or FFS applications, the mixtures preferably have a dielectric anisotropy value of 3-20 and an optical anisotropy value of 0.07-0.13.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having higher $\Delta\epsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXVII or with further liquid-crystalline compounds and/or additives. In general, the desired amount of the components used in the smaller amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba Chemicals, in particular Tinuvin® 770, antioxidants, free-radical scavengers, nanoparticles, etc. For example, 0-15% of pleochroic dyes or chiral dopants can be added. Suitable stabilisers and dopants are mentioned below in Tables C and D.

In order to set the desired tilt angle, polymerisable compounds, so-called "reactive mesogens", may also additionally be added to the mixtures according to the invention. Preferred polymerisable compounds are listed in Table E.

In the present application and in the examples below, the structures of the liquid-crystal compounds are indicated by means of acronyms, the trans-formation into chemical formulae taking place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for R[1]*, R[2]*, L[1]*, L[2]*, L[3]* | R[1]* | R[2]* | L[1]* | L[2]* |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.

TABLE A

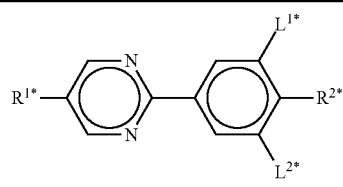

PYP

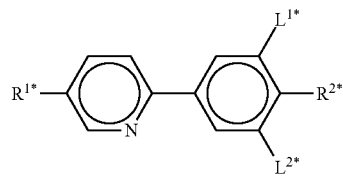

PYRP

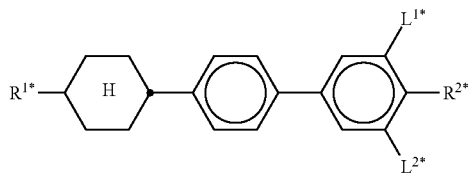

BCH

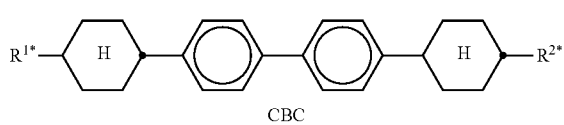

CBC

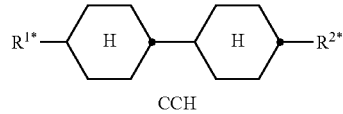

CCH

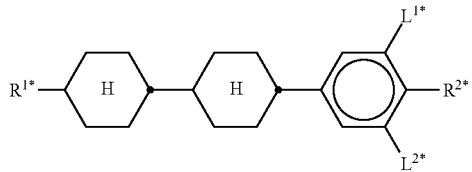

CCP

TABLE A-continued

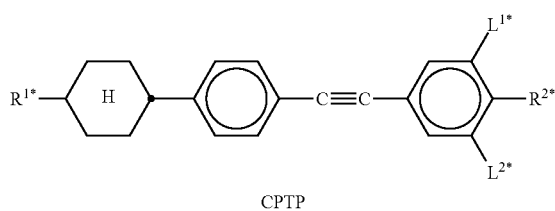

CPTP

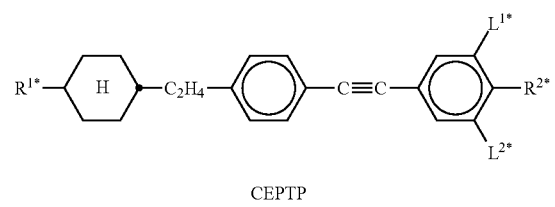

CEPTP

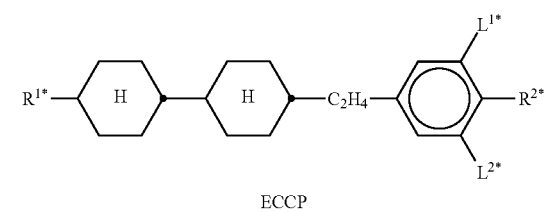

ECCP

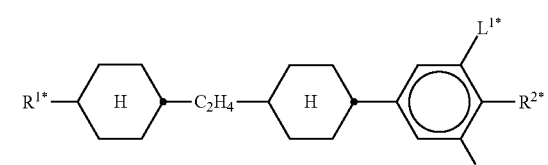

CECP

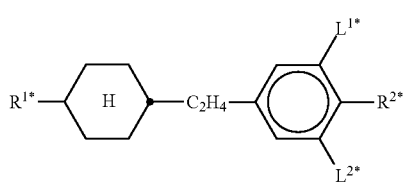

EPCH

TABLE A-continued
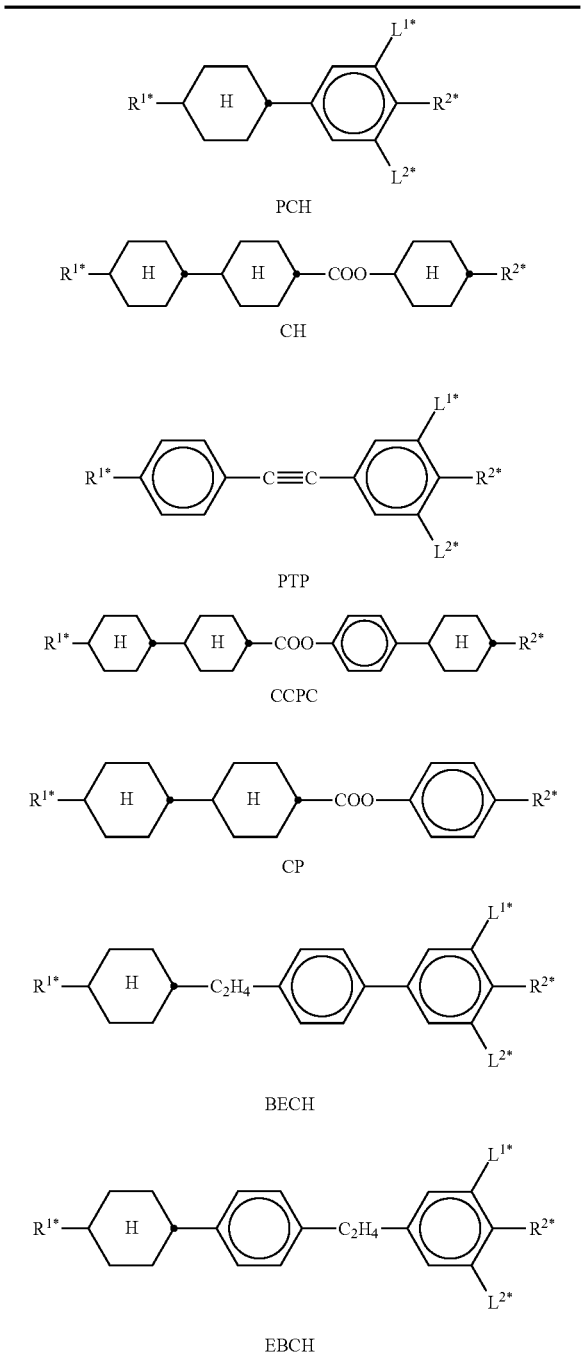
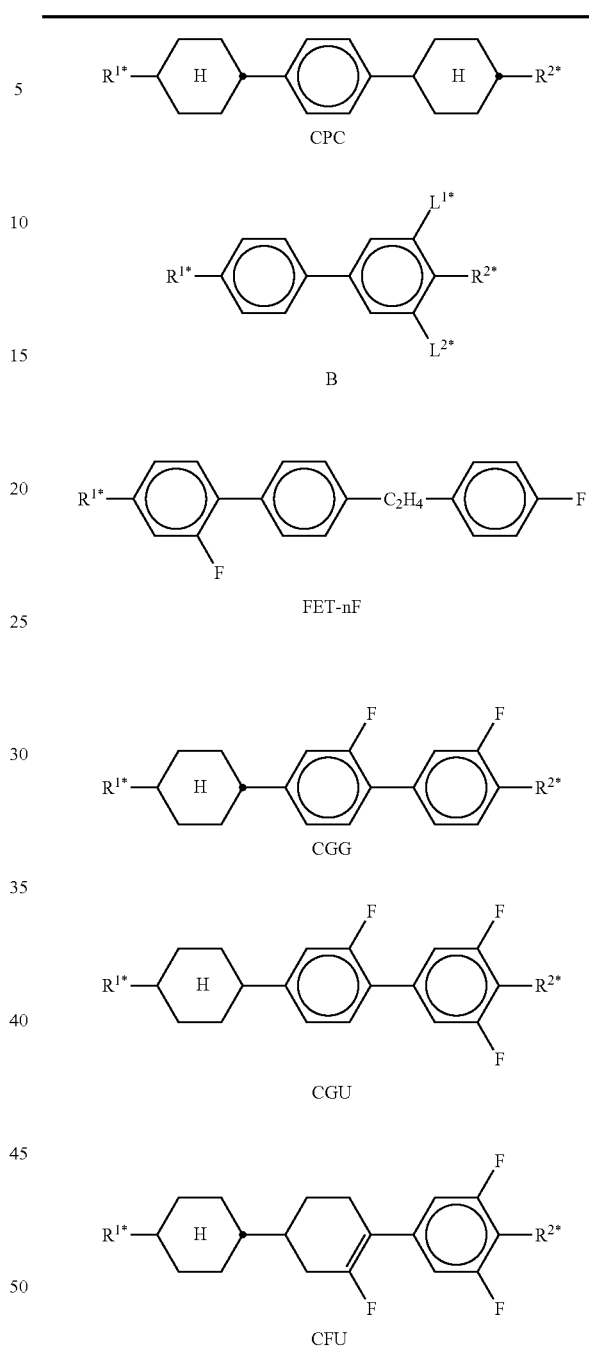
TABLE B
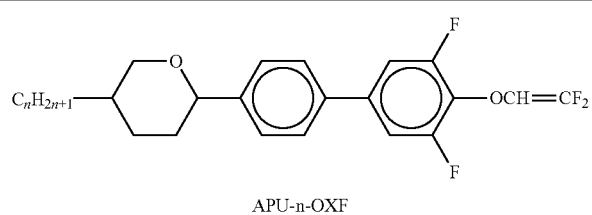

TABLE B-continued
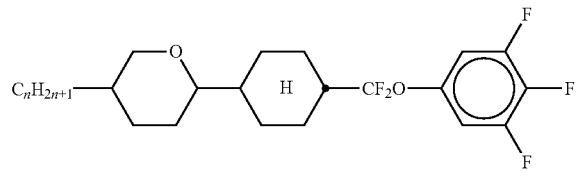
ACQU-n-F
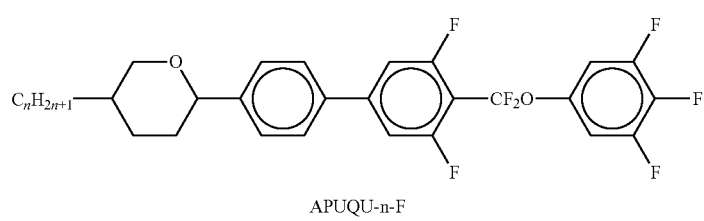
APUQU-n-F
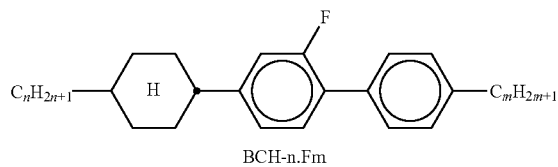
BCH-n.Fm
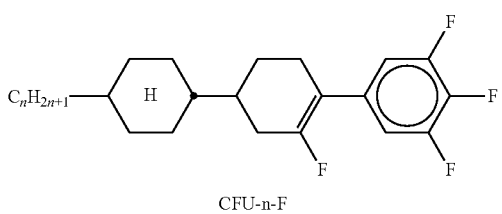
CFU-n-F
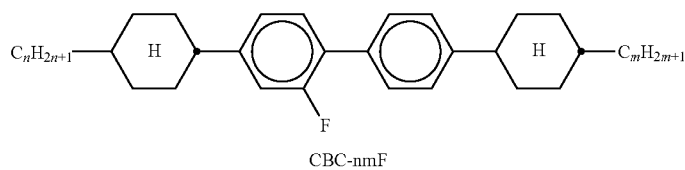
CBC-nmF
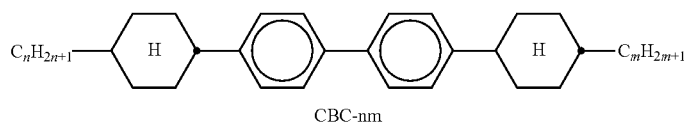
CBC-nm
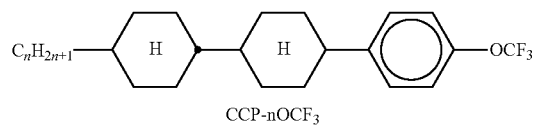
CCP-nOCF$_3$
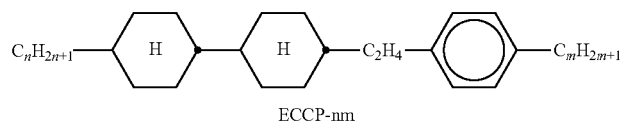
ECCP-nm
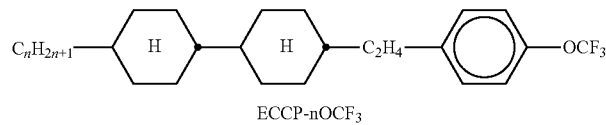
ECCP-nOCF$_3$ TABLE B-continued
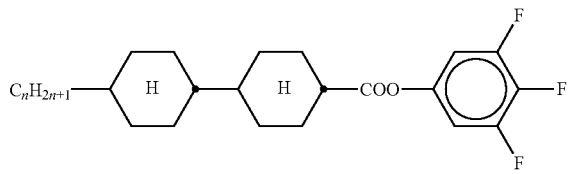
CCZU-n-F
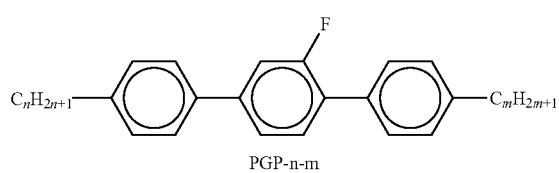
PGP-n-m
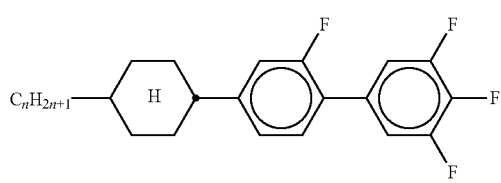
CGU-n-F
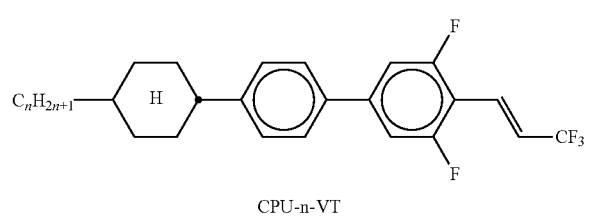
CPU-n-VT
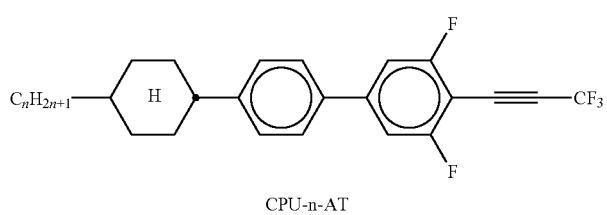
CPU-n-AT
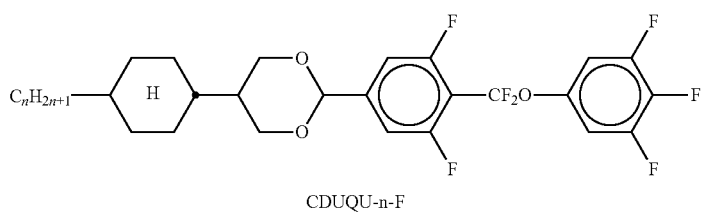
CDUQU-n-F
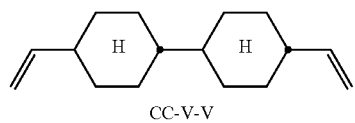
CC-V-V
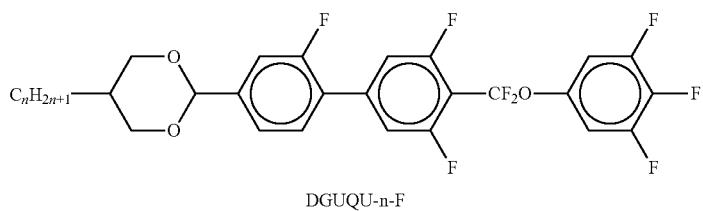
DGUQU-n-F TABLE B-continued
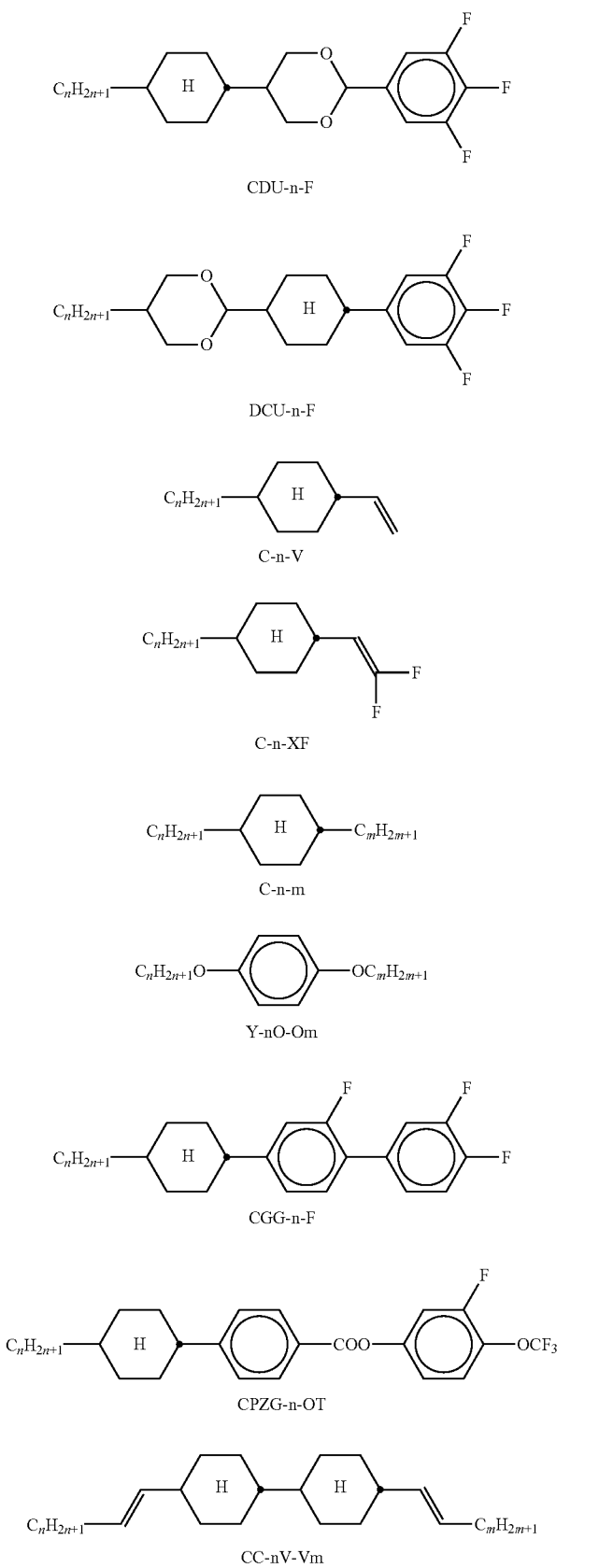

TABLE B-continued
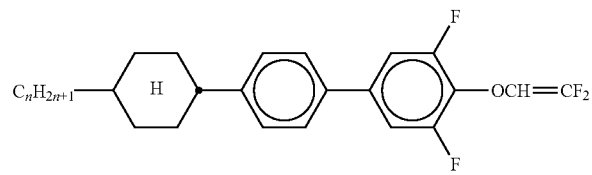
CPU-n-OXF
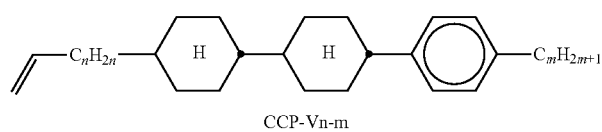
CCP-Vn-m
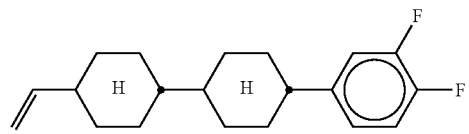
CCG-V-F
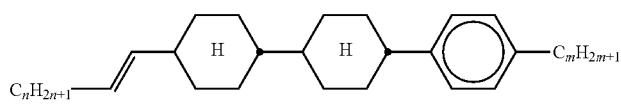
CCP-nV-m
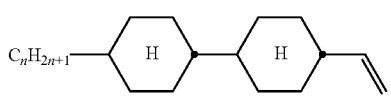
CC-n-V
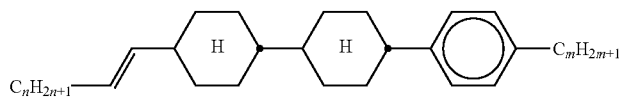
CCP-V2-m
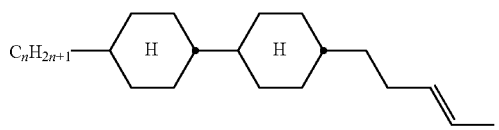
CC-n-2V1
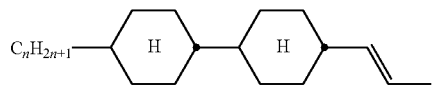
CC-n-V1
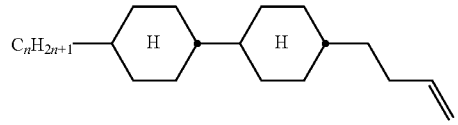
CC-n-2V
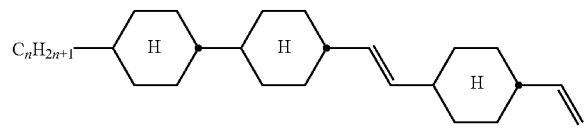
CCVC-n-V TABLE B-continued
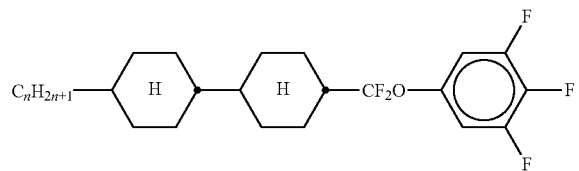
CCQU-n-F
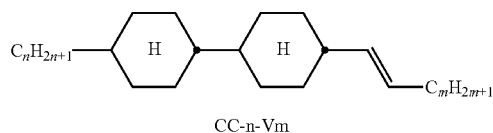
CC-n-Vm
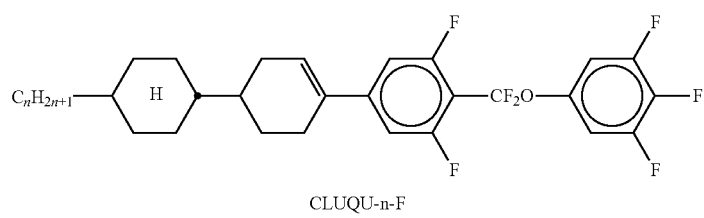
CLUQU-n-F
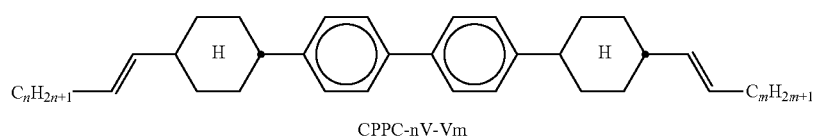
CPPC-nV-Vm
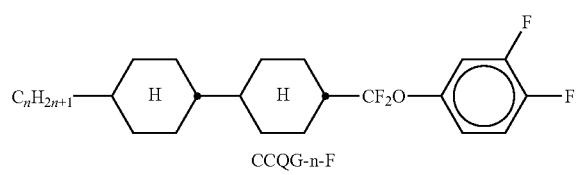
CCQG-n-F
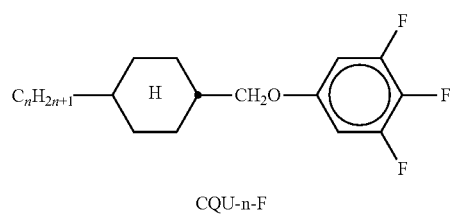
CQU-n-F
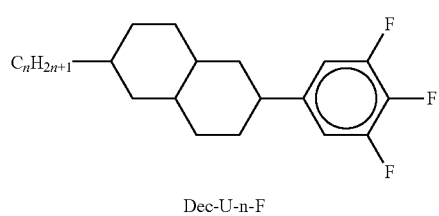
Dec-U-n-F
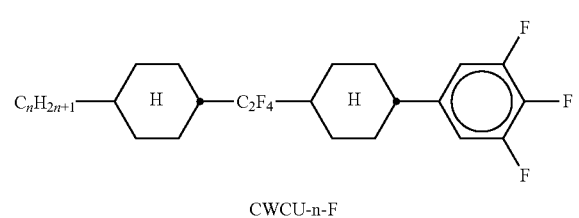
CWCU-n-F TABLE B-continued
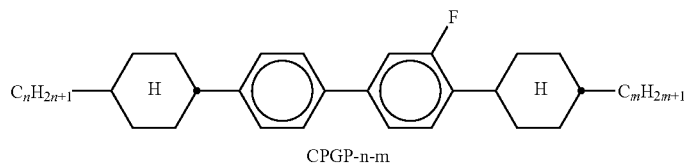
CPGP-n-m
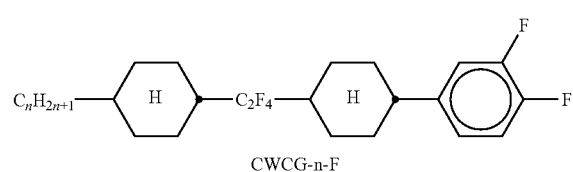
CWCG-n-F
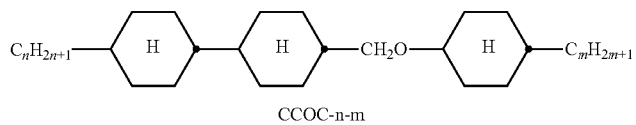
CCOC-n-m
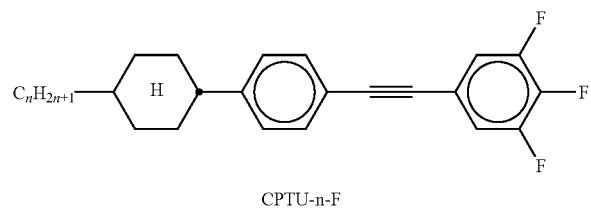
CPTU-n-F
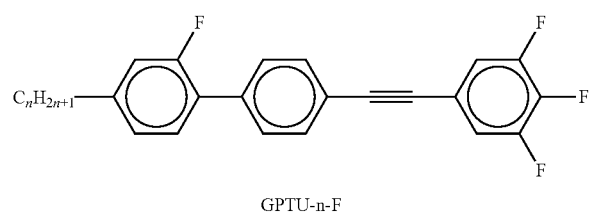
GPTU-n-F
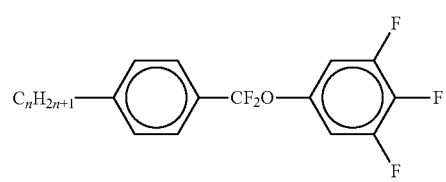
PQU-n-F
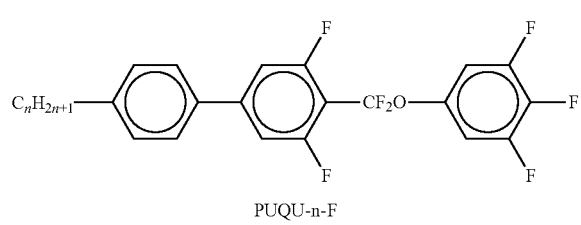
PUQU-n-F
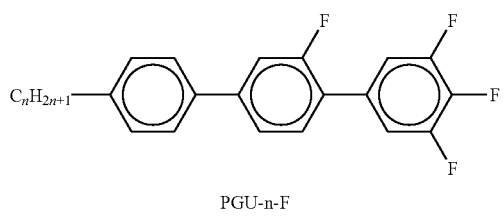
PGU-n-F TABLE B-continued
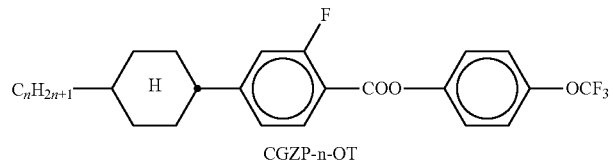
CGZP-n-OT
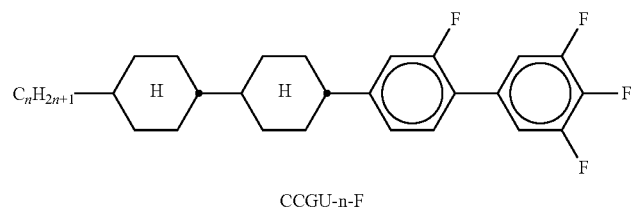
CCGU-n-F
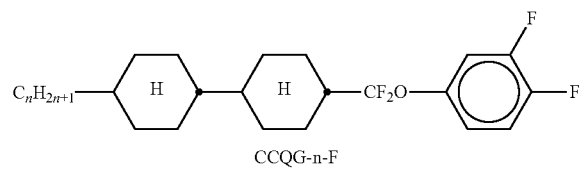
CCQG-n-F
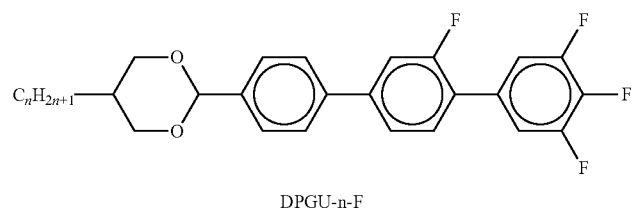
DPGU-n-F
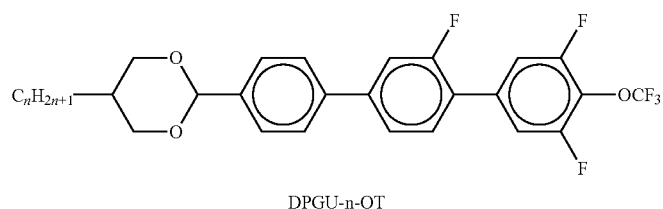
DPGU-n-OT
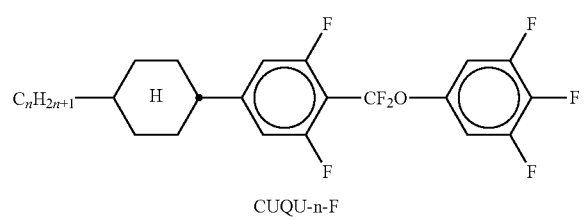
CUQU-n-F
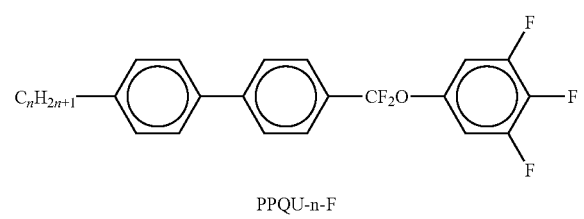
PPQU-n-F TABLE B-continued
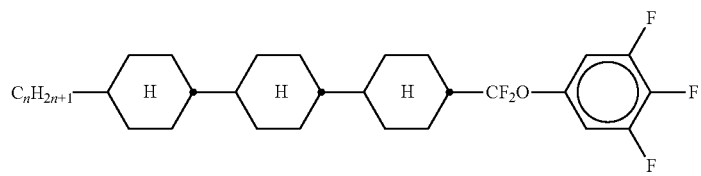
CCCQU-n-F
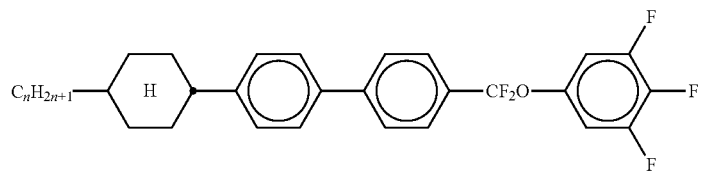
CPPQU-n-F
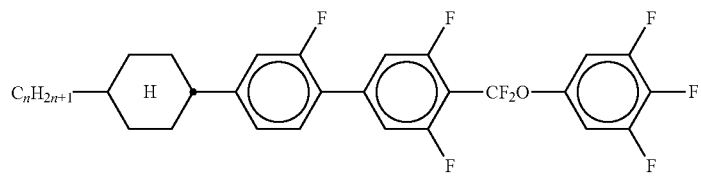
CGUQU-n-F
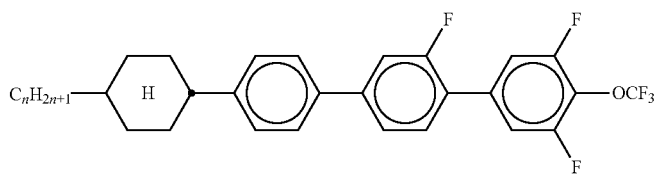
CPGU-n-OT
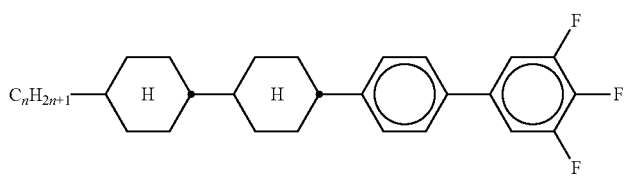
CCPU-n-F
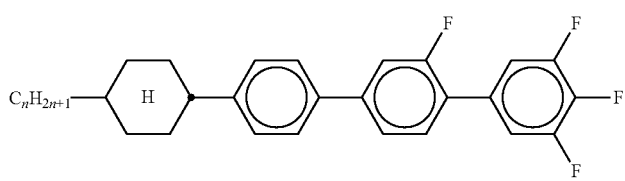
CPGU-n-F
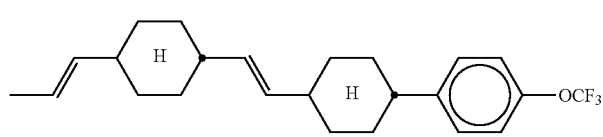
CVCP-1V-OT TABLE B-continued
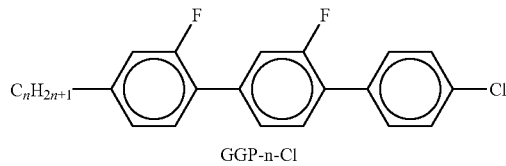
GGP-n-Cl
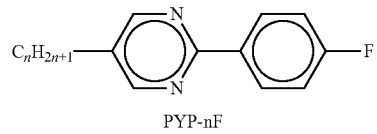
PYP-nF
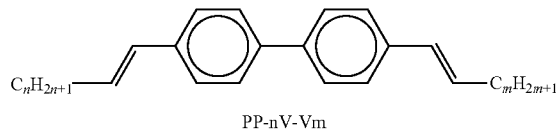
PP-nV-Vm
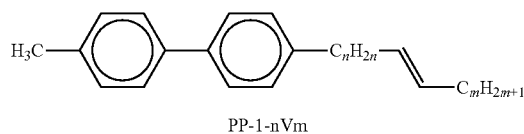
PP-1-nVm
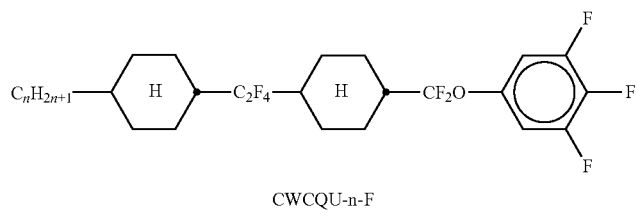
CWCQU-n-F
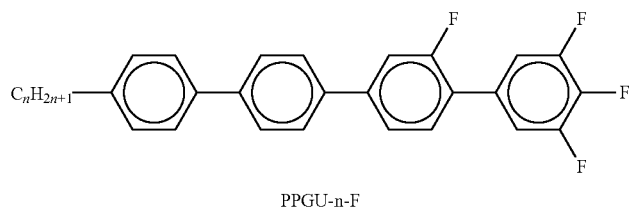
PPGU-n-F
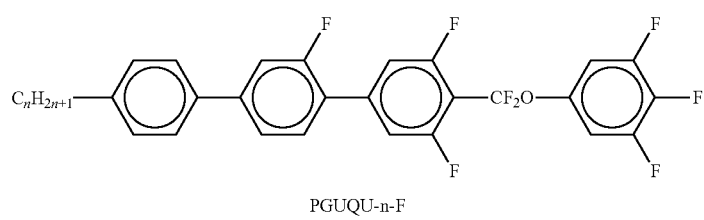
PGUQU-n-F
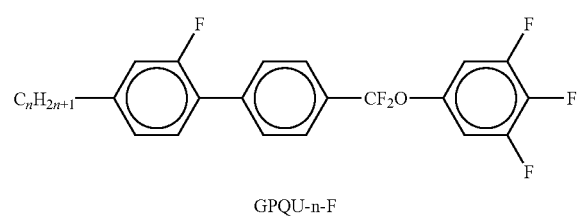
GPQU-n-F
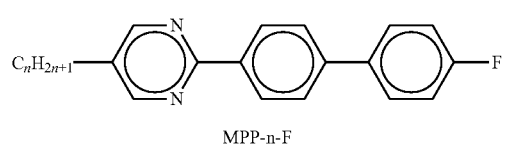
MPP-n-F TABLE B-continued
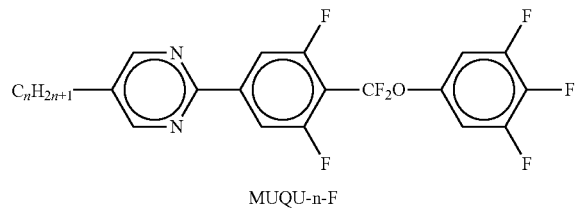
MUQU-n-F
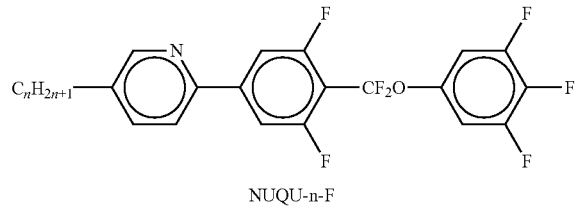
NUQU-n-F
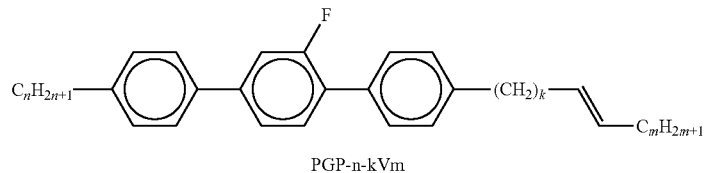
PGP-n-kVm
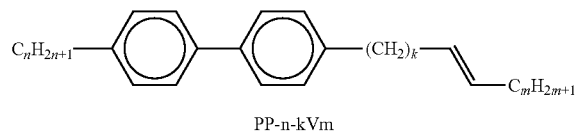
PP-n-kVm
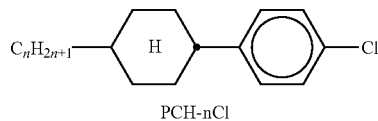
PCH-nCl
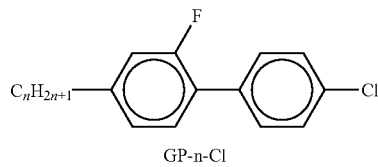
GP-n-Cl
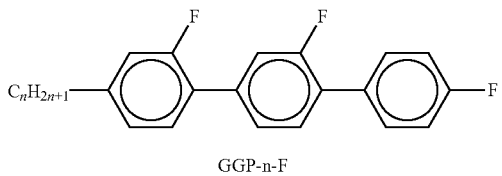
GGP-n-F
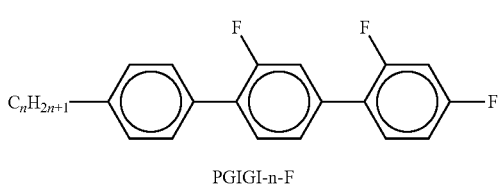
PGIGI-n-F TABLE B-continued

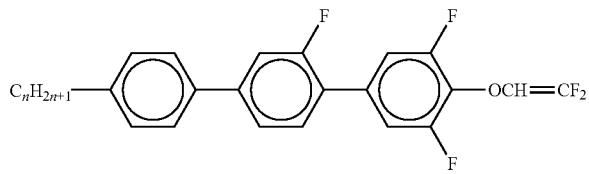

PGU-n-OXF (n = 1-15; (O)$C_nH_{2n+1}$ means $C_nH_{2n+1}$ or $OC_nH_{2n+1}$)

Particular preference is given to liquid-crystalline mixtures which, besides the compounds of the formula I, comprise at least one, two, three, four or more compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight, of dopants.

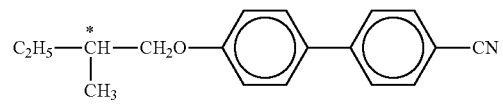

C 15

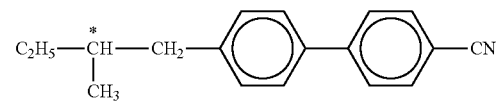

CB 15

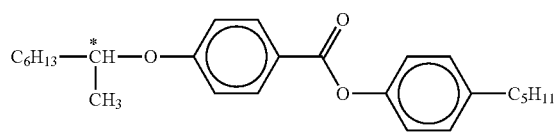

CM 21

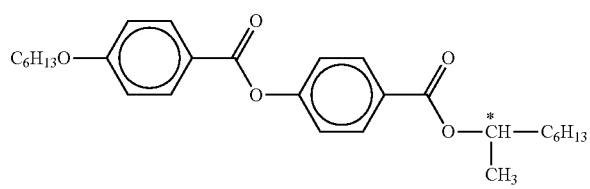

R/S-811

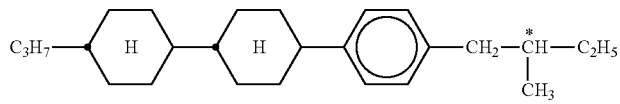

CM 44

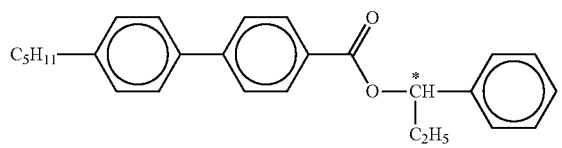

CM 45

TABLE C-continued
Table C indicates possible dopants which are generally added to the mixtures according to the invention. The mixtures preferably comprise 0-10% by weight, in particular 0.01-5% by weight and particularly preferably 0.01-3% by weight, of dopants.
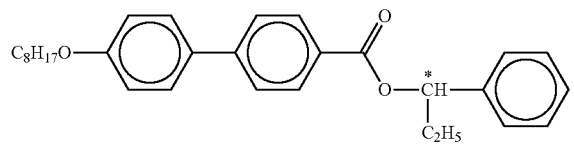
CM 47
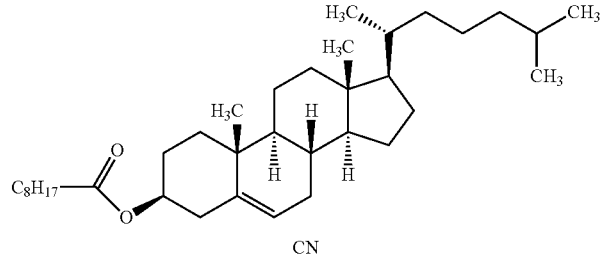
CN
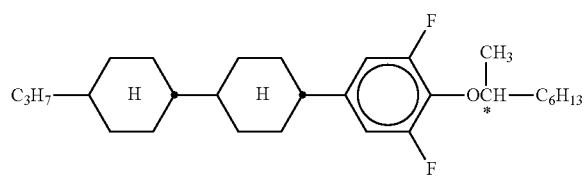
R/S-2011
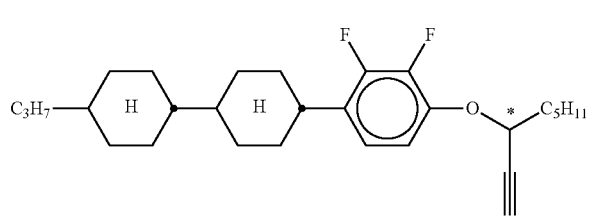
R/S-3011
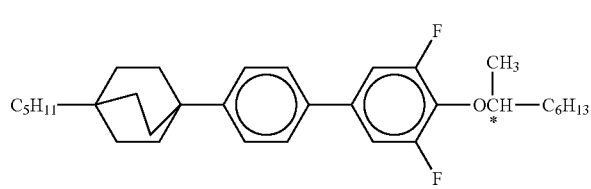
R/S-4011
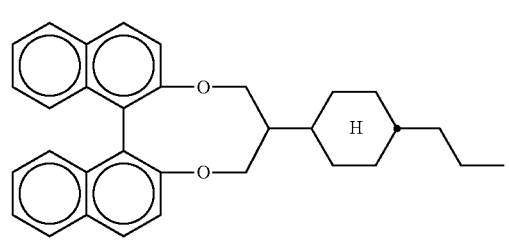
R/S-5011

TABLE C-continued

Table C indicates possible dopants which are generally added to the mixtures according to the invention. The mixtures preferably comprise 0-10% by weight, in particular 0.01-5% by weight and particularly preferably 0.01-3% by weight, of dopants.

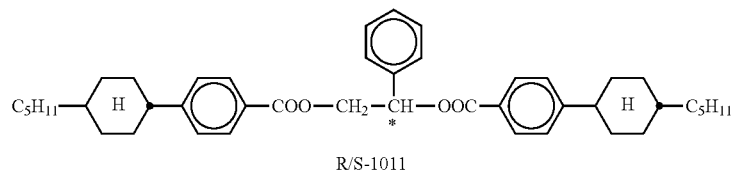

R/S-1011

TABLE D

Stabilisers which can be added, for example, to the mixtures according to the invention in amounts of 0-10% by weight are mentioned below.

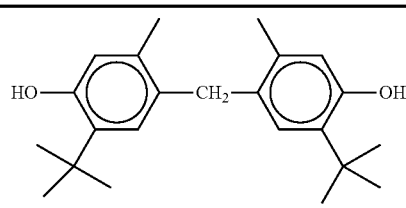

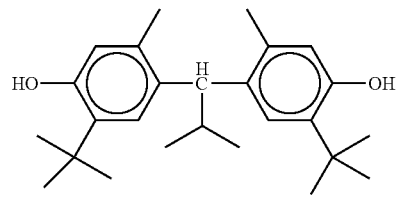

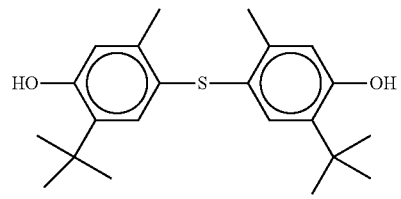

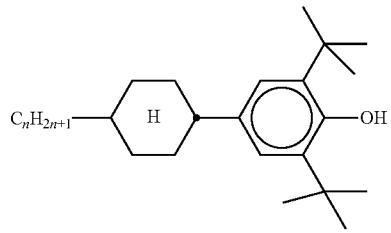

n = 1, 2, 3, 4, 5, 6 or 7

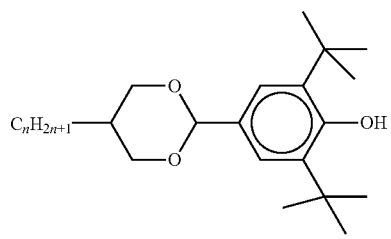

n = 1, 2, 3, 4, 5, 6 or 7

TABLE D-continued
Stabilisers which can be added, for example, to the mixtures according to the invention in amounts of 0-10% by weight are mentioned below.
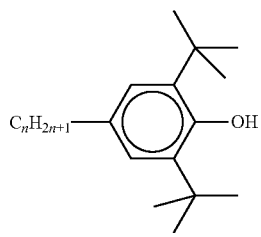
n = 1, 2, 3, 4, 5, 6 or 7
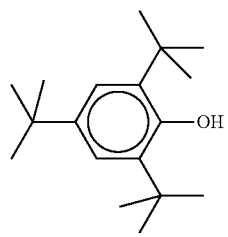
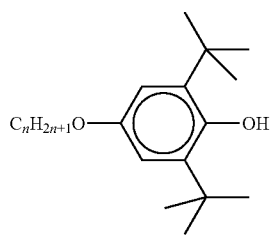
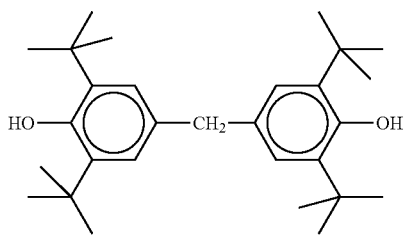
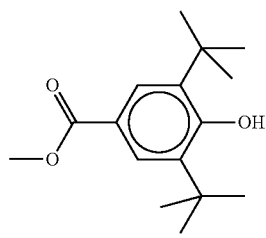
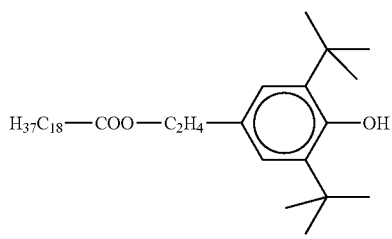

TABLE D-continued
Stabilisers which can be added, for example, to the mixtures according to the invention in amounts of 0-10% by weight are mentioned below.
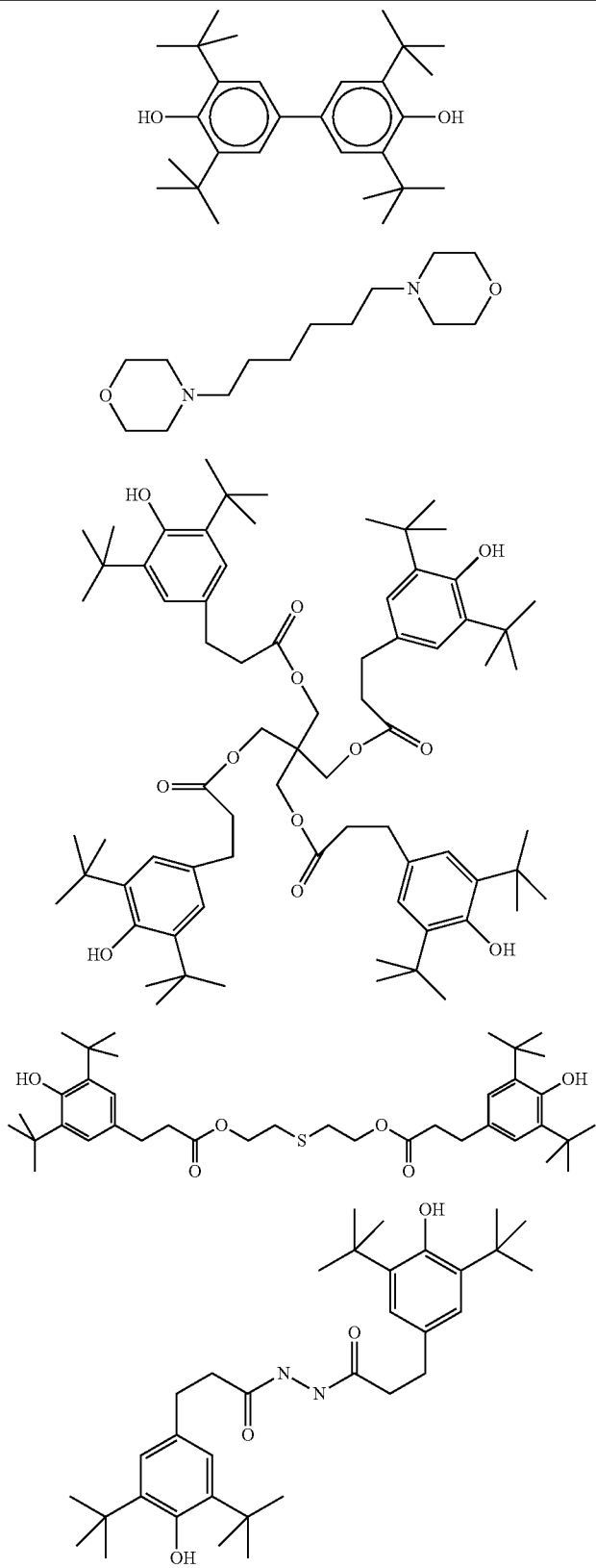

TABLE D-continued
Stabilisers which can be added, for example, to the mixtures according to the invention in amounts of 0-10% by weight are mentioned below.
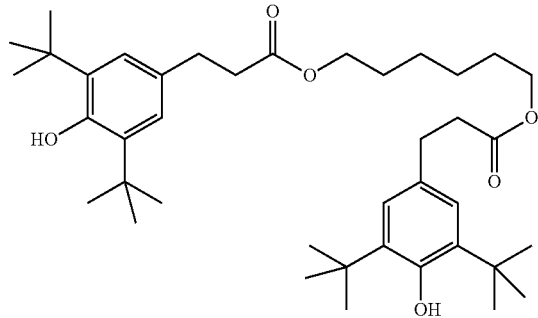 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
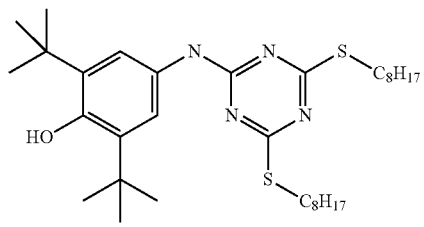
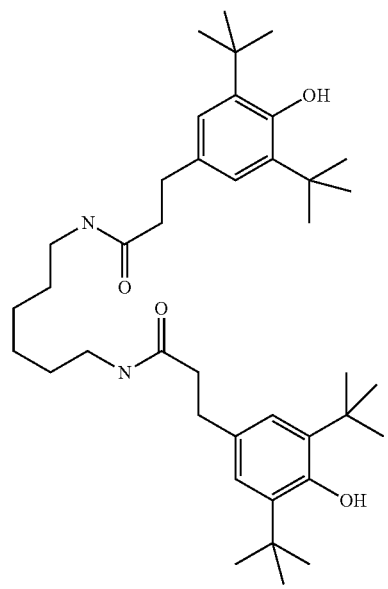 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE D-continued
Stabilisers which can be added, for example, to the mixtures according to the invention in amounts of 0-10% by weight are mentioned below.
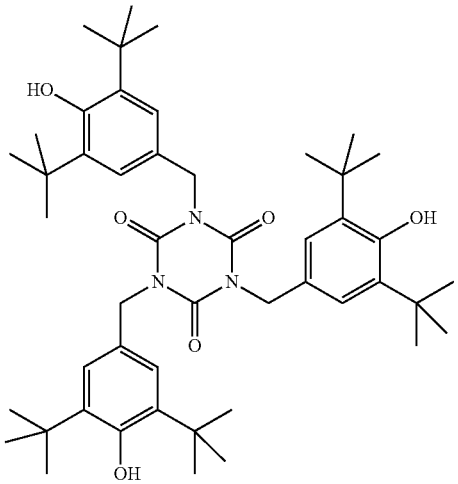 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
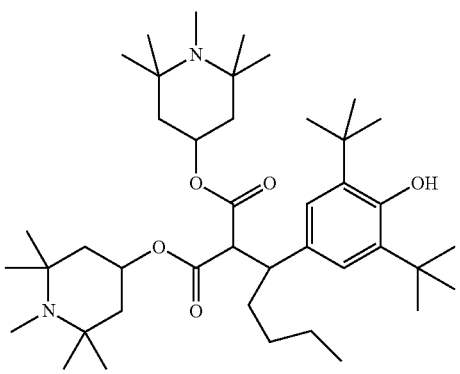 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
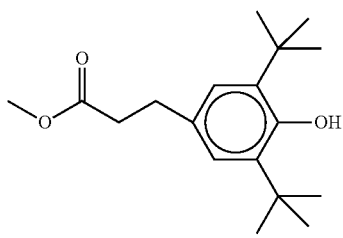
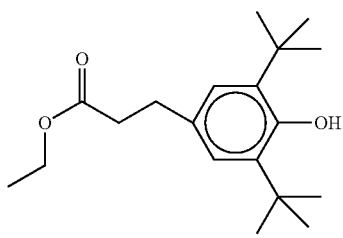
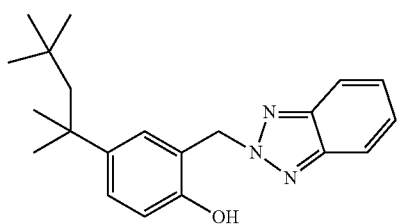 [SMILES: CC(C)(C)CC(C)(C)c1ccc(O)c(Cn2nc3ccccc3n2)c1]

TABLE D-continued
Stabilisers which can be added, for example, to the mixtures according to the invention in amounts of 0-10% by weight are mentioned below.
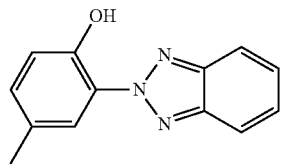 [SMILES: Cc1ccc(O)c(-n2nc3ccccc3n2)c1]
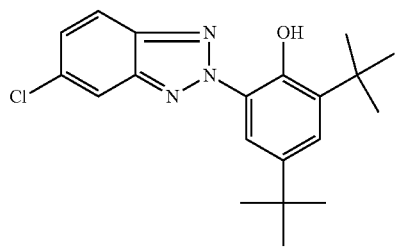 [SMILES: CC(C)(C)c1cc(-n2nc3ccc(Cl)cc3n2)c(O)c(C(C)(C)C)c1]
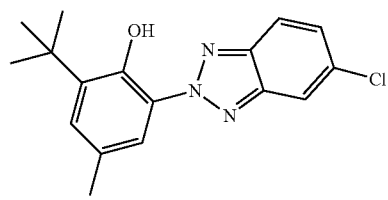 [SMILES: Cc1cc(-n2nc3ccc(Cl)cc3n2)c(O)c(C(C)(C)C)c1]
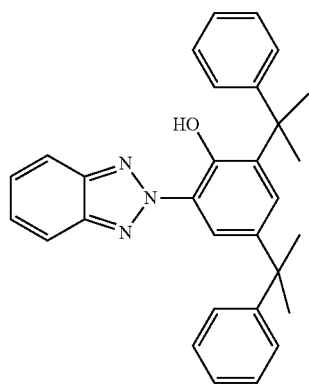 [SMILES: CC(C)(c1ccccc1)c1cc(-n2nc3ccccc3n2)c(O)c(C(C)(C)c2ccccc2)c1]
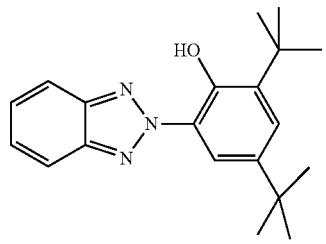 [SMILES: CC(C)(C)c1cc(-n2nc3ccccc3n2)c(O)c(C(C)(C)C)c1]
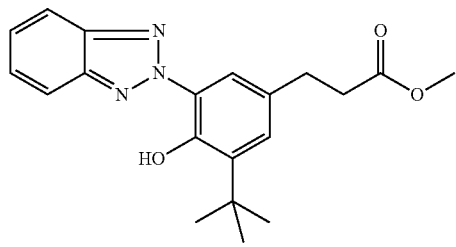 [SMILES: COC(=O)CCc1cc(-n2nc3ccccc3n2)c(O)c(C(C)(C)C)c1]

TABLE D-continued
Stabilisers which can be added, for example, to the mixtures according to the invention in amounts of 0-10% by weight are mentioned below.
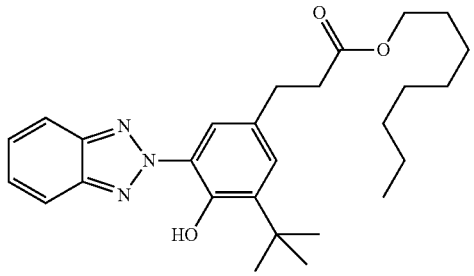 [SMILES: CCCCCCCCOC(=O)CCc1cc(-n2nc3ccccc3n2)c(O)c(C(C)(C)C)c1]
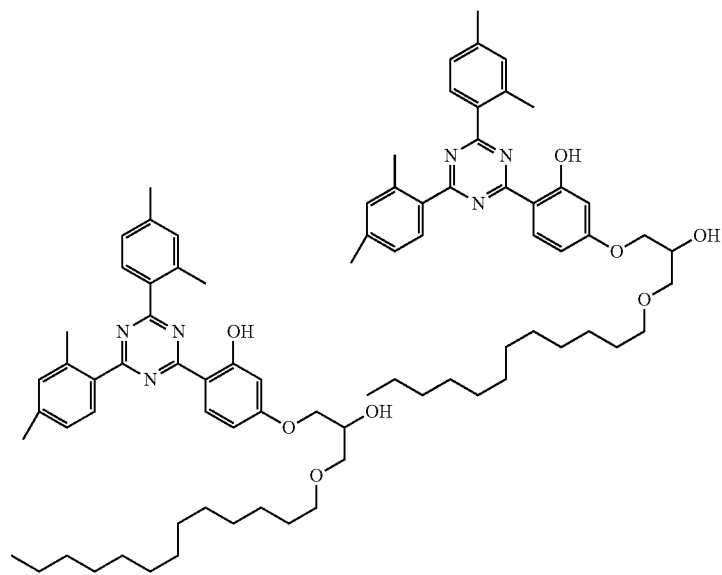
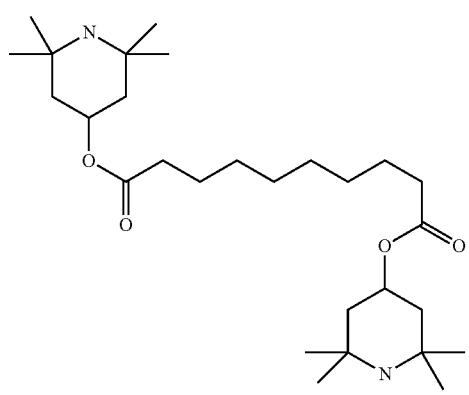

TABLE D-continued
Stabilisers which can be added, for example, to the mixtures according to the invention in amounts of 0-10% by weight are mentioned below.
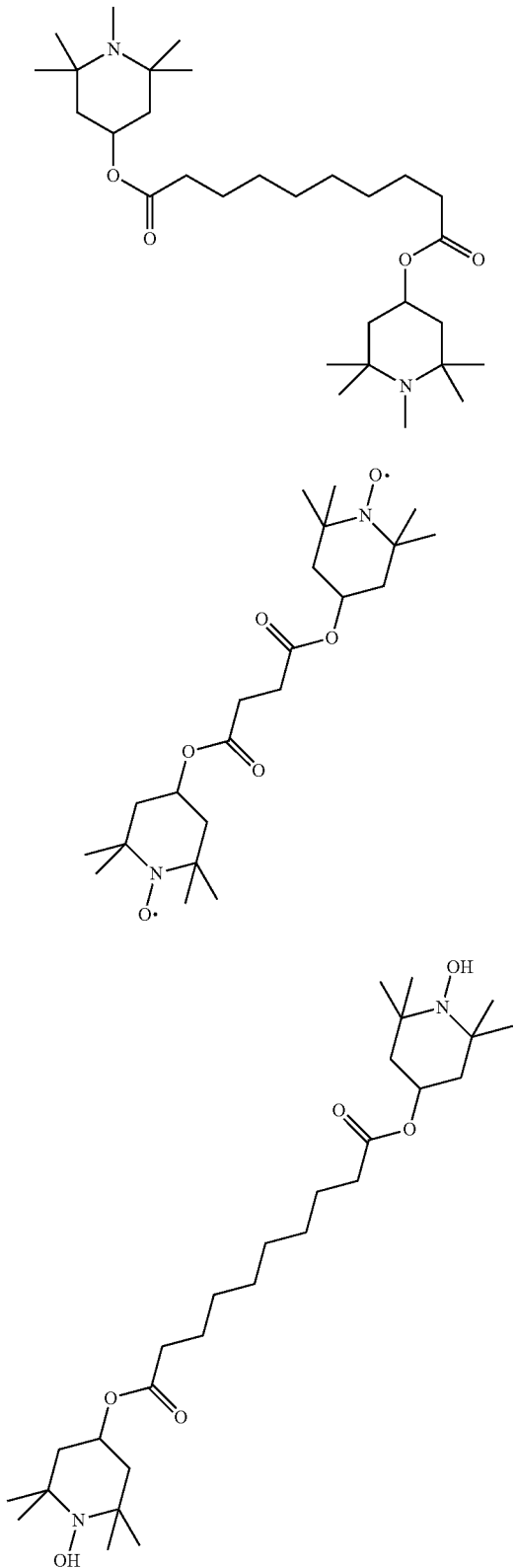

TABLE E

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

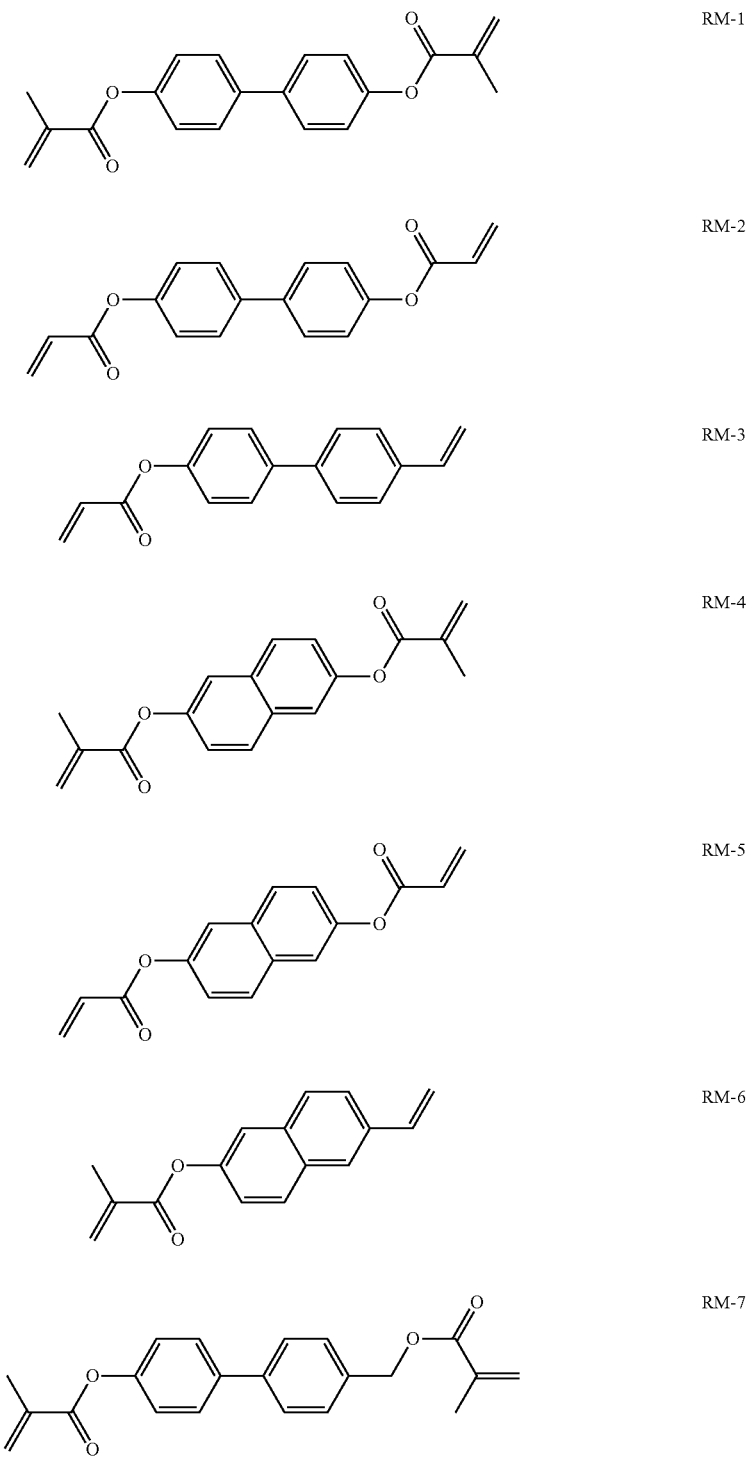

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

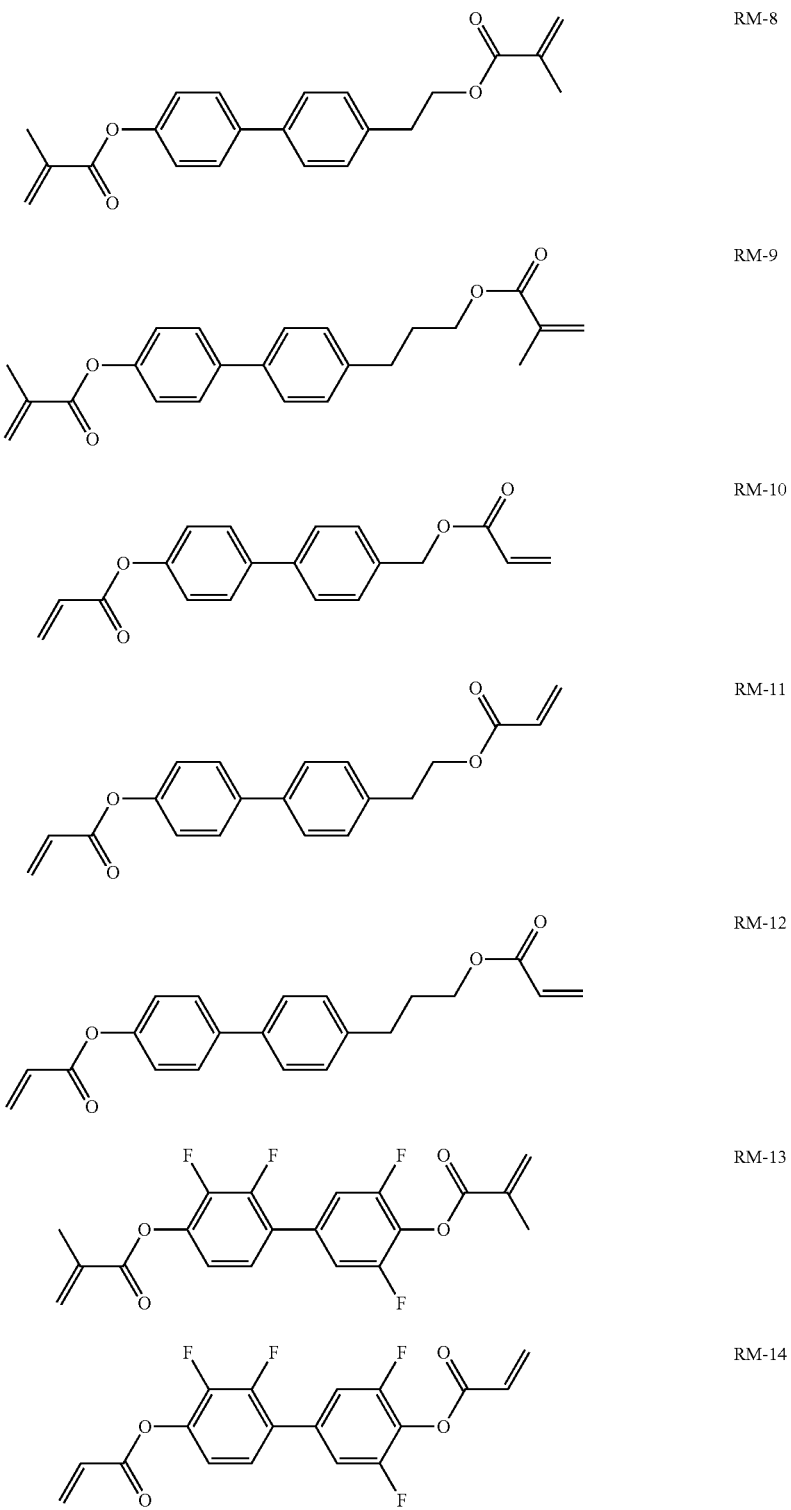

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

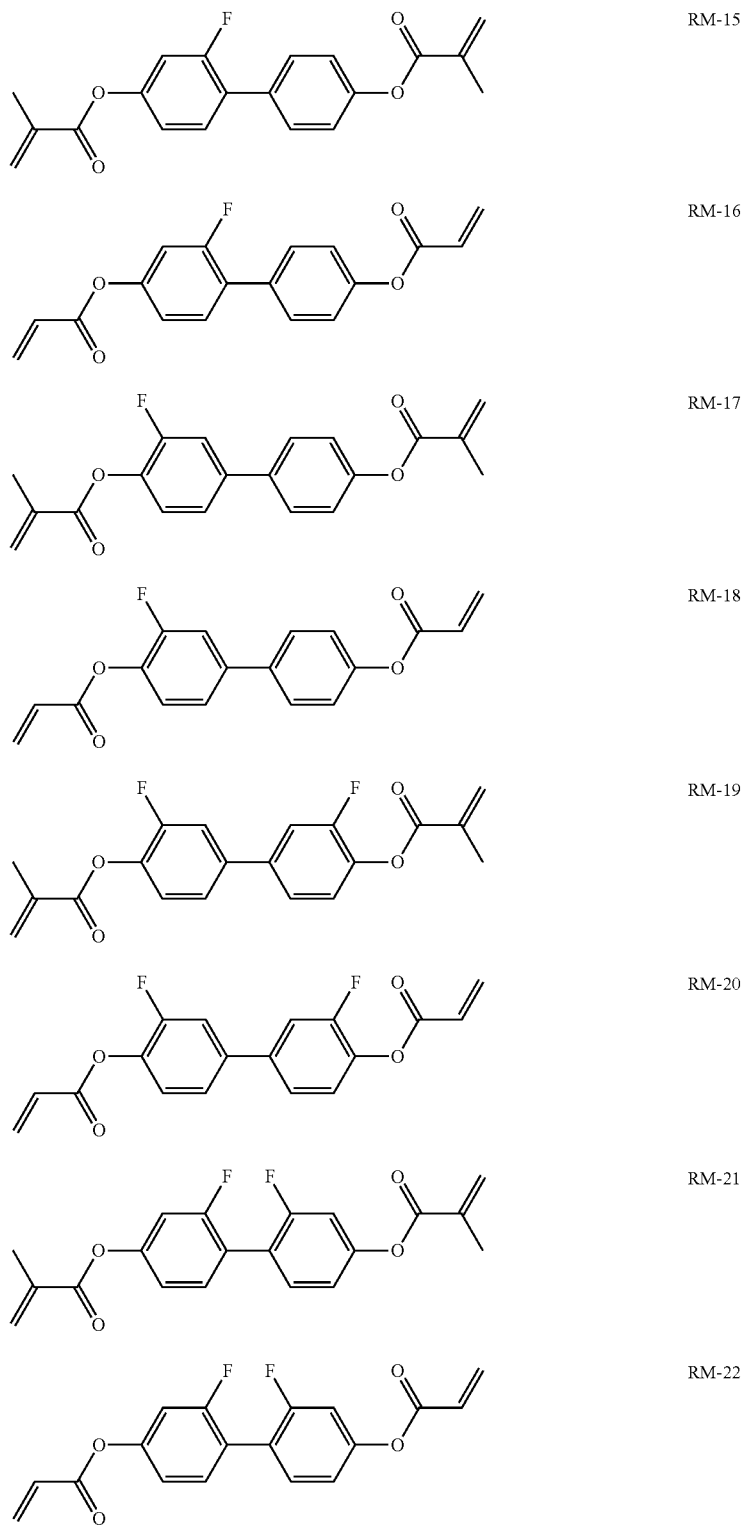

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

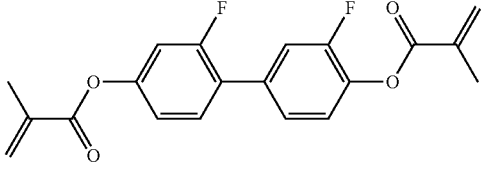 RM-23

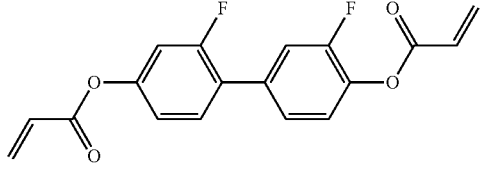 RM-24

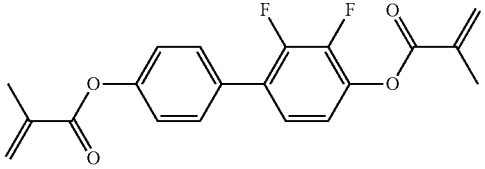 RM-25

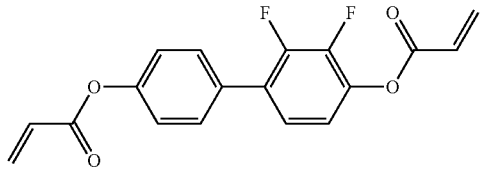 RM-26

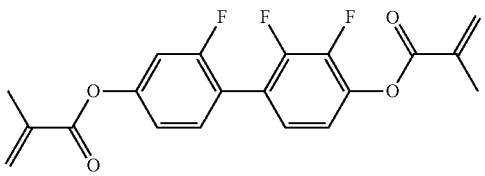 RM-27

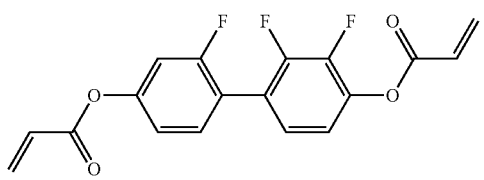 RM-28

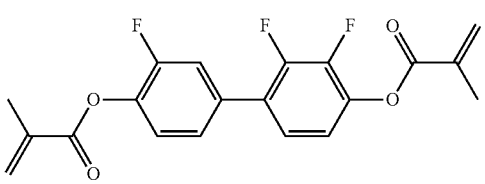 RM-29

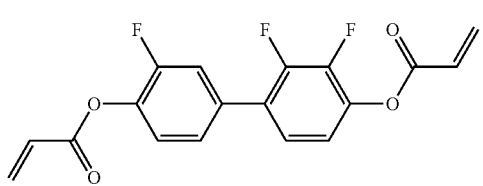 RM-30

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

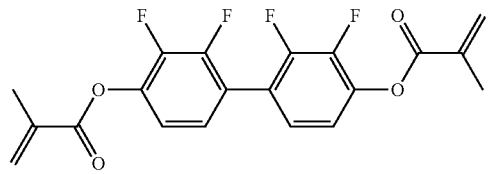

RM-31

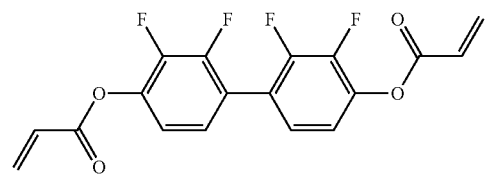

RM-32

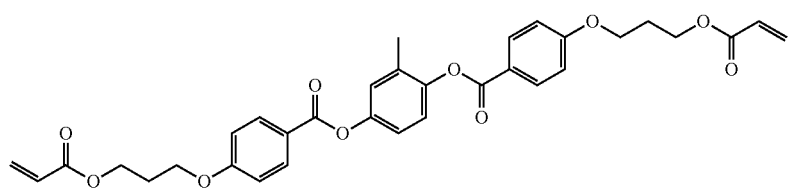

RM-33

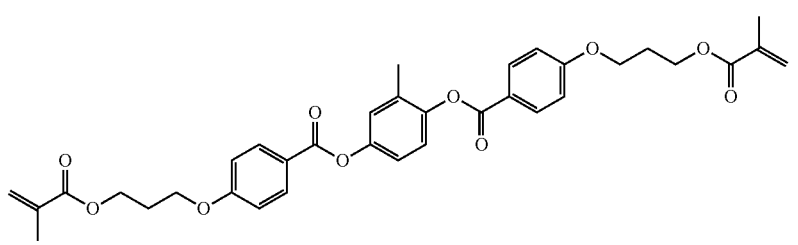

RM-34

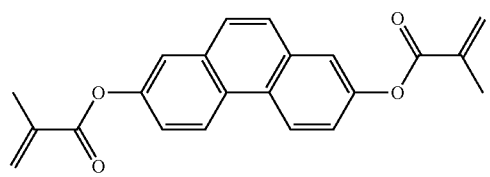

RM-35

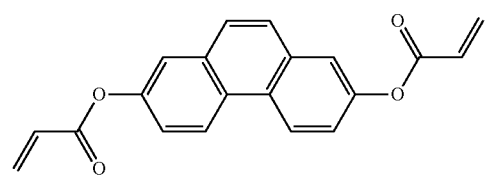

RM-36

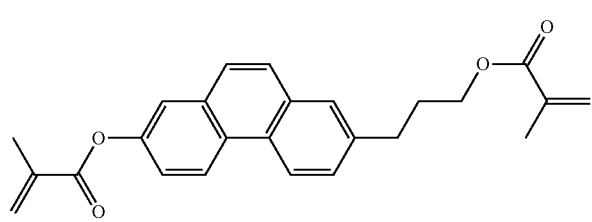

RM-37

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

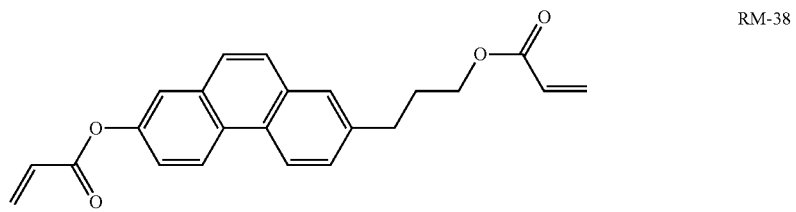

RM-38

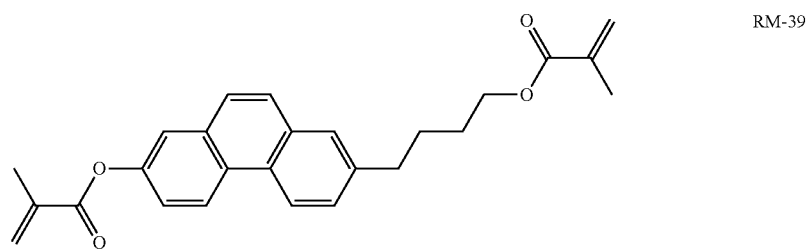

RM-39

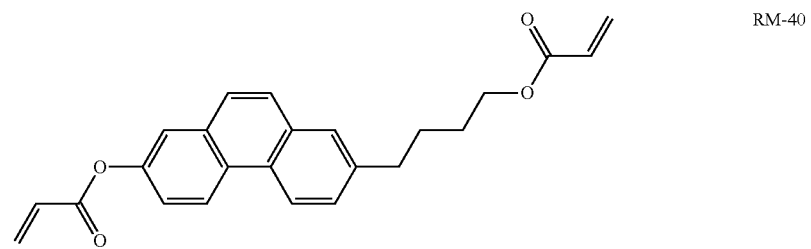

RM-40

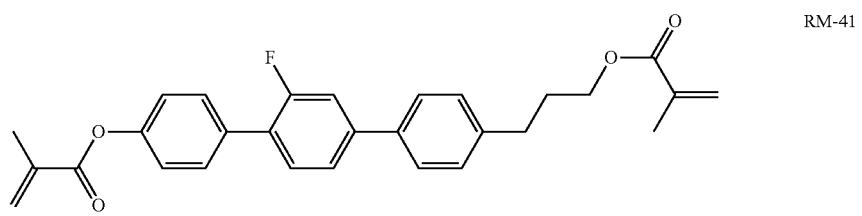

RM-41

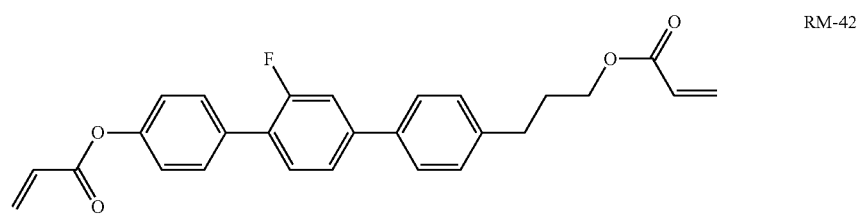

RM-42

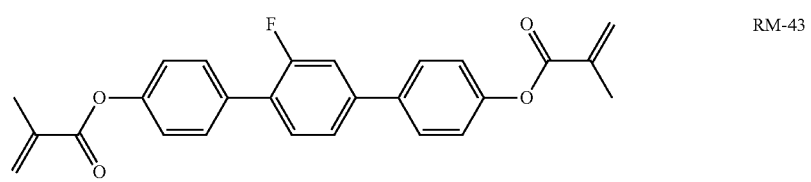

RM-43

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

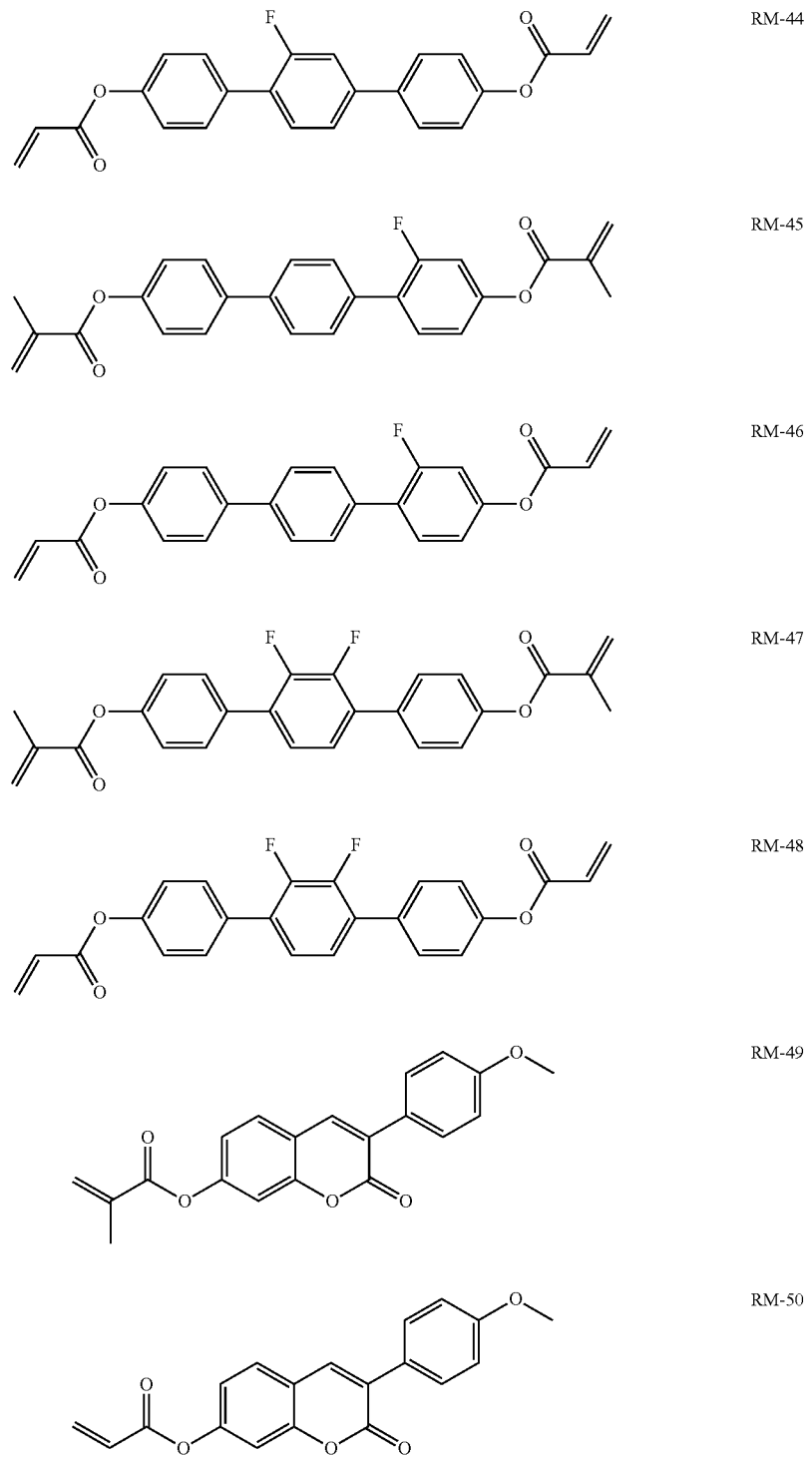

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

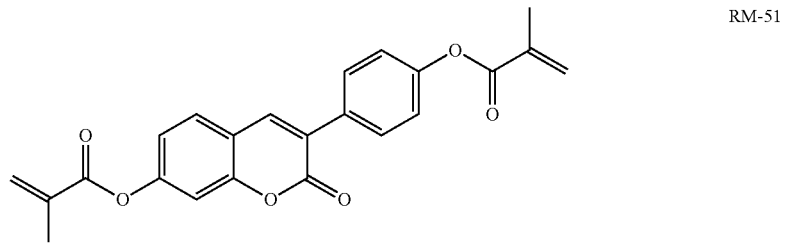

RM-51

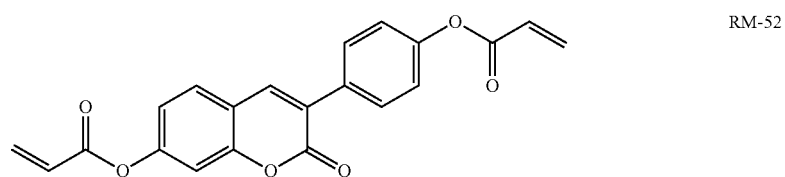

RM-52

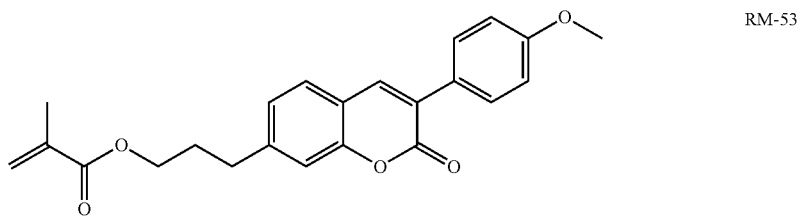

RM-53

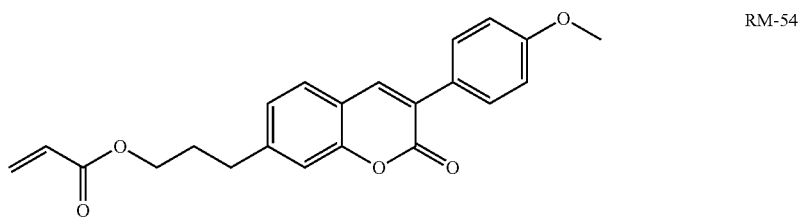

RM-54

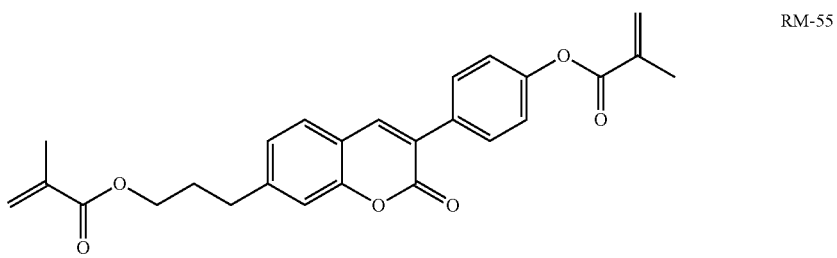

RM-55

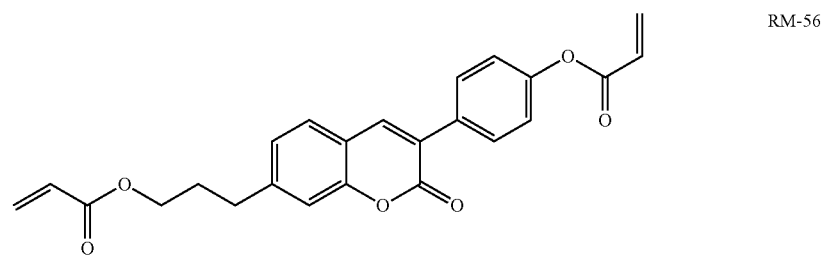

RM-56

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

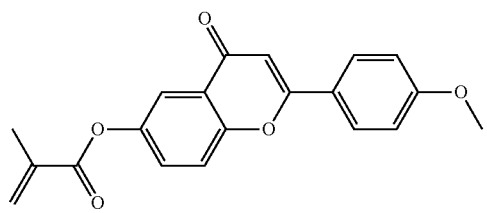

RM-57

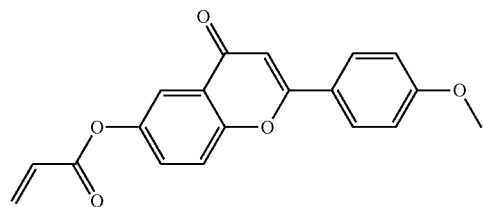

RM-58

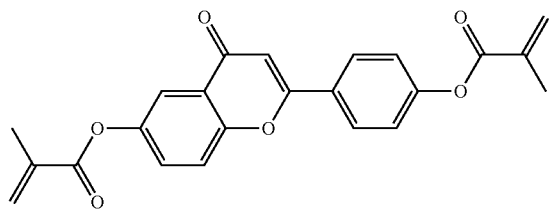

RM-59

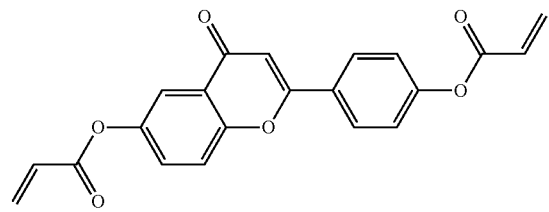

RM-60

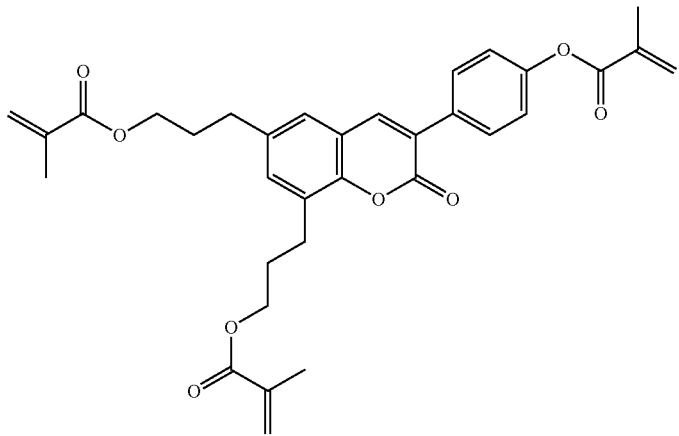

RM-61

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

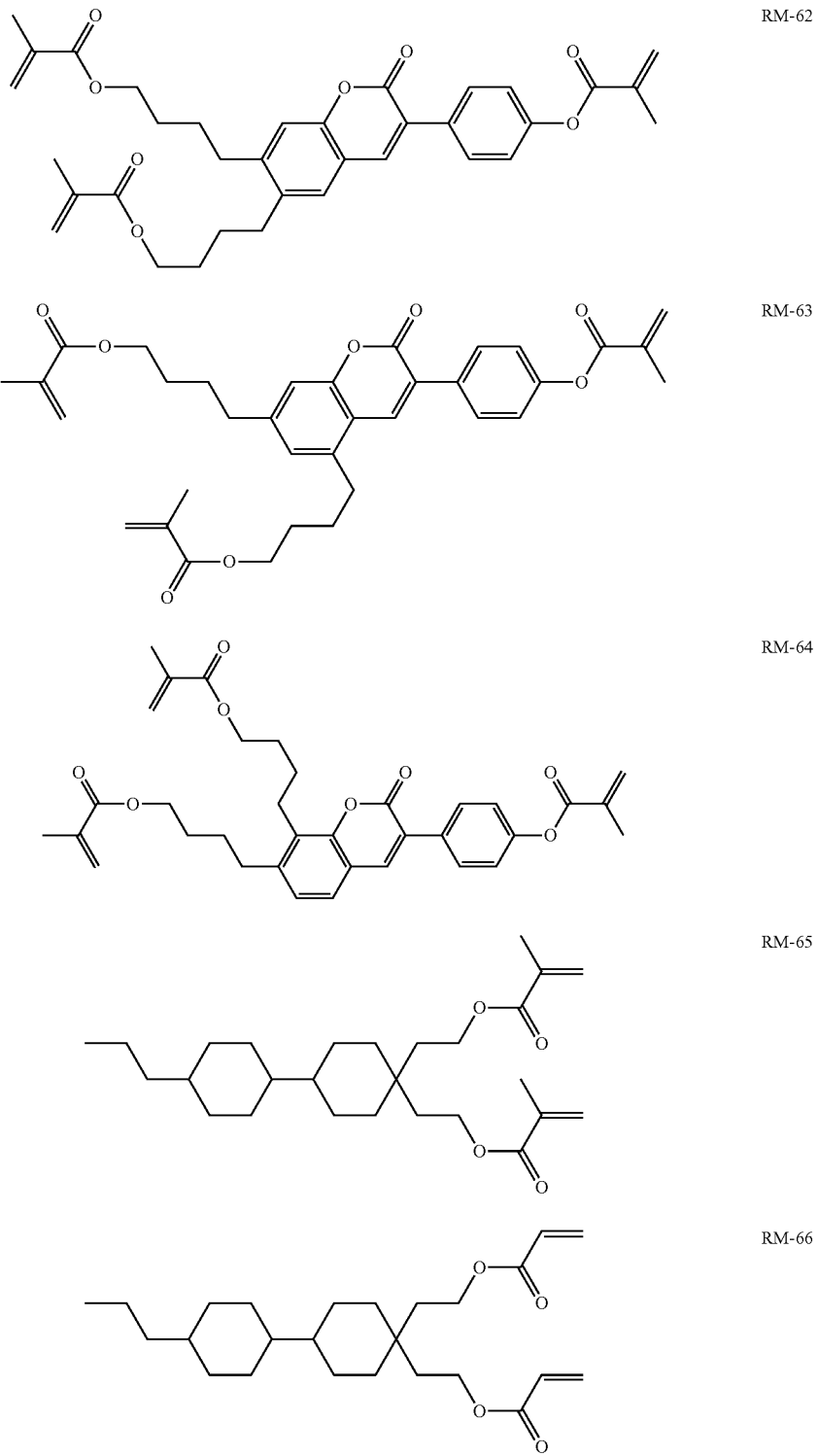

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

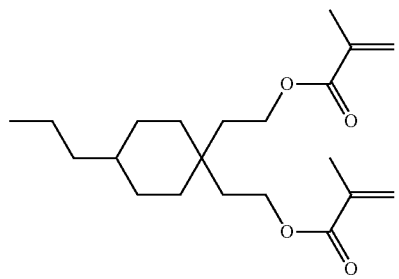

RM-67

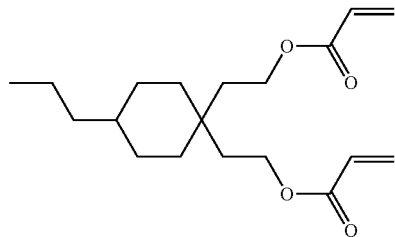

RM-68

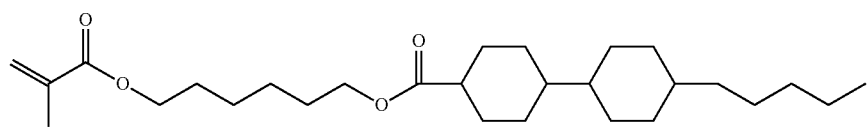

RM-69

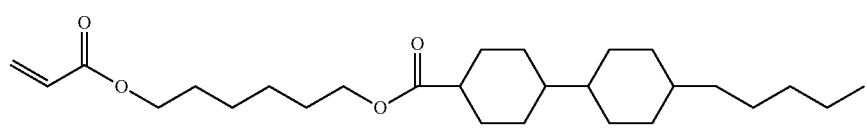

RM-70

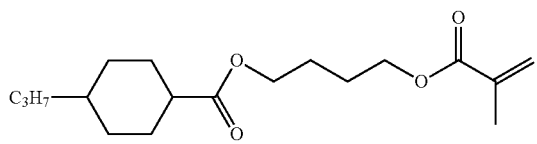

RM-71

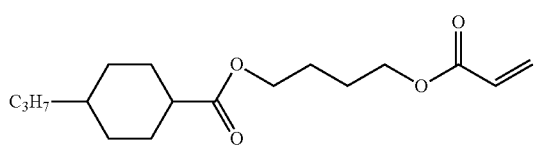

RM-72

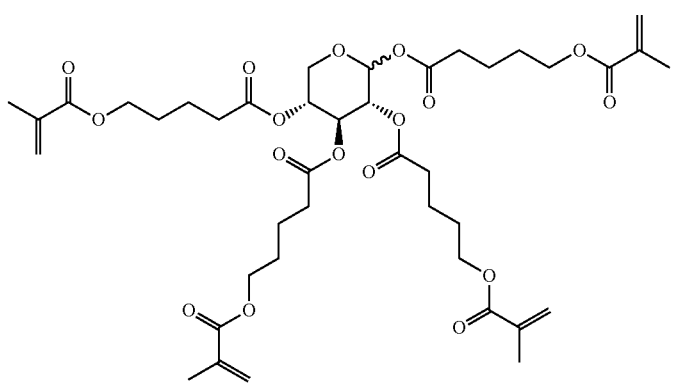

RM-73

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

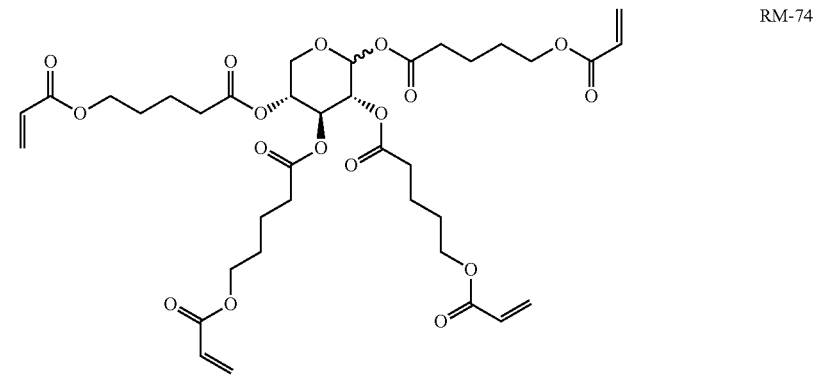

RM-74

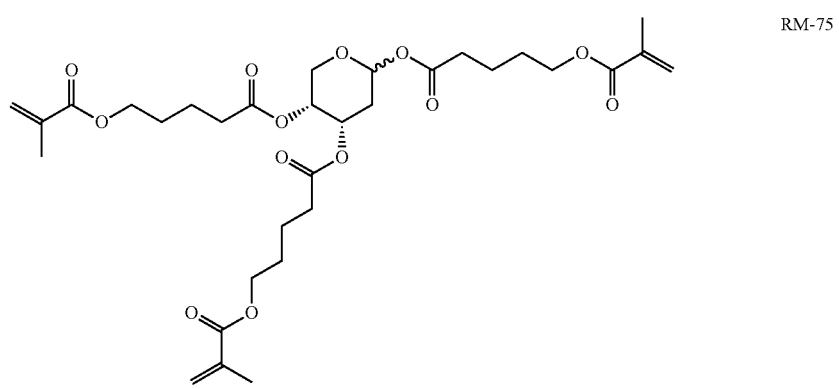

RM-75

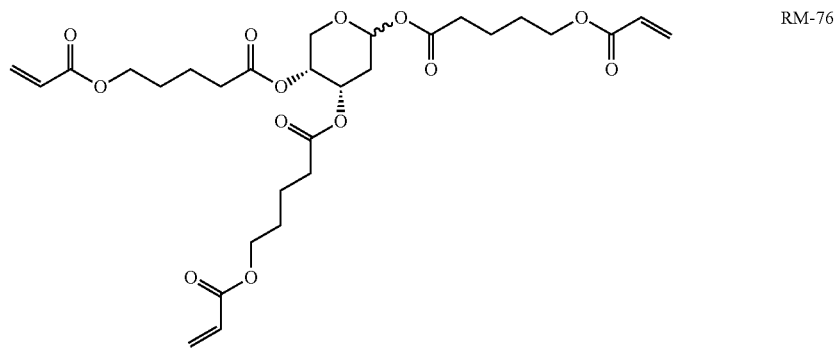

RM-76

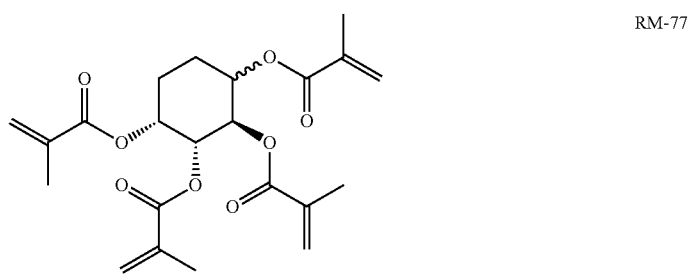

RM-77

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

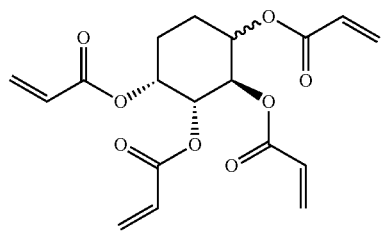

RM-78

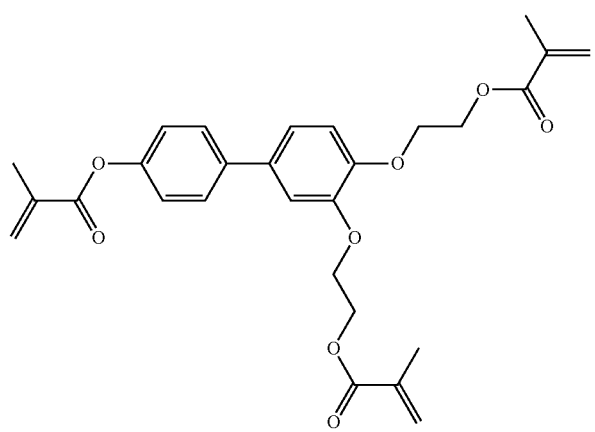

RM-79

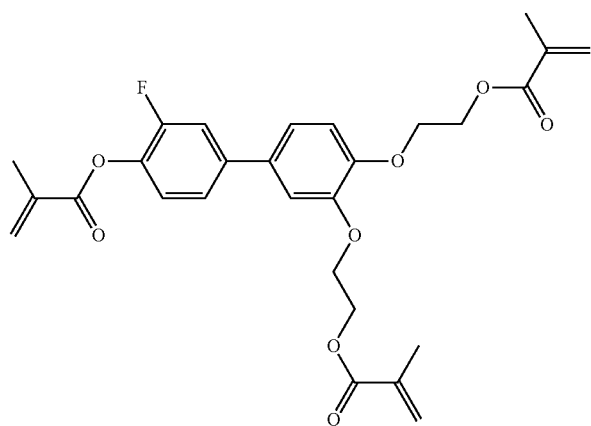

RM-80

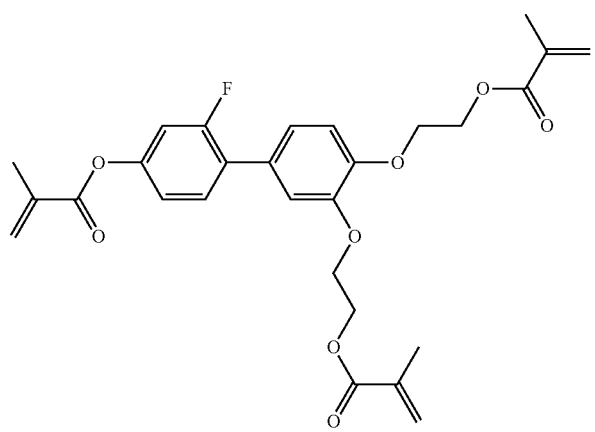

RM-81

TABLE E-continued

Table E shows illustrative compounds which can be used in the LC media in accordance with the present invention, preferably as reactive mesogenic compounds. If the mixtures according to the invention comprise one or more reactive compounds, they are preferably employed in amounts of 0.01-5% by weight. It may be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

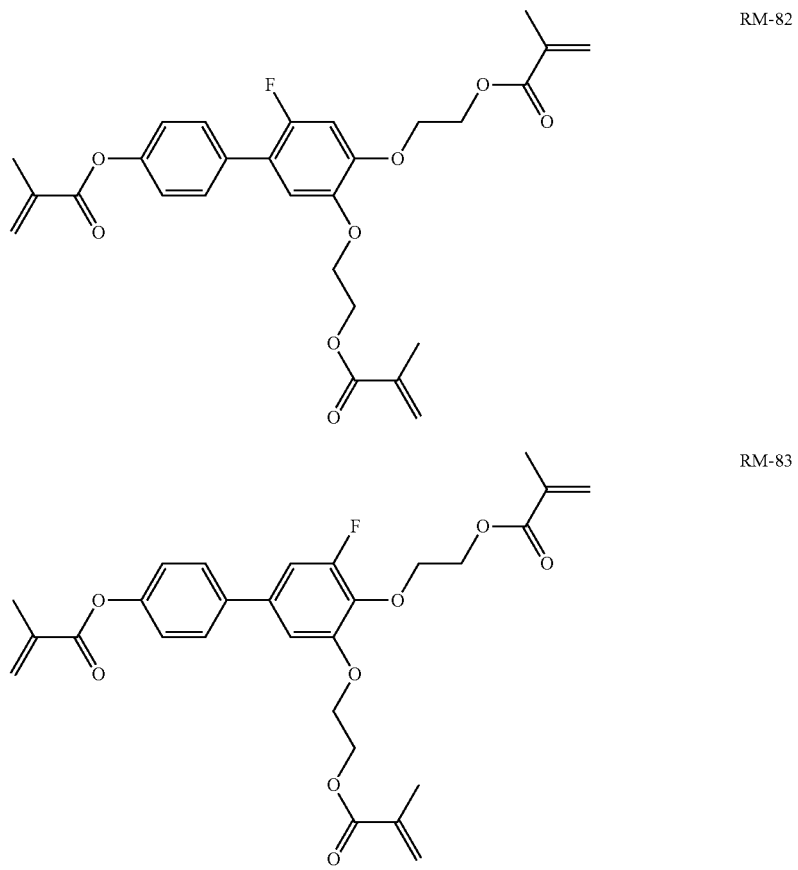

In a preferred embodiment, the mixtures according to the invention comprise one or more polymerisable compounds, preferably selected from the polymerisable compounds of the formulae RM-1 to RM-83. Media of this type are particularly suitable for PS-FFS and PS-IPS applications. Of the reactive mesogens mentioned in Table E, compounds RM-1, RM-2, RM-3, RM-4, RM-5, RM-11, RM-17, RM-35, RM-41, RM-61 and RM-80 are particularly preferred.

Without further elaboration, it is believed that one skilled in the art can, using the preceding description, utilize the present invention to its fullest extent. The preceding and following preferred specific embodiments are, therefore, to be construed as merely illustrative, and not limitative of the remainder of the disclosure in any way whatsoever.

EXAMPLES

The following working examples are intended to explain the invention without restricting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, $V_o$ denotes threshold voltage, capacitive [V] at 20° C.

$\Delta n$ denotes the optical anisotropy measured at 20° C. and 589 nm $\Delta \epsilon$ denotes the dielectric anisotropy at 20° C. and 1 kHz cp. denotes clearing point [° C.]

$K_1$ denotes elastic constant, "splay" deformation at 20° C., [pN]

$K_3$ denotes elastic constant, "bend" deformation at 20° C., [pN]

$\gamma_1$ denotes rotational viscosity measured at 20° C. [mPa·s], determined by the rotation method in a magnetic field LTS denotes low-temperature stability (nematic phase), determined in test cells.

Synthesis Examples

"Conventional work-up" means: water is added if necessary, the mixture is extracted with methylene chloride, diethyl ether, methyl tert-butyl ether or toluene, the phases are separated, the organic phase is dried and evaporated, and the product is purified by distillation under reduced pressure or crystallisation and/or chromatography.

Example 1

The compound of the formula

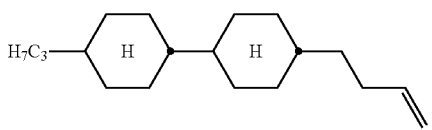

is prepared in accordance with the following scheme:

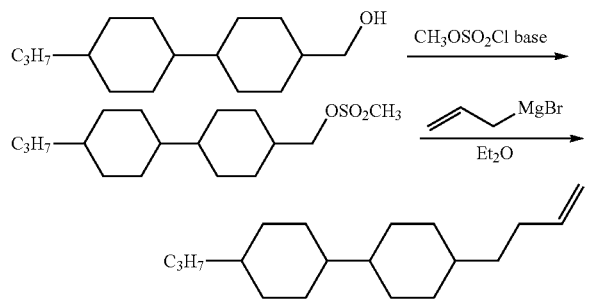

C 20 $S_B$ 74 N 78 I; $\Delta n=0.057$; $\Delta\epsilon=-0.82$; $\gamma_1=28$ mPa·s;
The following compounds

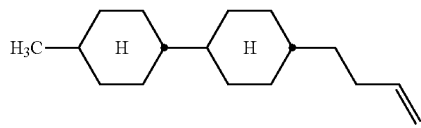

C -27 $S_B$ 15N 17.8 I; $\Delta n = 0.05$; $\Delta\epsilon = -0.75$;
$\gamma_1 = 25$ mPa·s

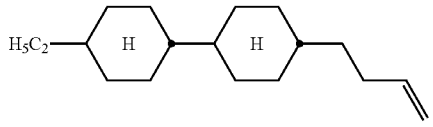

C ? -36 $S_B$ 55 I; $\Delta n = 0.05$; $\Delta\epsilon = -0.51$;
$\gamma_1 = 25$ mPa·s

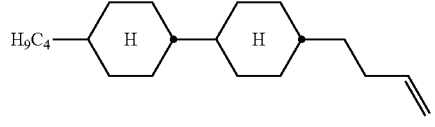

C -17 $S_B$ 87 I; $\Delta n = 0.05$; $\Delta\epsilon = -1.39$;
$\gamma_1 = 39$

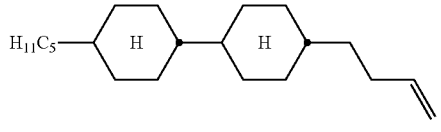

C 4 $S_B$ 93 I are prepared analogously.

Mixture Examples

The electro-optical data are measured in a TN cell at the 1st minimum (i.e. at a d·$\Delta n$ value of 0.5 µm) at 20° C., unless expressly indicated otherwise. The optical data are measured at 20° C., unless expressly indicated otherwise. All physical properties are determined in accordance with "Merck Liquid Crystals, Physical Properties of Liquid Crystals" Status November 1997, Merck KGaA, Germany, and apply for a temperature of 20° C., unless explicitly indicated otherwise.

Example M1

| | | | |
|---|---|---|---|
| CC-3-V | 10.00% | Clearing point [° C.]: | 100.0 |
| CC-3-V1 | 12.00% | $\Delta n$ [589 nm, 20° C.] | 0.1014 |
| CC-3-2V | 12.00% | $\Delta\epsilon$ [kHz, 20° C.]: | +8.7 |
| CC-3-2V1 | 11.00% | $\gamma_1$ [mPa · s, 20° C.]: | 100 |
| CCGU-3-F | 6.00% | $K_1$ [20° C.]: | 21.9 |
| APUQU-2-F | 7.00% | $K_3$ [20° C.]: | 22.2 |
| APUQU-3-F | 12.00% | $V_0$ [V]: | 1.67 |
| CCP-30CF$_3$ | 6.00% | | |
| CCP-40CF$_3$ | 5.00% | | |
| PP-1-2V1 | 6.00% | | |
| ECCP-30CF$_3$ | 5.00% | | |
| ECCP-50CF$_3$ | 5.00% | | |
| PGUQU-3-F | 3.00% | | |

Example M2

| | | | |
|---|---|---|---|
| CC-3-V | 14.00% | Clearing point [° C.]: | 104.5 |
| CC-3-V1 | 14.00% | $\Delta n$ [589 nm, 20° C.] | 0.1019 |
| CC-3-2V | 12.00% | $\Delta\epsilon$ [kHz, 20° C.]: | +8.8 |
| CC-3-2V1 | 12.00% | $\gamma_1$ [mPa · s, 20° C.]: | 108 |
| CCGU-3-F | 7.00% | $K_1$ [20° C.]: | 20.6 |
| APUQU-2-F | 7.00% | $K_3$ [20° C.]: | 21.2 |
| APUQU-3-F | 13.00% | $V_0$ [V]: | 1.62 |
| PP-1-2V1 | 3.00% | | |
| ECCP-30CF$_3$ | 5.00% | | |
| ECCP-50CF$_3$ | 5.00% | | |
| PGUQU-3-F | 4.00% | | |
| CBC-33 | 4.00% | | |

Example M3

For the preparation of a PS-IPS mixture, 0.25% of compound RM-1

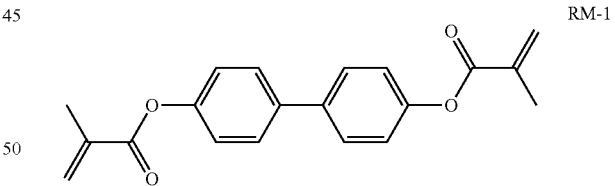

is added to mixture M2.

Example M4

| | | | |
|---|---|---|---|
| CC-3-V | 25.00% | Clearing point [° C.]: | 91.50 |
| CC-3-V1 | 11.00% | $\Delta n$ [589 nm, 20° C.] | 0.1047 |
| CC-3-2V | 11.00% | $\Delta\epsilon$ [kHz, 20° C.]: | +10.3 |
| CCQU-3-F | 22.50% | $\gamma_1$ [mPa · s, 20° C.]: | 86 |
| PGUQU-3-F | 3.00% | $K_1$ [20° C.]: | 14.4 |
| PGUQU-4-F | 9.50% | $K_3$ [20° C.]: | 17.1 |
| PGUQU-5-F | 5.50% | $V_0$ [V]: | 1.25 |
| CPPQU-3-F | 12.50% | | |

Example M5

For the preparation of a PS-FFS mixture, 0.25% of compound RM-1

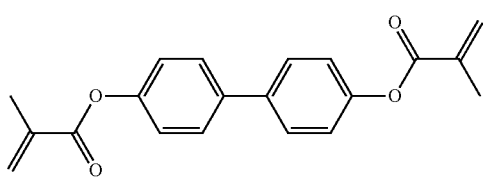 [SMILES: C=C(C)C(=O)Oc1ccc(-c2ccc(OC(=O)C(=C)C)cc2)cc1]

RM-1 is added to mixture M4.

Example M6

| | | | |
|---|---|---|---|
| CC-3-V | 28.00% | Clearing point [° C.]: | 90.5 |
| CC-3-2V | 10.00% | S → N transition: | |
| CCP-V-1 | 4.00% | Δn [589 nm, 20° C.] | 0.1205 |
| CCP-V2-1 | 7.00% | Δε [kHz, 20° C.]: | +16.1 |
| PP-1-2V1 | 1.00% | γ₁ [mPa · s, 20° C.]: | 102 |
| PGP-2-2V | 3.00% | $K_1$ [20° C.]: | 14.5 |
| PUQU-3-F | 9.00% | $K_3$ [20° C.]: | 15.2 |
| APUQU-3-F | 10.00% | $V_0$ [V]: | 1.01 |
| PGUQU-3-F | 5.00% | LTS (bulk) [−25° C.]: | >1000 h |
| PGUQU-4-F | 5.00% | | |
| PGUQU-5-F | 4.00% | | |
| CDUQU-3-F | 7.00% | | |
| DPGU-4-F | 7.00% | | |

Example M7

| | | | |
|---|---|---|---|
| CC-3-V | 30.00% | Clearing point [° C.]: | 89.0 |
| CC-3-V1 | 10.00% | Δn [589 nm, 20° C.] | 0.1098 |
| PGP-2-2V | 3.00% | Δε [kHz, 20° C.]: | +19.1 |
| APUQU-2-F | 10.00% | γ₁ [mPa · s, 20° C.]: | 104 |
| APUQU-3-F | 9.00% | $K_1$ [20° C.]: | 14.4 |
| PGUQU-4-F | 7.00% | $K_3$ [20° C.]: | 14.9 |
| DGUQU-4-F | 8.00% | $V_0$ [V]: | 0.92 |
| CDUQU-3-F | 10.00% | | |
| DPGU-4-F | 6.00% | | |
| CC-3-2V | 7.00% | | |

Example M8

For the preparation of a PS-FFS mixture, 0.3% of compound RM-41

RM-41

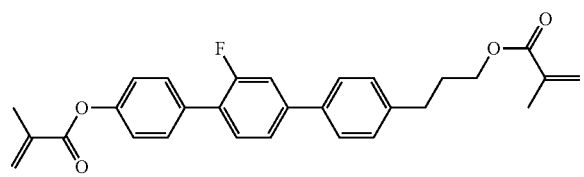

is added to mixture M7.

Example M9

| | | | |
|---|---|---|---|
| CC-3-V | 32.00% | Clearing point [° C.]: | 89.5 |
| CC-3-V1 | 11.00% | Δn [589 nm, 20° C.] | 0.1083 |
| CC-3-2V | 8.00% | Δε [kHz, 20° C.]: | +15.4 |
| CCP-V2-1 | 6.00% | γ₁ [mPa · s, 20° C.]: | 92 |
| APUQU-2-F | 7.00% | $K_1$ [20° C.]: | 14.5 |
| APUQU-3-F | 8.00% | $K_3$ [20° C.]: | 15.5 |
| PGUQU-3-F | 3.00% | $V_0$ [V]: | 1.03 |
| PGUQU-4-F | 7.00% | | |
| PGUQU-5-F | 3.00% | | |
| DPGU-4-F | 7.00% | | |
| DGUQU-4-F | 8.00% | | |

Example M10

| | | | |
|---|---|---|---|
| CC-3-V | 27.50% | Clearing point [° C.]: | 85.5 |
| CC-3-V1 | 11.00% | Δn [589 nm, 20° C.] | 0.1092 |
| CC-3-2V1 | 7.00% | Δε [kHz, 20° C.]: | +17.6 |
| CC-3-2V | 3.50% | γ₁ [mPa · s, 20° C.]: | 92 |
| PGP-2-2V | 1.00% | $K_1$ [20° C.]: | 14.5 |
| CCP-3OCF₃ | 6.00% | $K_3$ [20° C.]: | 14.7 |
| PUQU-3-F | 4.00% | $V_0$ [V]: | 0.96 |
| APUQU-2-F | 6.00% | | |
| APUQU-3-F | 6.50% | | |
| PGUQU-3-F | 3.50% | | |
| PGUQU-4-F | 7.00% | | |
| DPGU-4-F | 6.00% | | |
| DGUQU-2-F | 3.50% | | |
| DGUQU-4-F | 7.50% | | |

Example M11

For the preparation of a PS-FFS mixture, 0.2% of compound RM-61

RM-61

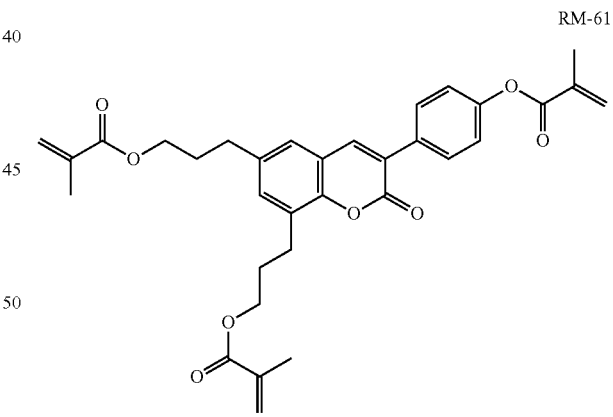

is added to mixture M10.

Example M12

| | | | |
|---|---|---|---|
| CC-3-V | 27.50% | Clearing point [° C.]: | 85.0 |
| CC-3-V1 | 8.00% | Δn [589 nm, 20° C.] | 0.1093 |
| CC-3-2V1 | 10.00% | Δε [kHz, 20° C.]: | +17.6 |
| CC-3-2V | 5.00% | γ₁ [mPa · s, 20° C.]: | 93 |
| PGP-2-2V | 1.00% | $K_1$ [20° C.]: | 14.6 |
| CCP-3OCF₃ | 4.50% | $K_3$ [20° C.]: | 14.8 |
| PUQU-3-F | 4.00% | $V_0$ [V]: | 0.97 |

-continued

| | |
|---|---|
| APUQU-2-F | 6.00% |
| APUQU-3-F | 6.00% |
| PGUQU-3-F | 3.50% |
| PGUQU-4-F | 7.00% |
| DPGU-4-F | 6.50% |
| DGUQU-2-F | 3.50% |
| DGUQU-4-F | 7.50% |

Example M13

For the preparation of a PS-IPS mixture, 0.25% of compound RM-17

RM-17

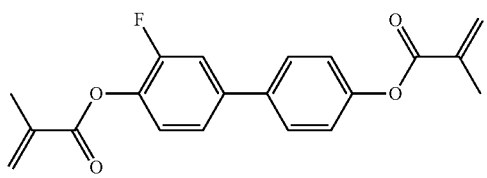

is added to mixture M12.

Example M14

For the preparation of a PS-FFS mixture, 0.2% of compound RM-61

RM-61

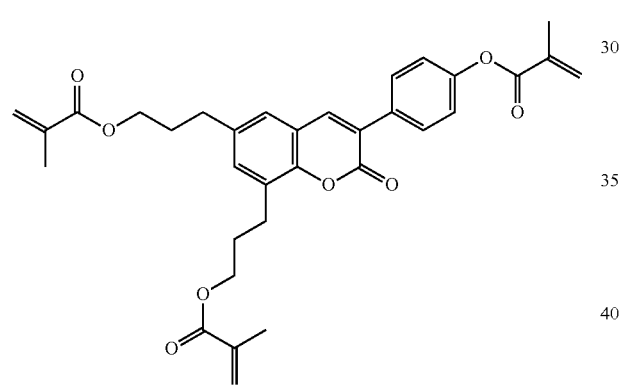

is added to mixture M12.

Example M15

For the preparation of a PS-FFS mixture, 0.3% of compound RM-80

RM-80

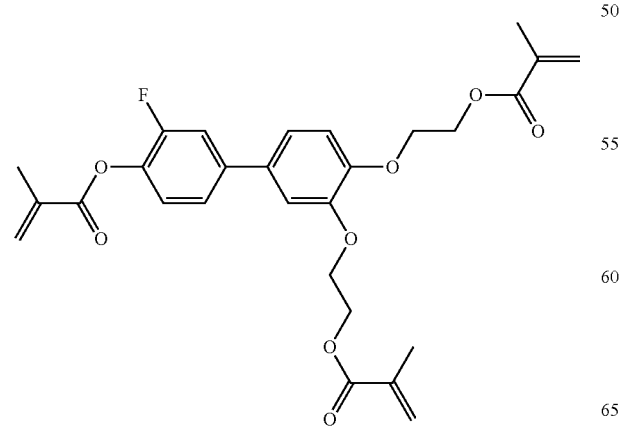

is added to mixture M12.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German Application No. DE 10 2013 013 500.1, filed Aug. 16, 2013 are incorporated by reference herein.

The invention claimed is:

1. Liquid-crystalline medium, comprising:
one or more compounds of the formula I,

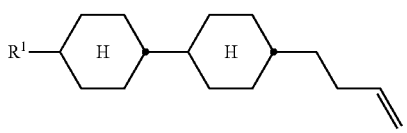

I in which $R^1$ denotes an alkyl or alkoxy radical having 1 to 15 C atoms, where, in addition, one or more $CH_2$ groups in these radicals are optionally replaced, independently of one another, by —C≡C—, —$CF_2$O—, —CH=CH—,

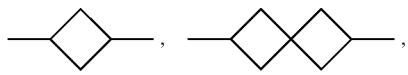

—O—, —CO—O— or —O—CO— in such a way that O atoms are not linked directly to one another, and in which, in addition, one or more H atoms are optionally replaced by halogen, one or more compounds selected from the group consisting of compounds of the following formulae,

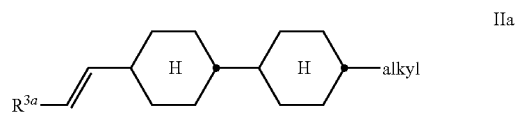

IIa

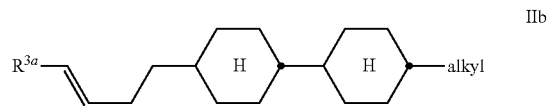

IIb

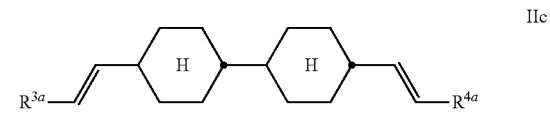

IIc

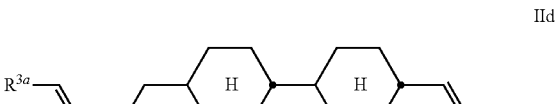

IId

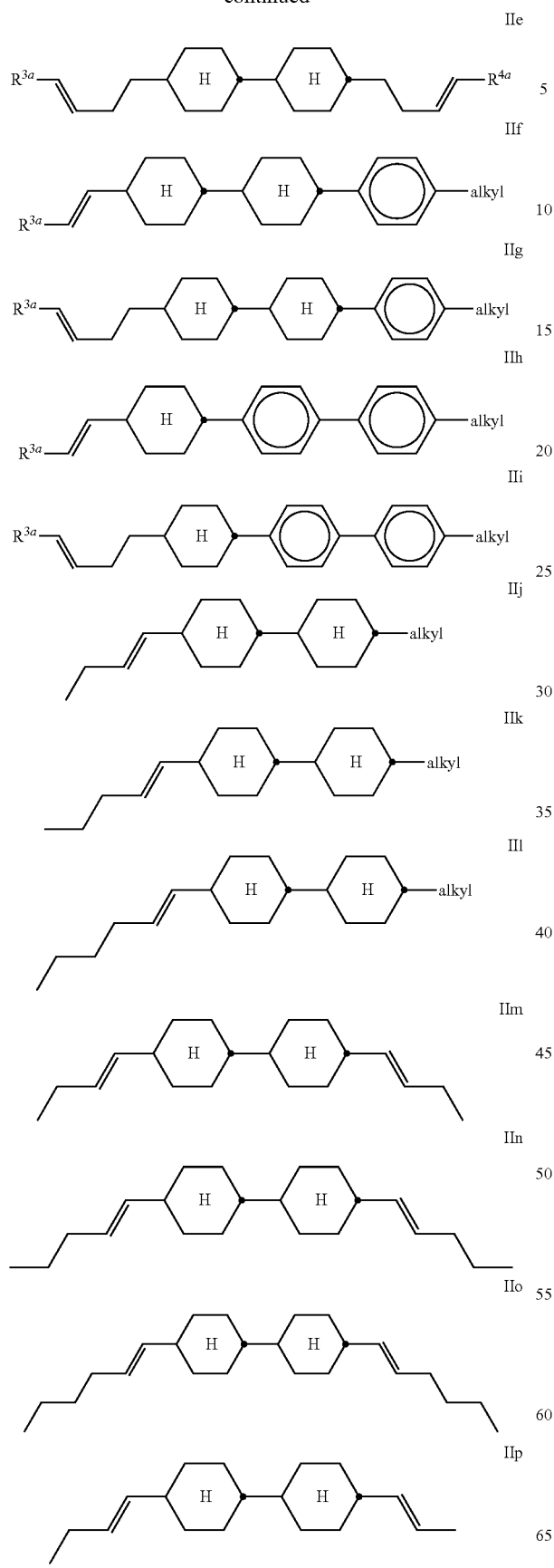

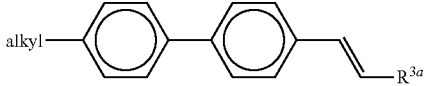

in which $R^{3a}$ and $R^{4a}$ each, independently of one another, denote H, $CH_3$, $C_2H_5$ or $C_3H_7$, provided that for formula IIb $R^{3a}$ is not hydrogen, and "alkyl" denotes a straight-chain alkyl group having 1 to 8 C atoms, and one or more compounds selected from the group consisting of compounds of the formulae X and XI,

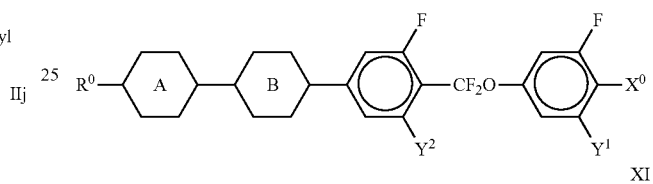

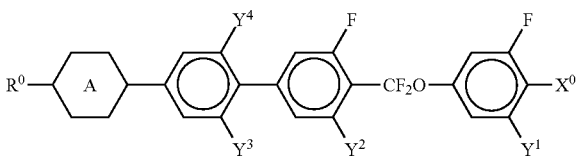

in which $R^0$ denotes an alkyl or alkoxy radical having 1 to 15 C atoms, where, in addition, one or more $CH_2$ groups in these radicals are optionally replaced, independently of one another, —C≡C—, —$CF_2$O—, —CH=CH—,

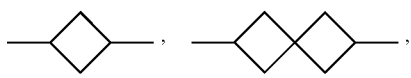

—O—, —CO—O— or —O—CO— in such a way that O atoms are not linked directly to one another, and in which, in addition, one or more H atoms are optionally replaced by halogen, $X^0$ denotes F, Cl, a mono- or polyfluorinated alkyl or alkoxy radical having 1 to 6 C atoms, or a mono- or polyfluorinated alkenyl or alkenyloxy radical having 2 to 6 C atoms, $Y_{1-4}$ each, independently of one another, denote H or F, and

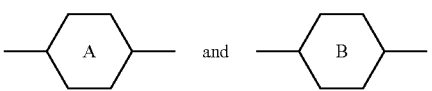

each, independently of one another, denote

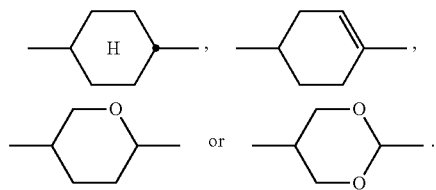

wherein the liquid-crystalline medium has a positive dielectric anisotropy.

2. Liquid-crystalline medium according to claim 1, wherein $R^1$ in formula I denotes a straight-chain alkyl radical, in which, in addition, one or more $CH_2$ groups may be replaced by —CH═CH—.

3. Liquid-crystalline medium according to claim 1, which comprises at least one compound of formula I which is from the group of the compounds of the formulae I-1 to I-5

I-1
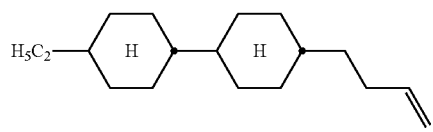

I-2
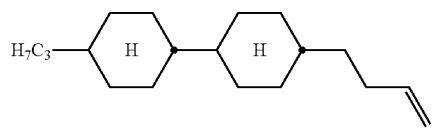

I-3
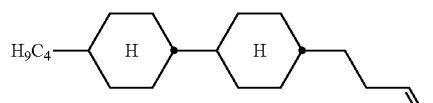

I-4
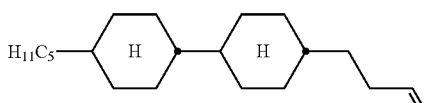

I-5
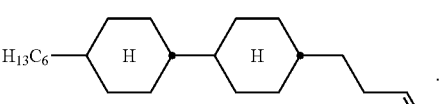

4. Liquid-crystalline medium according to claim 1, which additionally comprises one or more compounds selected from the compounds of the formulae IV to VIII, IV
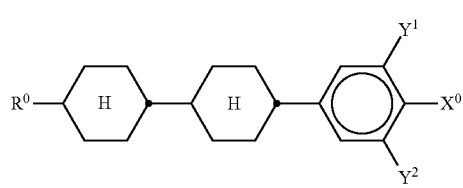

V
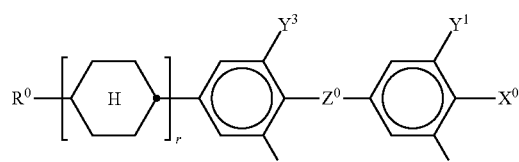

VI
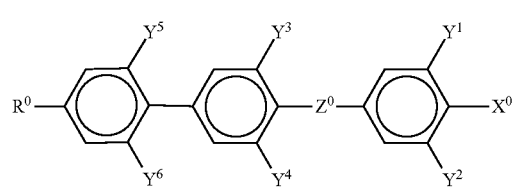

VII
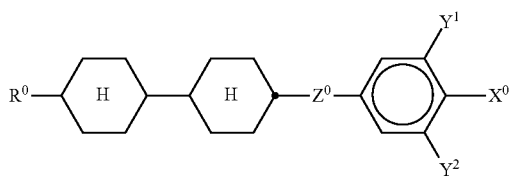

VIII
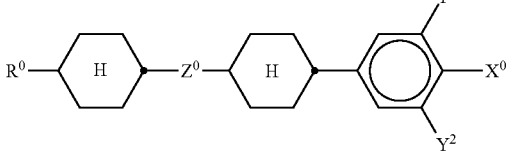

in which $R^0$ denotes an alkyl or alkoxy radical having 1 to 15 C atoms, where, in addition, one or more $CH_2$ groups in these radicals are optionally replaced, independently of one another, by —C≡C—, —$CF_2$O—, —CH═CH—,

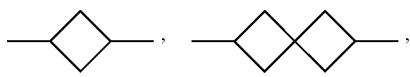

—O—, —CO—O— or —O—CO— in such a way that O atoms are not linked directly to one another, and in which, in addition, one or more H atoms are optionally replaced by halogen, $X^0$ denotes F, Cl, a mono- or polyfluorinated alkyl or alkoxy radical having 1 to 6 C atoms, a mono- or polyfluorinated alkenyl or alkenyloxy radical having 2 to 6 C atoms, $Y^{1-6}$ each, independently of one another, denote H or F, $Z^0$ denotes —$C_2H_4$—, —$(CH_2)_4$—, —CH═CH—, —CF═CF—, —$C_2F_4$—, —$CH_2CF_2$—, —$CF_2CH_2$—, —$CH_2$O—, —O$CH_2$—, —COO—, —$CF_2$O— or —O$CF_2$—, and in the formulae V and VI may also denote a single bond, and r denotes 0 or 1.

5. Liquid-crystalline medium according to claim 1, which additionally comprises one or more compounds selected from the compounds of the formulae Va to Vj,

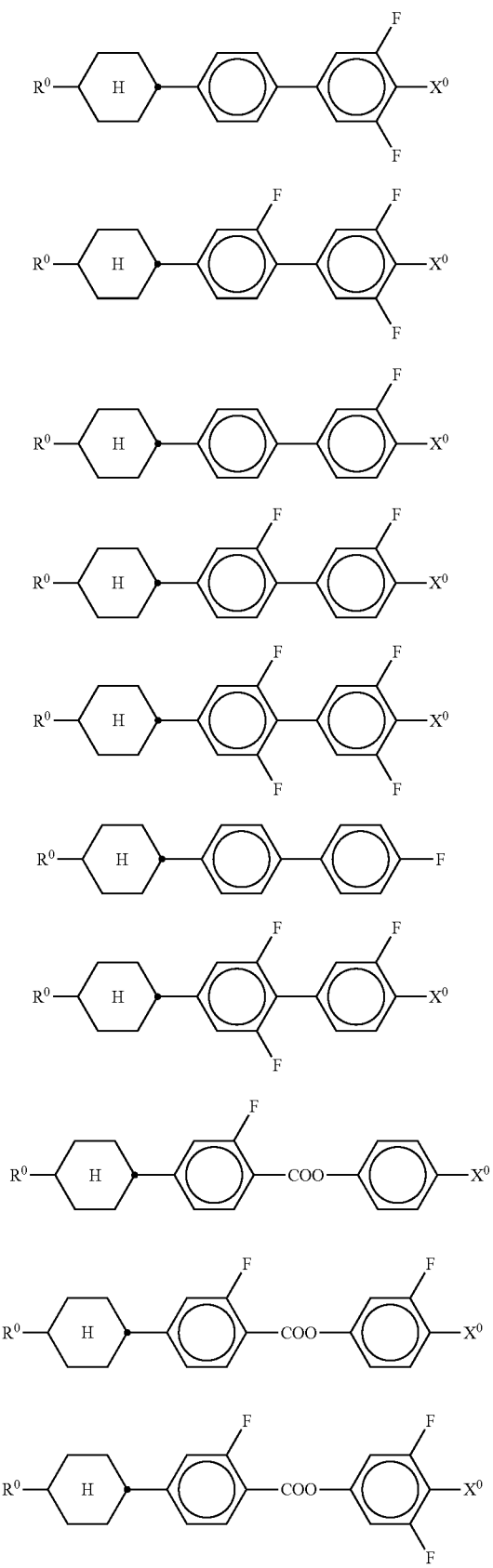

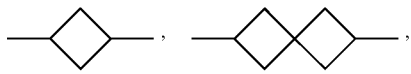

in which
R⁰ denotes an alkyl or alkoxy radical having 1 to 15 C atoms, where, in addition, one or more CH₂ groups in these radicals are optionally replaced, independently of one another, by —C≡C—, —CF₂O—, —CH═CH—,

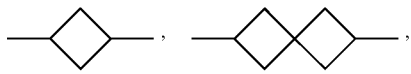

—O—, —CO—O— or —O—CO— in such a way that O atoms are not linked directly to one another, and in which, in addition, one or more H atoms are optionally replaced by halogen, X⁰ denotes F, Cl, a mono- or polyfluorinated alkyl or alkoxy radical having 1 to 6 C atoms, or a mono- or polyfluorinated alkenyl or alkenyloxy radical having 2 to 6 C atoms.

6. Liquid-crystalline medium according to claim 1, which additionally comprises one or more compounds selected from the compounds of the formulae VI-1a to VI-1d,

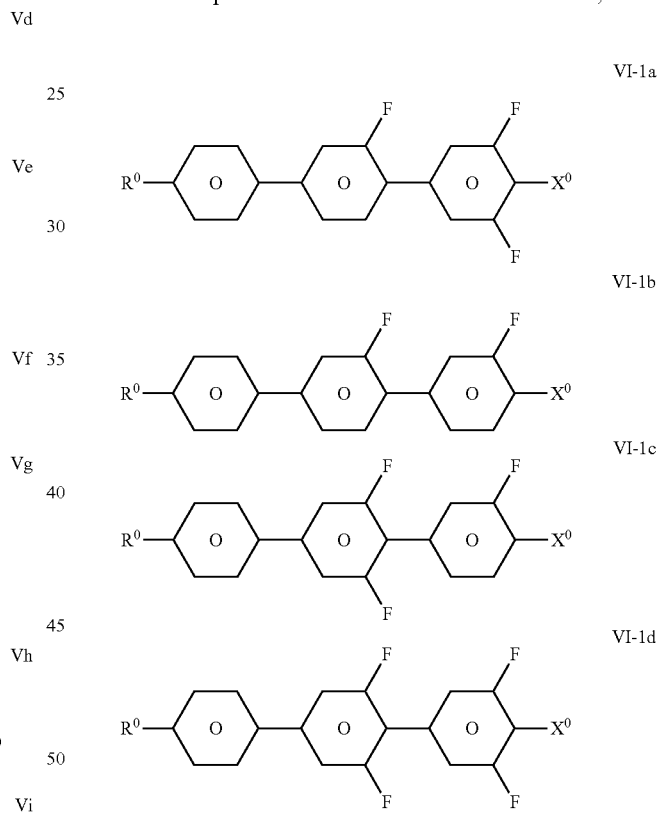

in which
R⁰ denotes an alkyl or alkoxy radical having 1 to 15 C atoms, where, in addition, one or more CH₂ groups in these radicals are optionally replaced, independently of one another, by —C≡C—, —CF₂O—, —CH═CH—,

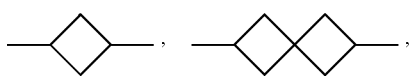

—O—, —CO—O— or —O—CO— in such a way that O atoms are not linked directly to one another, and in which, in addition, one or more H atoms are optionally replaced by halogen, X⁰ denotes F, Cl, a mono- or polyfluorinated alkyl or alkoxy radical having 1 to 6 C atoms, or a mono- or polyfluorinated alkenyl or alkenyloxy radical having 2 to 6 C atoms.

7. Liquid-crystalline medium according to claim 1, which additionally comprises one or more compounds selected from the compounds of the formulae VI-2a to VI-2f,

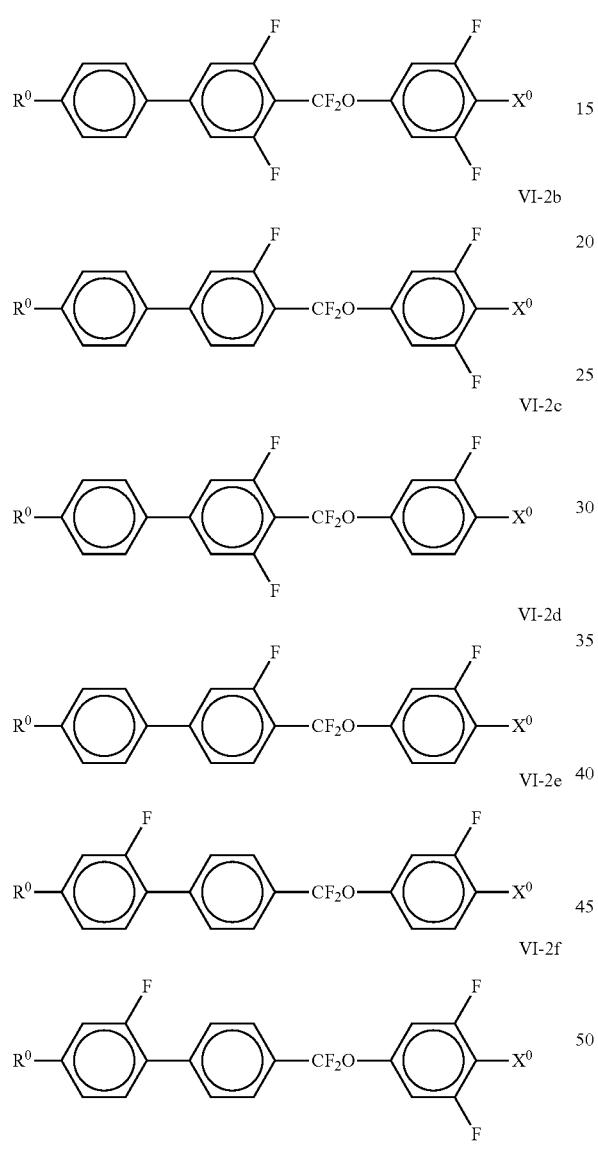

in which

R⁰ denotes an alkyl or alkoxy radical having 1 to 15 C atoms, where, in addition, one or more CH₂ groups in these radicals are optionally replaced, independently of one another, by —C≡C—, —CF₂O—, —CH═CH—,

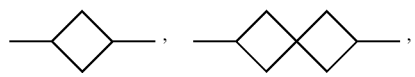

—O—, —CO—O— or —O—CO— in such a way that O atoms are not linked directly to one another, and in which, in addition, one or more H atoms are optionally replaced by halogen, X⁰ denotes F, Cl, a mono- or polyfluorinated alkyl or alkoxy radical having 1 to 6 C atoms, or a mono- or polyfluorinated alkenyl or alkenyloxy radical having 2 to 6 C atoms.

8. Liquid-crystalline medium according to claim 1, which additionally comprises one or more compounds selected from the compounds of the formula XII,

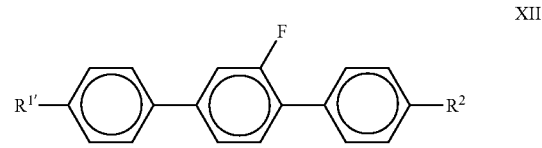

in which

R¹ and R² each, independently of one another, denote alkyl, alkenyl, alkoxy, oxaalkyl, fluoroalkyl or alkenyloxy, each having up to 9 C atoms, and Y¹ denotes H or F.

9. Liquid-crystalline medium according claim 1, which additionally comprises one or more compounds selected from the compounds of the formulae XIII to XVI,

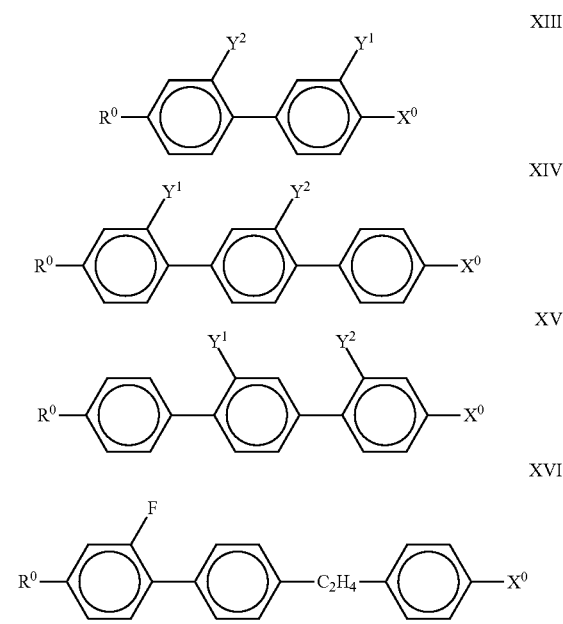

in which

R⁰ denotes an alkyl or alkoxy radical having 1 to 15 C atoms, where, in addition, one or more CH₂ groups in these radicals are optionally replaced, independently of one another, by —C≡C—, —CF₂O—, —CH═—,

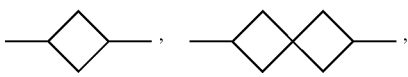

—O—, —CO—O— or —O—CO— in such a way that O atoms are not linked directly to one another, and in which, in addition, one or more H atoms are optionally replaced by halogen, X⁰ denotes F, Cl, a mono- or polyfluorinated alkyl or alkoxy radical having 1 to 6 C atoms, a mono- or polyfluorinated alkenyl or alkenyloxy radical having 2 to 6 C atoms, $Y^{1-2}$ each, independently of one another, denote H or F.

10. Liquid-crystalline medium according to claim 1: which additionally comprises a compound of the formula CC-3-V;

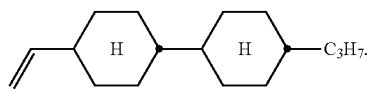

CC-3-V or which comprises a compound of IIb or IIc which is of one of the following formulae;

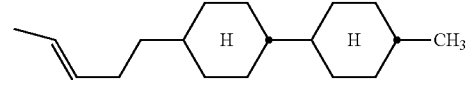

IIb-1

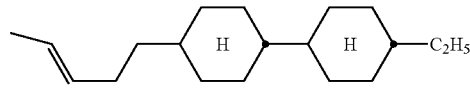

IIb-2

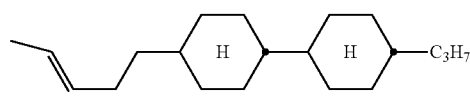

IIb-3

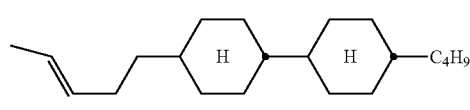

IIb-4

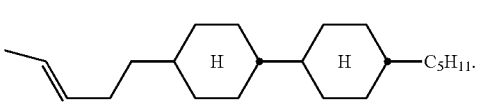

IIb-5

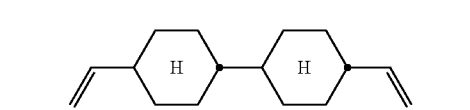

IIc-1

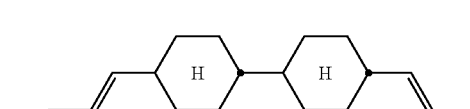

IIc-2

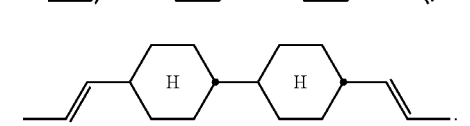

IIc-3

11. Liquid-crystalline medium according to claim 1, which additionally comprises one or more compounds selected from the compounds of the formulae D1, D2, D3, D4 and D5,

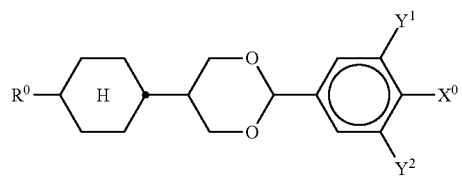

D1

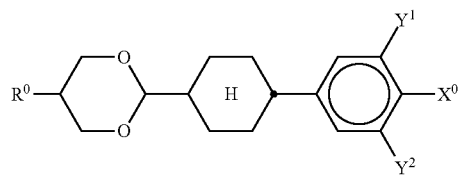

D2

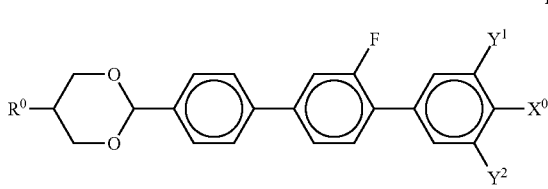

D3

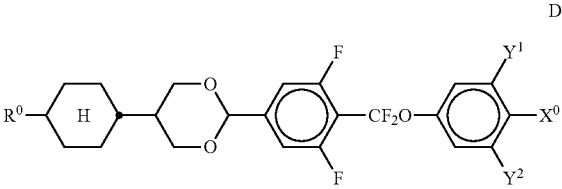

D4

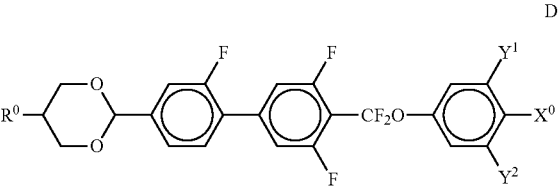

D5 in which

R⁰ denotes an alkyl or alkoxy radical having 1 to 15 C atoms, where, in addition, one or more CH₂ groups in these radicals are optionally replaced, independently of one another, by —C≡C—, —CF₂O—, —CH═CH—,

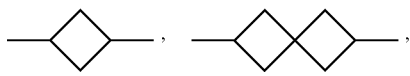

—O—, —CO—O— or —O—CO— in such a way that O atoms are not linked directly to one another, and in which, in addition, one or more H atoms are optionally replaced by halogen, X⁰ denotes F, Cl, a mono- or polyfluorinated alkyl or alkoxy radical having 1 to 6 C atoms, a mono- or polyfluorinated alkenyl or alkenyloxy radical having 2 to 6 C atoms, $Y^{1-2}$ each, independently of one another, denote H or F.

12. Liquid-crystalline medium according to claim 1, which comprises 1-30% by weight of compounds of the formula I.

13. Liquid-crystalline medium according to claim 1, which additionally comprises one or more UV stabilisers and/or antioxidants.

14. Liquid-crystalline medium according to claim 1, which additionally additionally comprises one or more polymerisable compounds.
15. Liquid-crystalline medium according to claim 14, wherein the polymerisable compound is selected from the following compounds RM-1 to RM-83:
RM-1
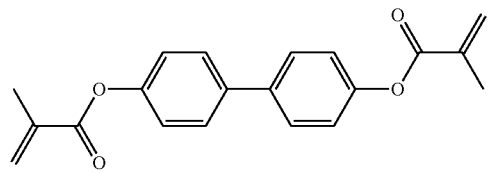
RM-2
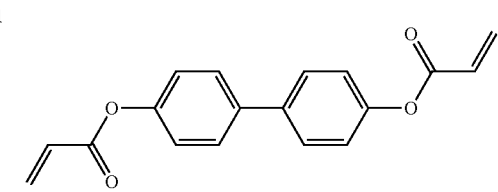
RM-3
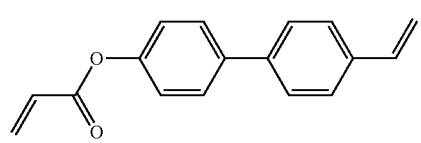 [SMILES: C=CC(=O)Oc1ccc(-c2ccc(C=C)cc2)cc1]
RM-4
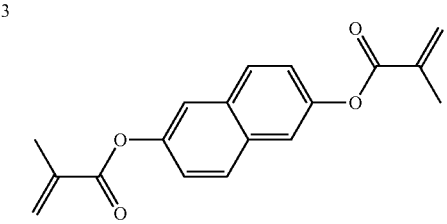
RM-5
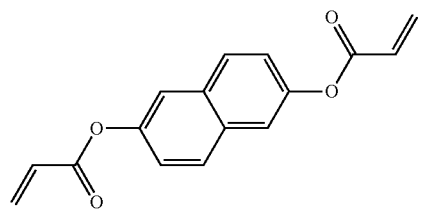 [SMILES: C=CC(=O)Oc1ccc2cc(OC(=O)C=C)ccc2c1]
RM-6
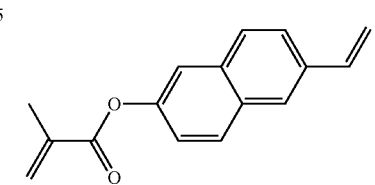
RM-7
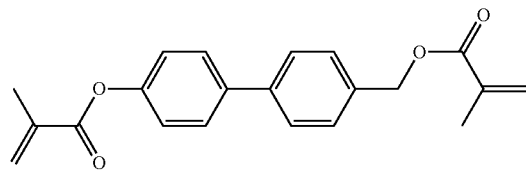 [SMILES: C=C(C)C(=O)OCc1ccc(-c2ccc(OC(=O)C(=C)C)cc2)cc1]
RM-8
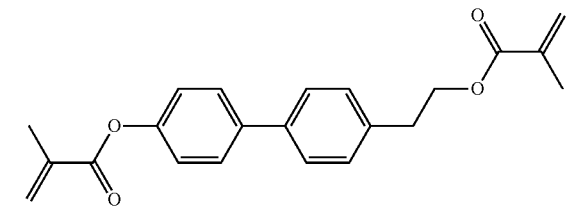 [SMILES: C=C(C)C(=O)OCCc1ccc(-c2ccc(OC(=O)C(=C)C)cc2)cc1]
RM-9
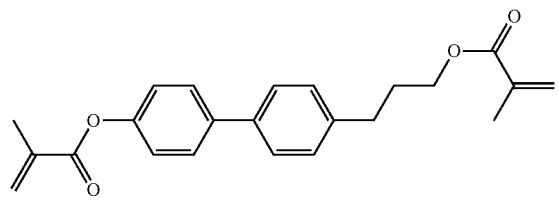 [SMILES: C=C(C)C(=O)OCCCc1ccc(-c2ccc(OC(=O)C(=C)C)cc2)cc1]
RM-10
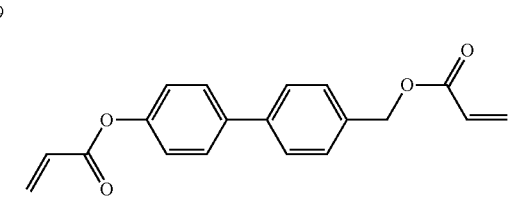
RM-11
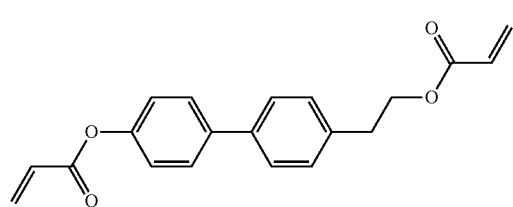 [SMILES: C=CC(=O)OCCc1ccc(-c2ccc(OC(=O)C=C)cc2)cc1]
RM-12
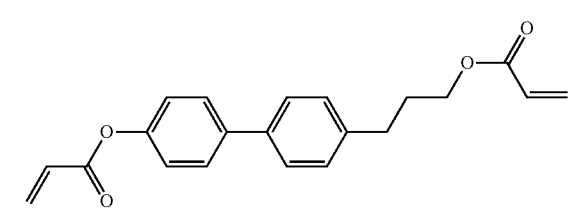 [SMILES: C=CC(=O)OCCCc1ccc(-c2ccc(OC(=O)C=C)cc2)cc1]
RM-13
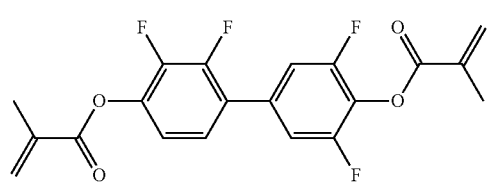 [SMILES: C=C(C)C(=O)Oc1ccc(-c2cc(F)c(OC(=O)C(=C)C)c(F)c2)c(F)c1F]
RM-14
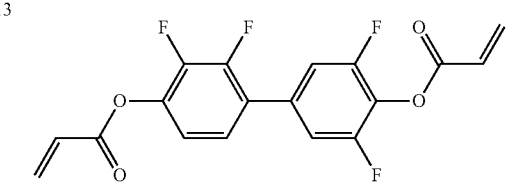

-continued
RM-15
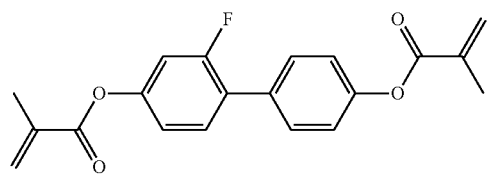 [SMILES: C=C(C)C(=O)Oc1ccc(-c2ccc(OC(=O)C(=C)C)cc2F)cc1]
RM-16
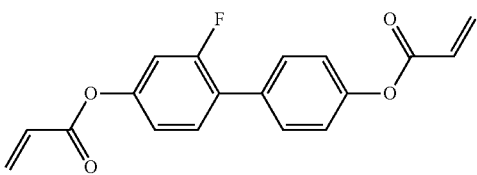
RM-17
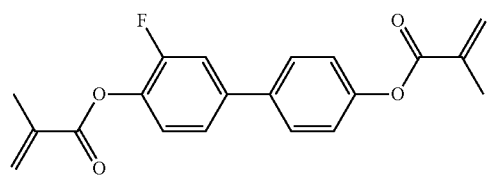
RM-18
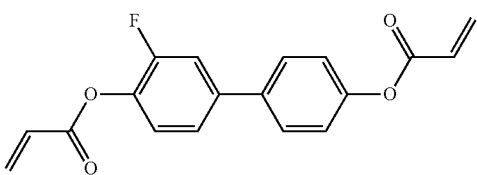
RM-19
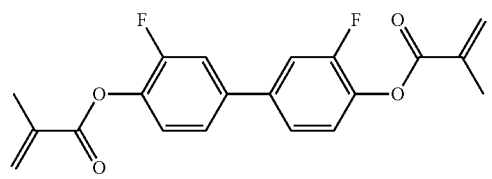
RM-20
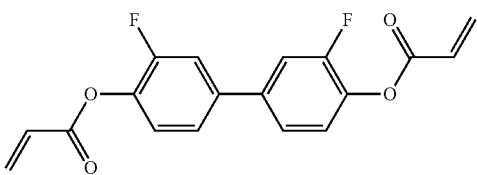 [SMILES: C=CC(=O)Oc1ccc(-c2ccc(OC(=O)C=C)c(F)c2)cc1F]
RM-21
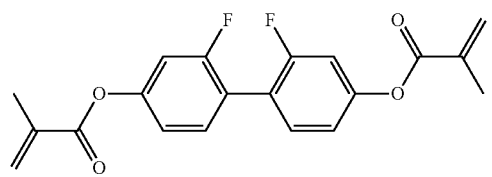
RM-22
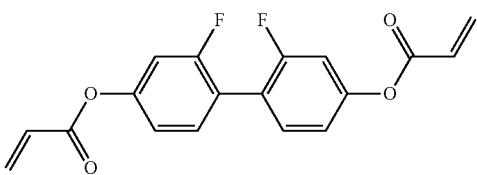
RM-23
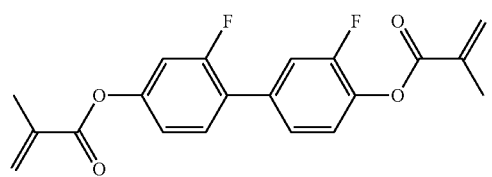
RM-24
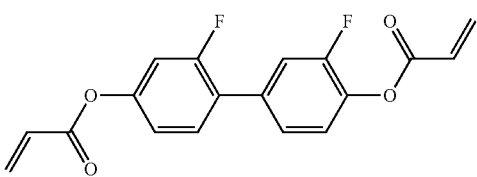
RM-25
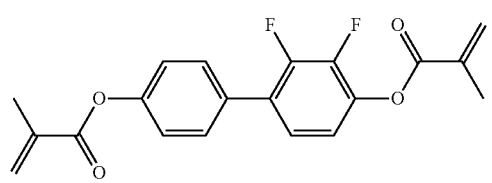 [SMILES: C=C(C)C(=O)Oc1ccc(-c2ccc(OC(=O)C(=C)C)c(F)c2F)cc1]
RM-26
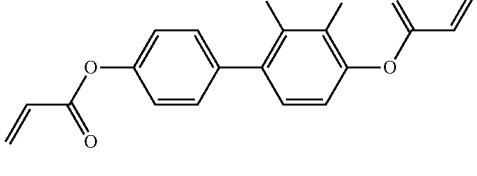
RM-27
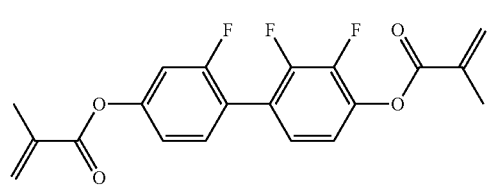
RM-28
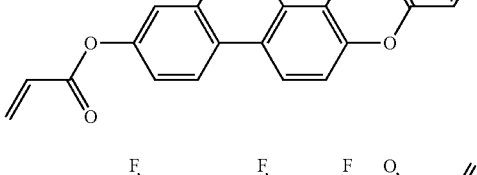
RM-29
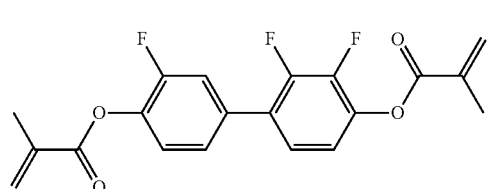
RM-30
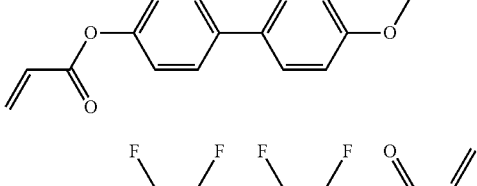
RM-31
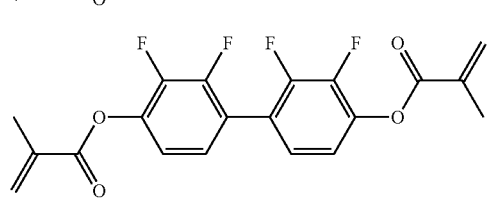
RM-32
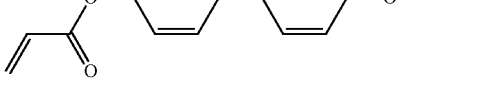

-continued
RM-33
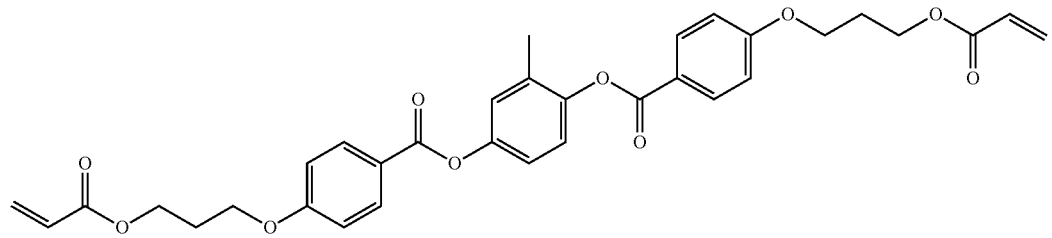
RM-34
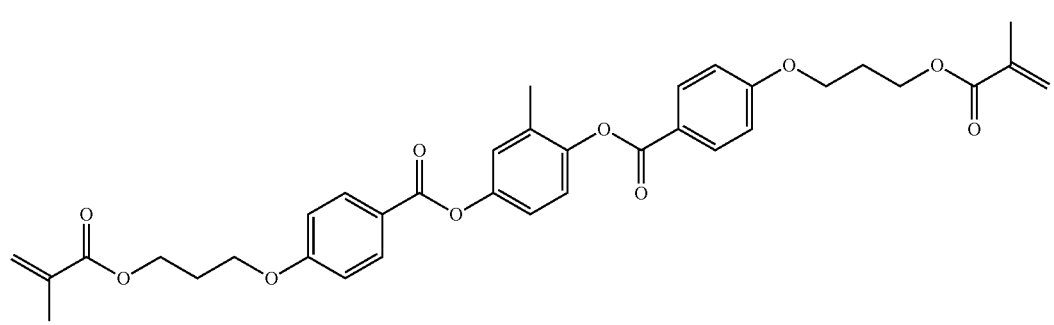 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-35 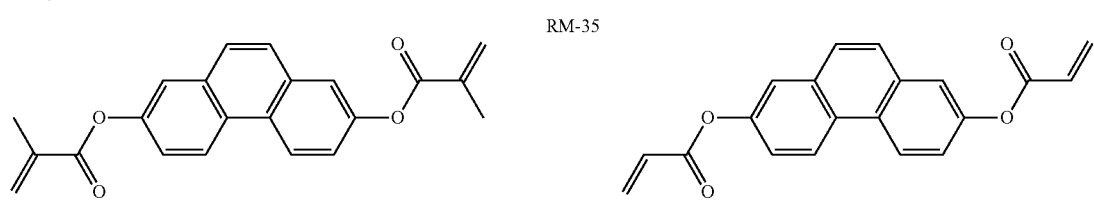   RM-36 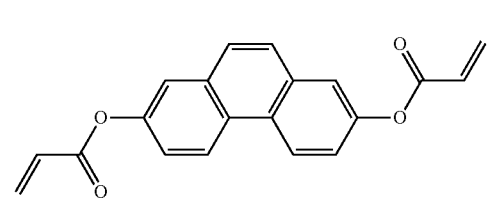 [SMILES: C=CC(=O)Oc1ccc2c(ccc3cc(OC(=O)C=C)ccc32)c1]
RM-37 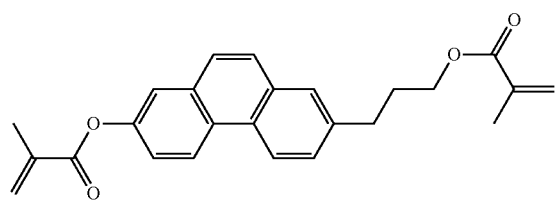 [SMILES: C=C(C)C(=O)OCCCc1ccc2c(ccc3cc(OC(=O)C(=C)C)ccc32)c1]   RM-38 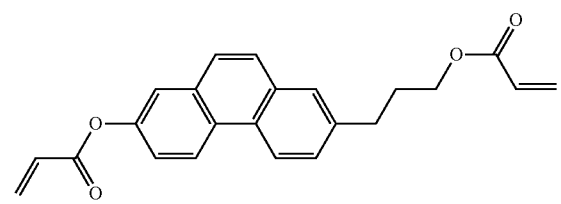 [SMILES: C=CC(=O)OCCCc1ccc2c(ccc3cc(OC(=O)C=C)ccc32)c1]
RM-39 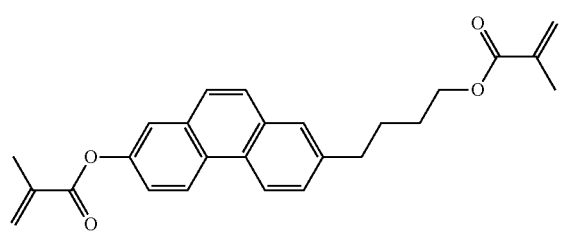 [SMILES: C=C(C)C(=O)OCCCCc1ccc2c(ccc3cc(OC(=O)C(=C)C)ccc32)c1]   RM-40 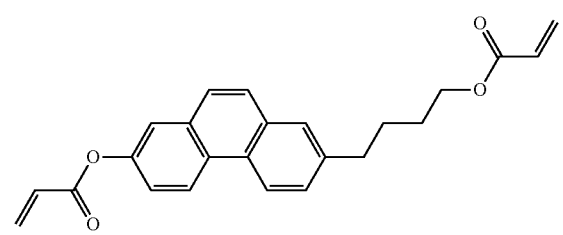 [SMILES: C=CC(=O)OCCCCc1ccc2c(ccc3cc(OC(=O)C=C)ccc32)c1]
RM-41 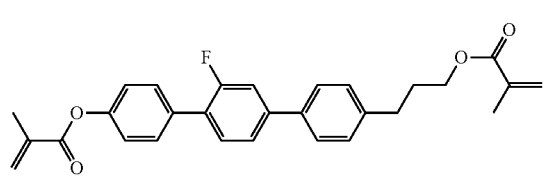 [SMILES: C=C(C)C(=O)OCCCc1ccc(-c2ccc(-c3ccc(OC(=O)C(=C)C)cc3)c(F)c2)cc1]   RM-42 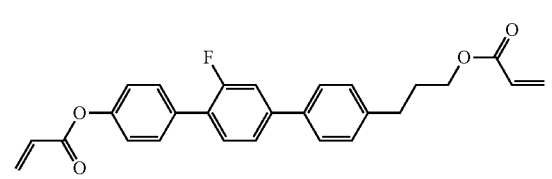 [SMILES: C=CC(=O)OCCCc1ccc(-c2ccc(-c3ccc(OC(=O)C=C)cc3)c(F)c2)cc1]
RM-43 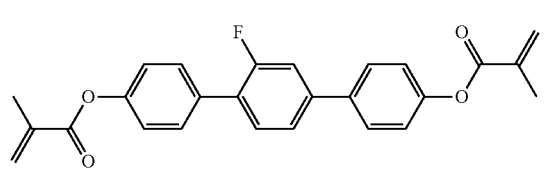 [SMILES: C=C(C)C(=O)Oc1ccc(-c2ccc(-c3ccc(OC(=O)C(=C)C)cc3)c(F)c2)cc1]   RM-44

-continued
RM-45
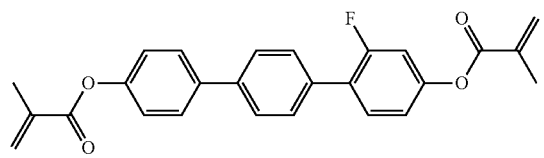
RM-46
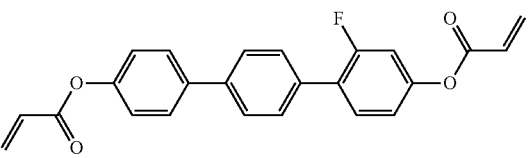
RM-47
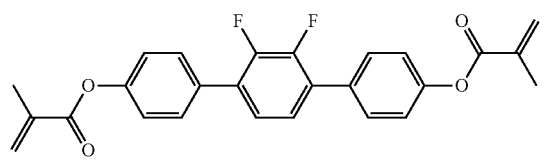
RM-48
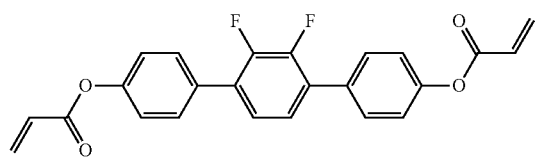
RM-49
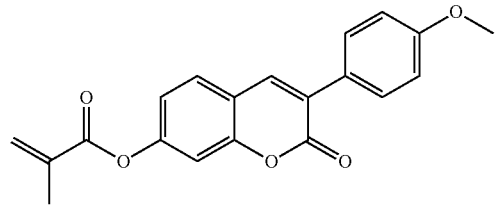 [SMILES: C=C(C)C(=O)Oc1ccc2cc(-c3ccc(OC)cc3)c(=O)oc2c1]
RM-50
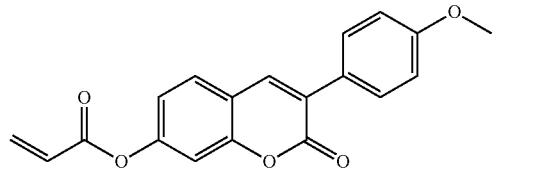 [SMILES: C=CC(=O)Oc1ccc2cc(-c3ccc(OC)cc3)c(=O)oc2c1]
RM-51
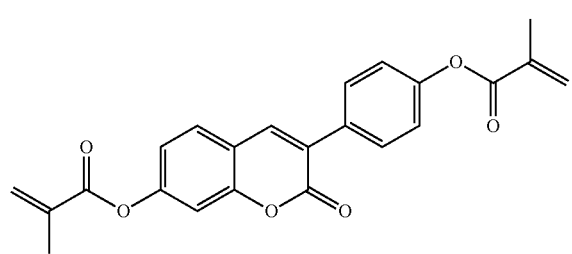 [SMILES: C=C(C)C(=O)Oc1ccc(-c2cc3ccc(OC(=O)C(=C)C)cc3oc2=O)cc1]
RM-52
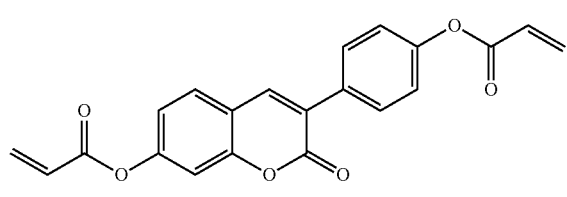 [SMILES: C=CC(=O)Oc1ccc(-c2cc3ccc(OC(=O)C=C)cc3oc2=O)cc1]
RM-53
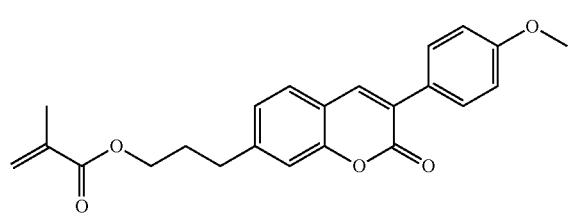 [SMILES: C=C(C)C(=O)OCCCc1ccc2cc(-c3ccc(OC)cc3)c(=O)oc2c1]
RM-54
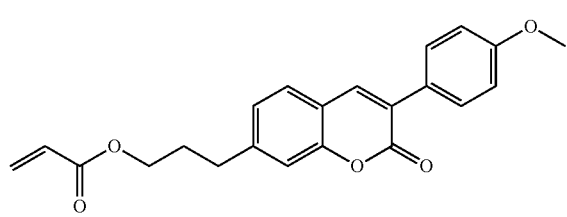 [SMILES: C=CC(=O)OCCCc1ccc2cc(-c3ccc(OC)cc3)c(=O)oc2c1]
RM-55
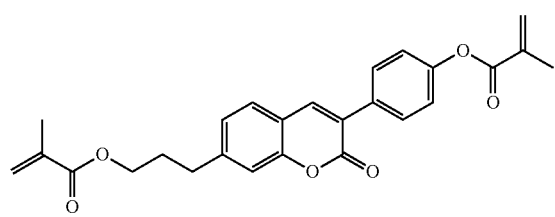 [SMILES: C=C(C)C(=O)OCCCc1ccc2cc(-c3ccc(OC(=O)C(=C)C)cc3)c(=O)oc2c1]
RM-56
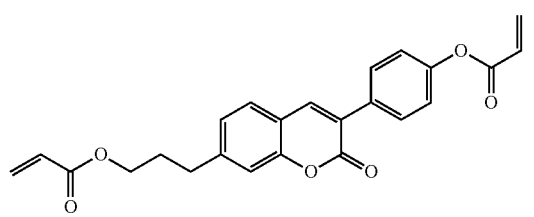 [SMILES: C=CC(=O)OCCCc1ccc2cc(-c3ccc(OC(=O)C=C)cc3)c(=O)oc2c1]
RM-57
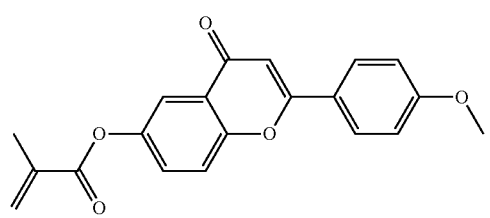
RM-58
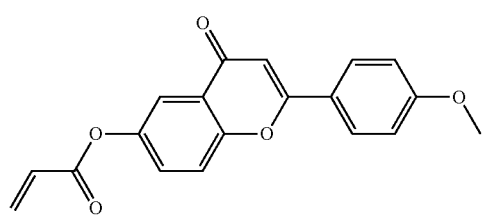 [SMILES: C=CC(=O)Oc1ccc2oc(-c3ccc(OC)cc3)cc(=O)c2c1]

-continued
RM-59
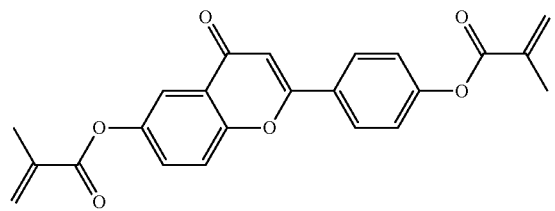 [SMILES: C=C(C)C(=O)Oc1ccc(-c2cc(=O)c3cc(OC(=O)C(=C)C)ccc3o2)cc1]
RM-60
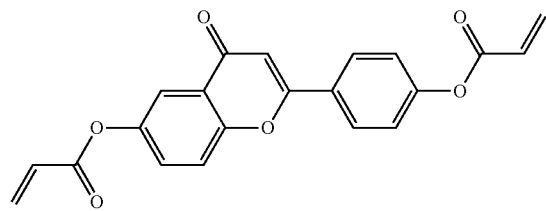 [SMILES: C=CC(=O)Oc1ccc(-c2cc(=O)c3cc(OC(=O)C=C)ccc3o2)cc1]
RM-61
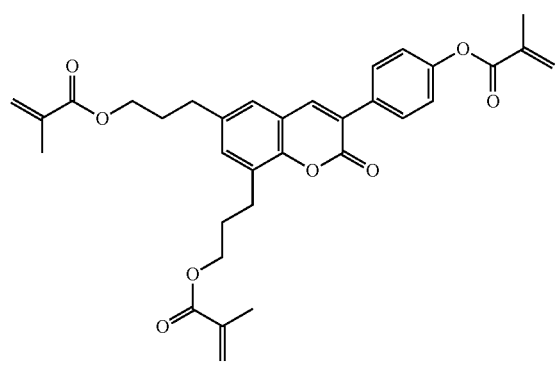 [SMILES: C=C(C)C(=O)OCCCc1cc(CCCOC(=O)C(=C)C)c2oc(=O)c(-c3ccc(OC(=O)C(=C)C)cc3)cc2c1]
RM-62
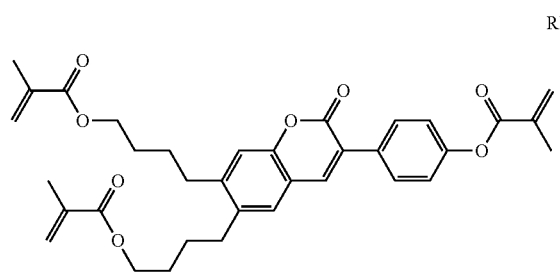
RM-63
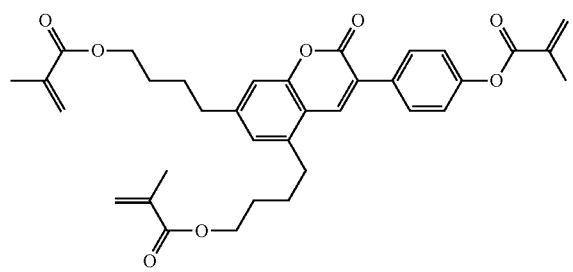 [SMILES: C=C(C)C(=O)OCCCCc1cc(CCCCOC(=O)C(=C)C)c2cc(-c3ccc(OC(=O)C(=C)C)cc3)c(=O)oc2c1]
RM-64
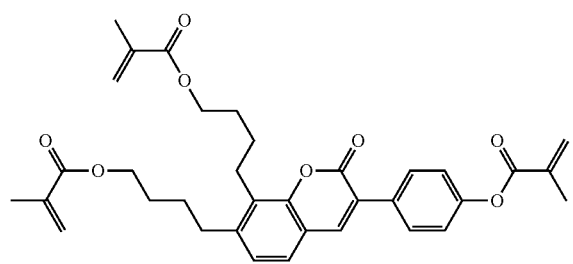 [SMILES: C=C(C)C(=O)OCCCCc1ccc2cc(-c3ccc(OC(=O)C(=C)C)cc3)c(=O)oc2c1CCCCOC(=O)C(=C)C]
RM-65
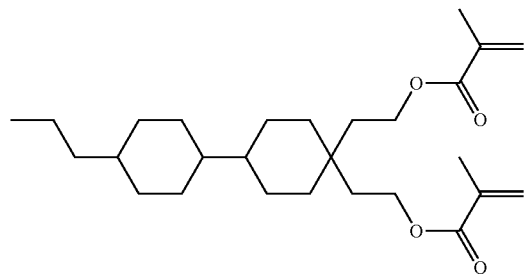 [SMILES: C=C(C)C(=O)OCCC1(CCOC(=O)C(=C)C)CCC(C2CCC(CCC)CC2)CC1]
RM-66
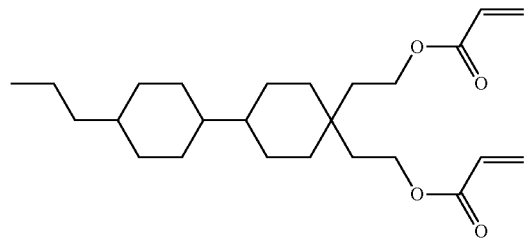 [SMILES: C=CC(=O)OCCC1(CCOC(=O)C=C)CCC(C2CCC(CCC)CC2)CC1]
RM-67
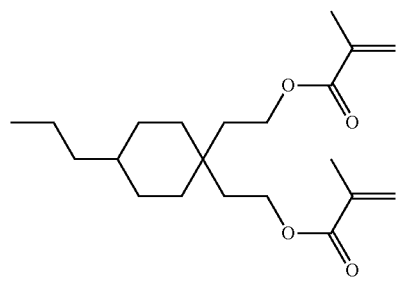
RM-68
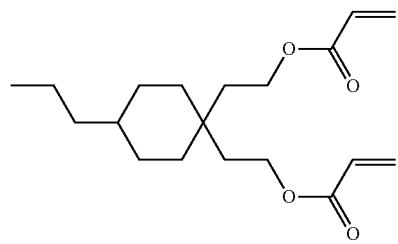 [SMILES: C=CC(=O)OCCC1(CCOC(=O)C=C)CCC(CCC)CC1]
RM-69
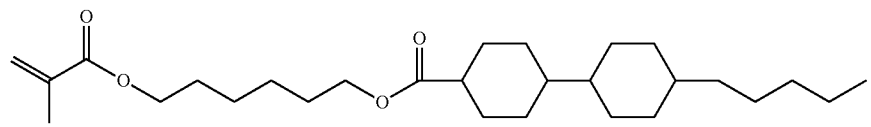 [SMILES: C=C(C)C(=O)OCCCCCCOC(=O)C1CCC(C2CCC(CCCCC)CC2)CC1]

-continued
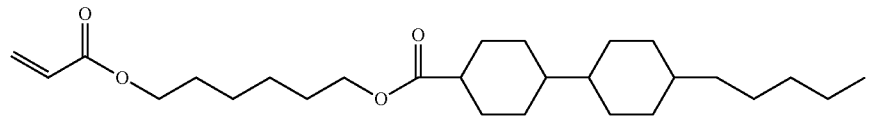
RM-70
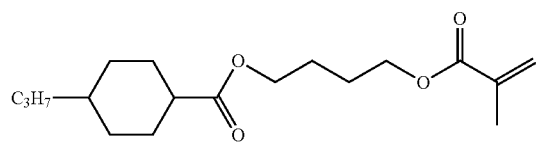
RM-71
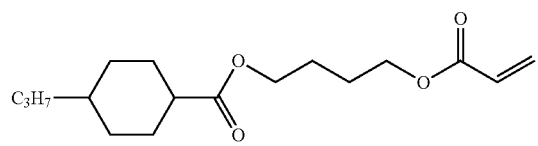
RM-72
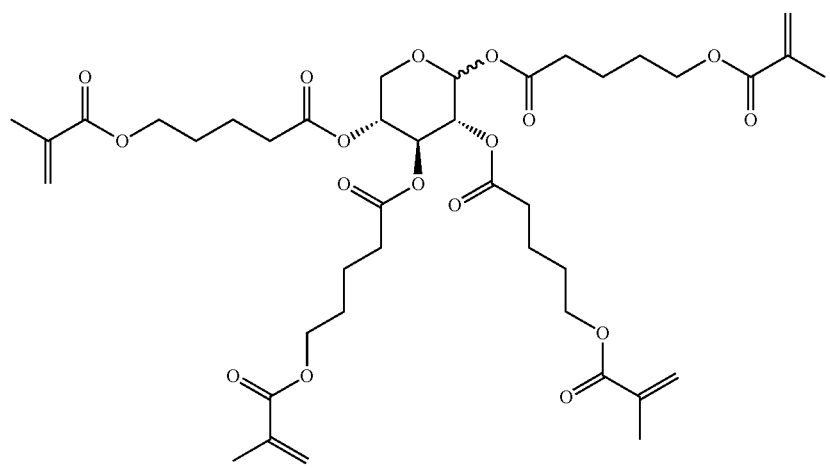 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-73
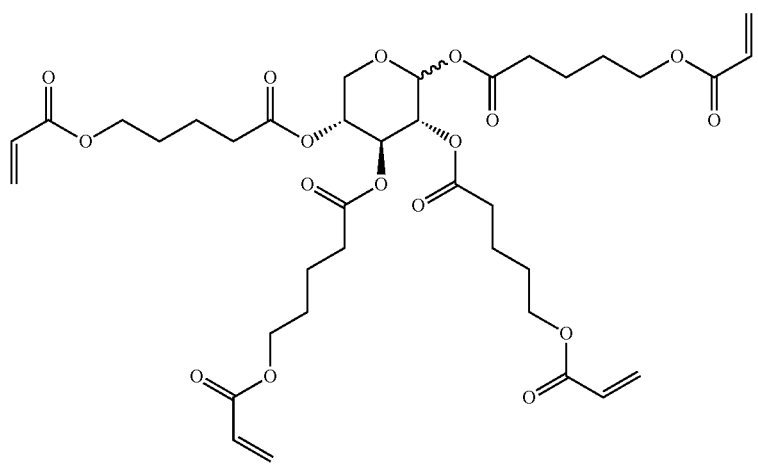 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-74

RM-75
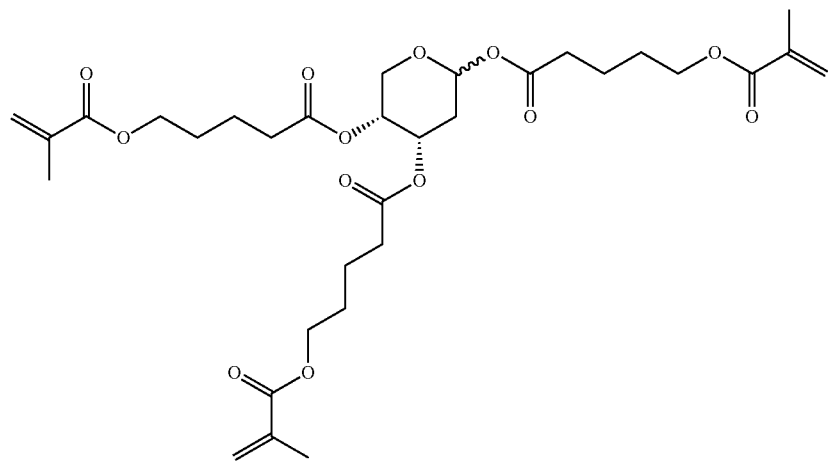 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-76
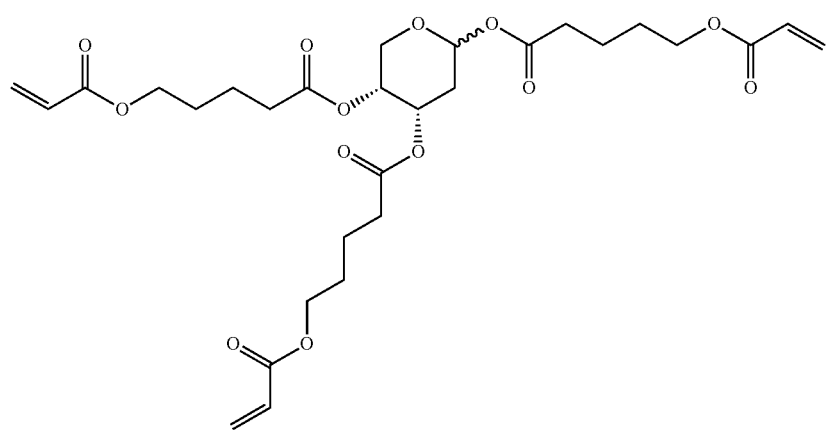 [SMILES: C=CC(=O)OCCCCC(=O)OC1C[C@H](OC(=O)CCCCOC(=O)C=C)[C@H](OC(=O)CCCCOC(=O)C=C)CO1]
RM-77
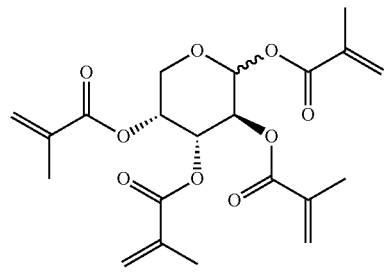 [SMILES: C=C(C)C(=O)OC1CC[C@@H](OC(=O)C(=C)C)[C@@H](OC(=O)C(=C)C)[C@@H]1OC(=O)C(=C)C]
RM-78
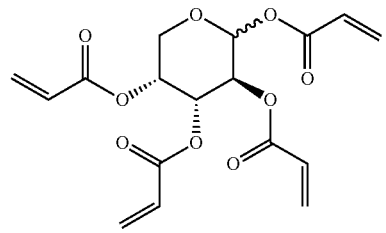 [SMILES: C=CC(=O)OC1CC[C@@H](OC(=O)C=C)[C@@H](OC(=O)C=C)[C@@H]1OC(=O)C=C]
RM-79
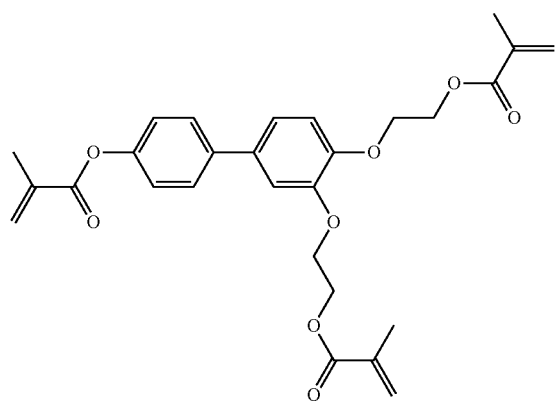 [SMILES: C=C(C)C(=O)OCCOc1ccc(-c2ccc(OC(=O)C(=C)C)cc2)cc1OCCOC(=O)C(=C)C]
RM-80
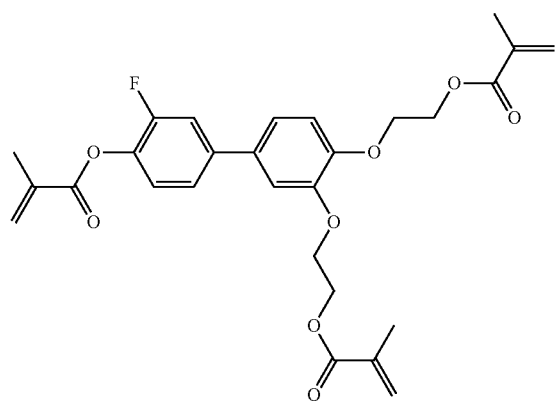 [SMILES: C=C(C)C(=O)OCCOc1ccc(-c2ccc(OC(=O)C(=C)C)c(F)c2)cc1OCCOC(=O)C(=C)C]

-continued

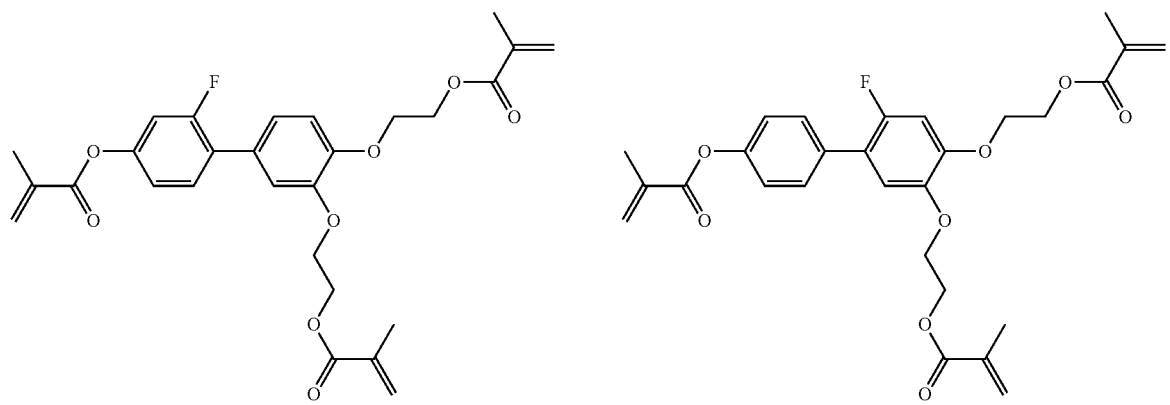

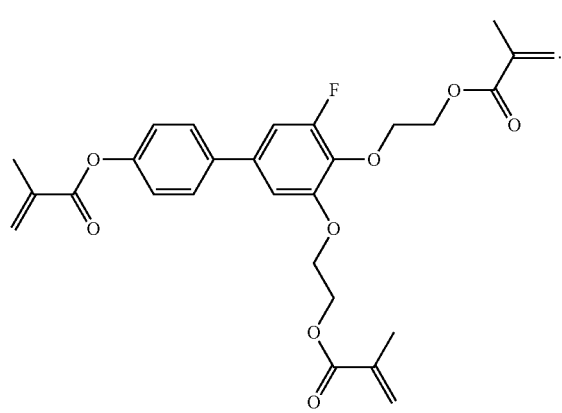

16. A process for the preparation of a liquid-crystalline medium according to claim 1, comprising mixing one or more compounds of the formula I with at least one further mesogenic compound and optionally with one or more additive(s) and/or one or more polymerisable compounds.

17. An electro-optical device comprising a liquid-crystalline medium according to claim 1.

18. An electro-optical device according to claim 17 which is a TN, STN, TN-TFT, OCB, IPS, PS-IPS, FFS or PS-FFS display, a shutter spectacle for 3D effects, an LC lens or a positive VA display.

19. Electro-optical liquid-crystal display containing a liquid-crystalline medium according to claim 1.

20. Liquid-crystalline medium according to claim 1, which additionally comprises one or more stabilizers selected from the following:

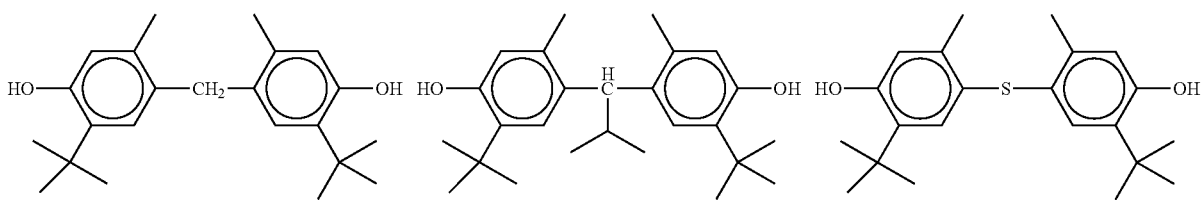

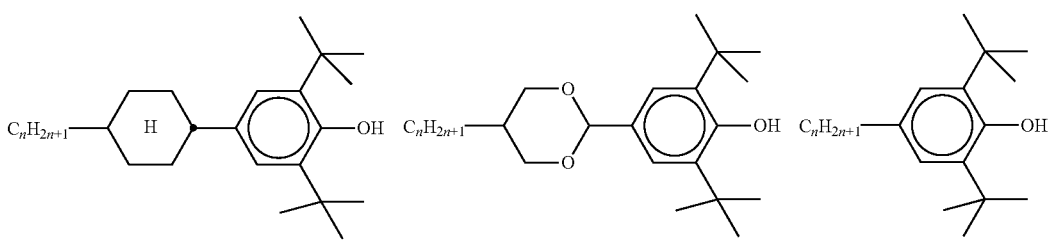

n = 1, 2, 3, 4, 5, 6 or 7   n = 1, 2, 3, 4, 5, 6 or 7   n = 1, 2, 3, 4, 5, 6 or 7

-continued
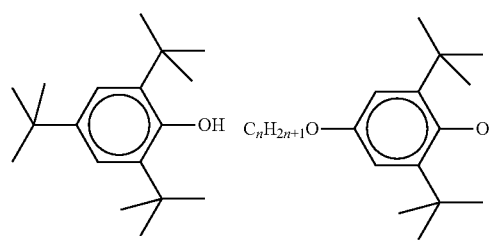
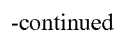
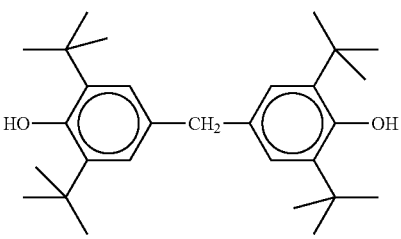
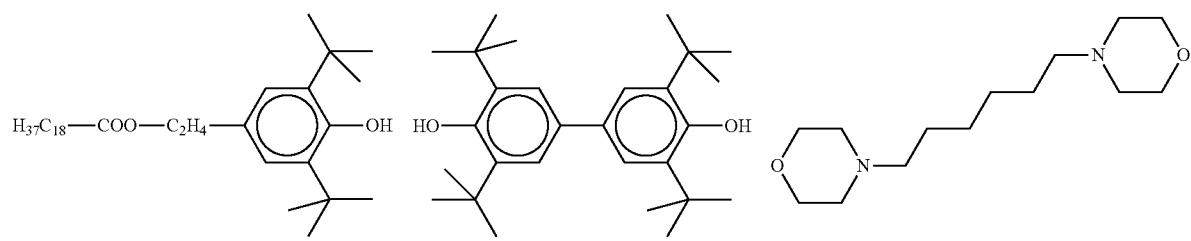
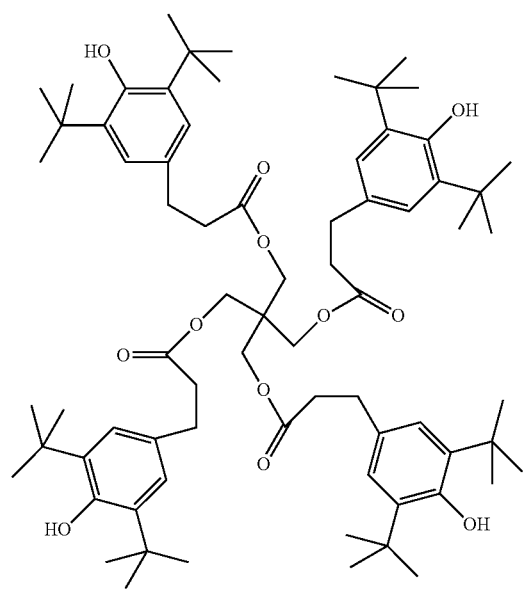
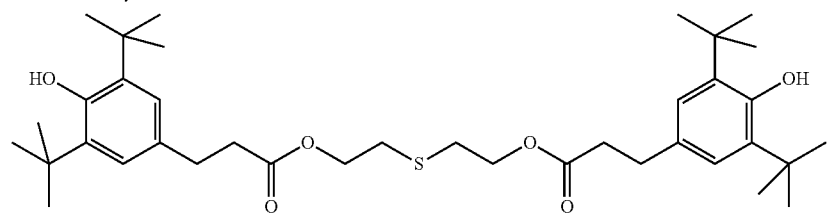
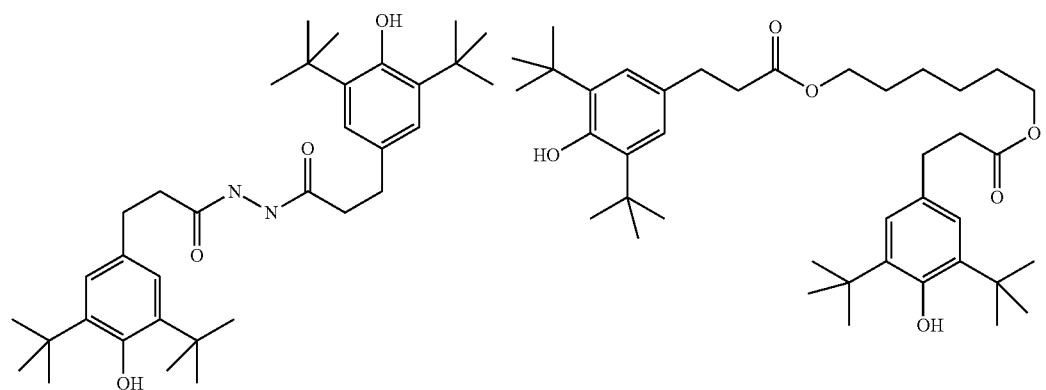

-continued
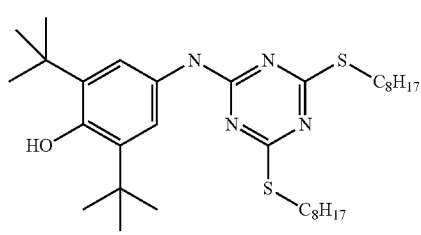
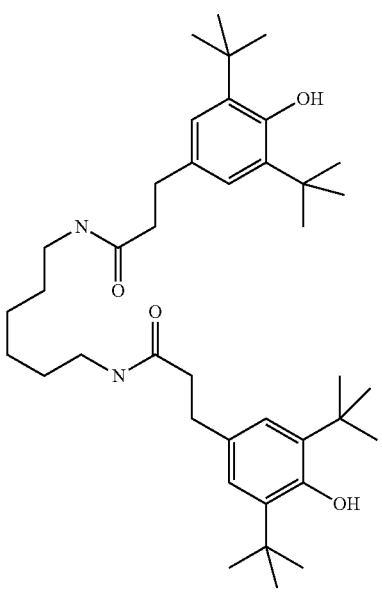
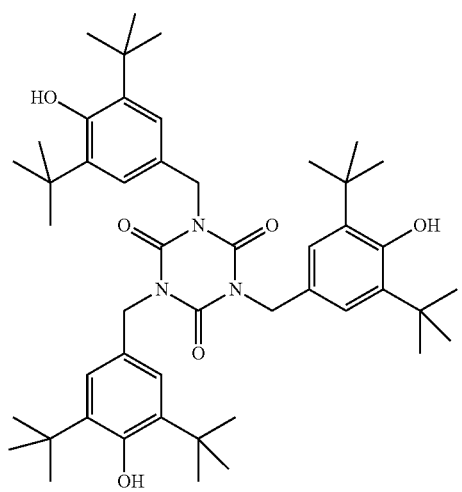
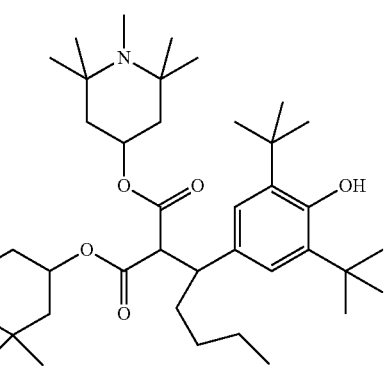
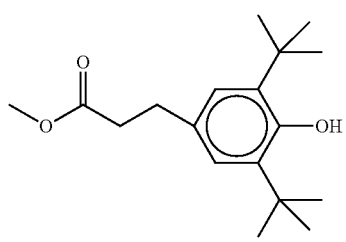
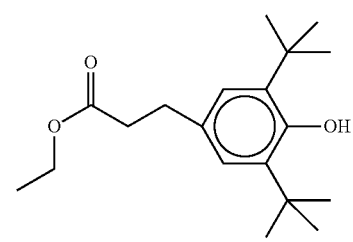
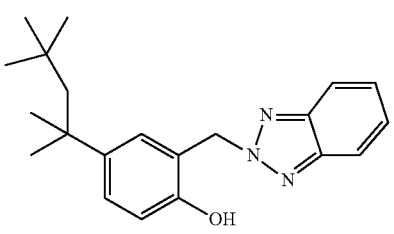
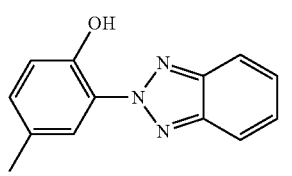
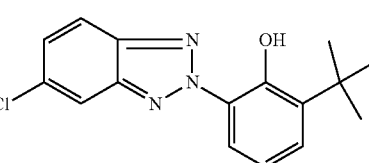
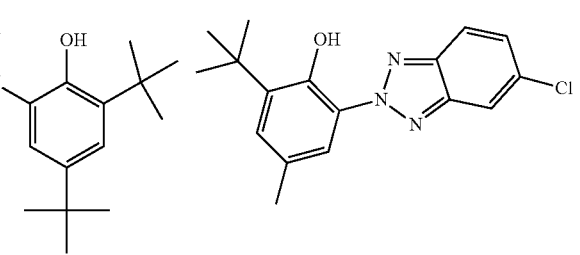

-continued
153
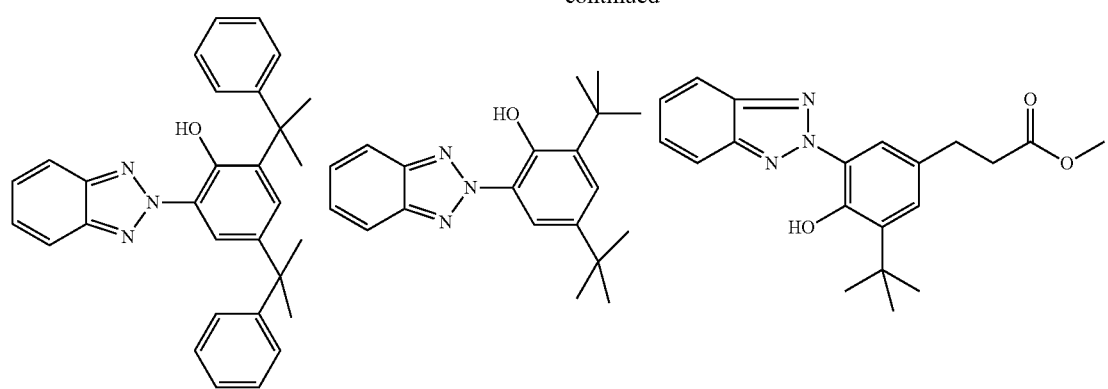
154
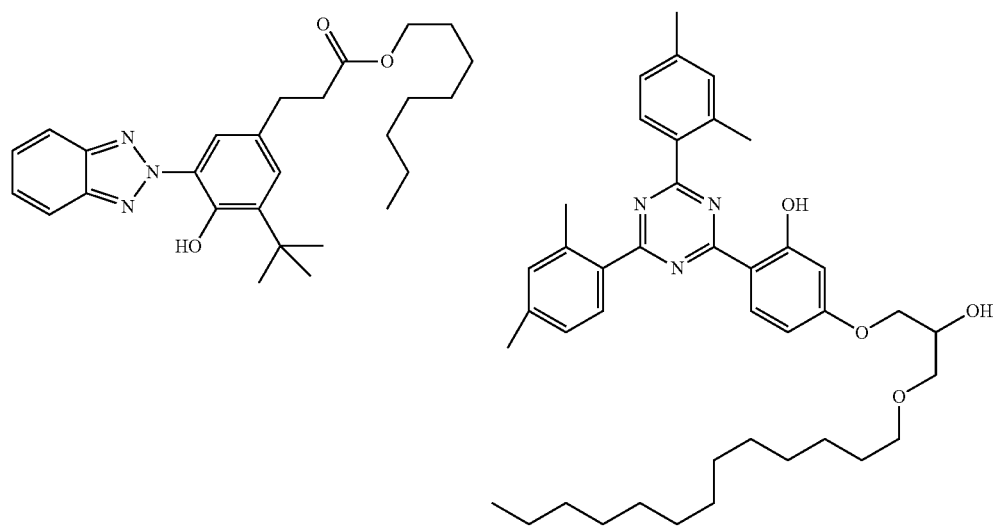
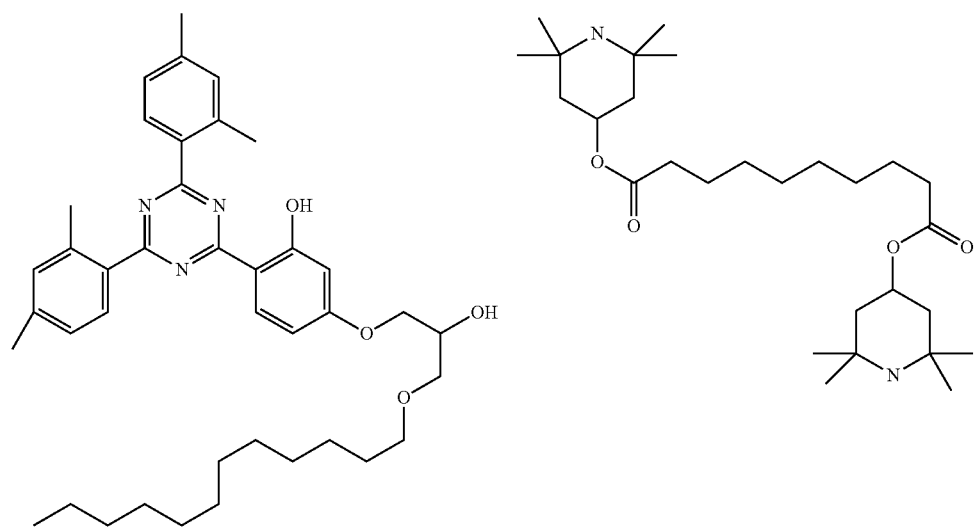

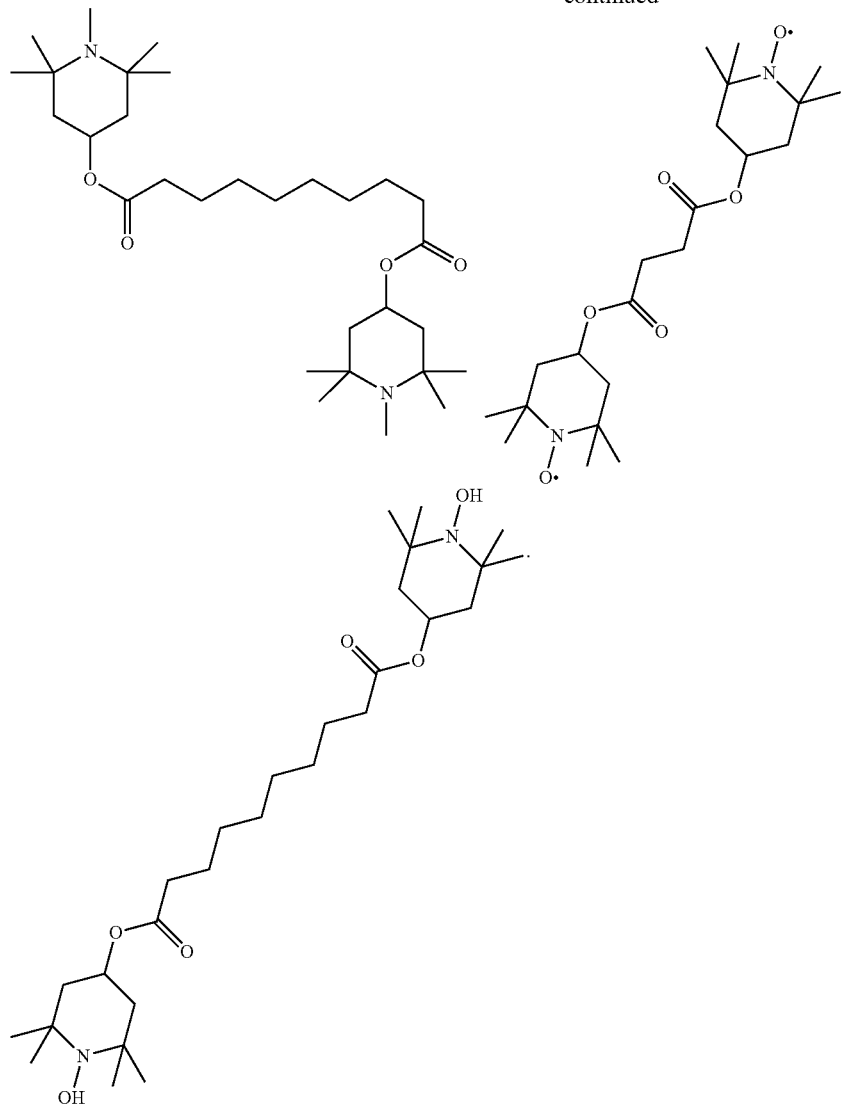

21. Liquid-crystalline medium according to claim 20, which comprises up to 10% by weight of the one or more stabilizers.

22. Liquid-crystalline medium according to claim 1, which additionally comprises a stabilizer of the following formula:

23. Liquid-crystalline medium according to claim 22, which comprises up to 10% by weight of the stabilizer.

24. Liquid-crystalline medium according to claim 1, which comprises at least one compound of formula I which is of the formulae I-2:

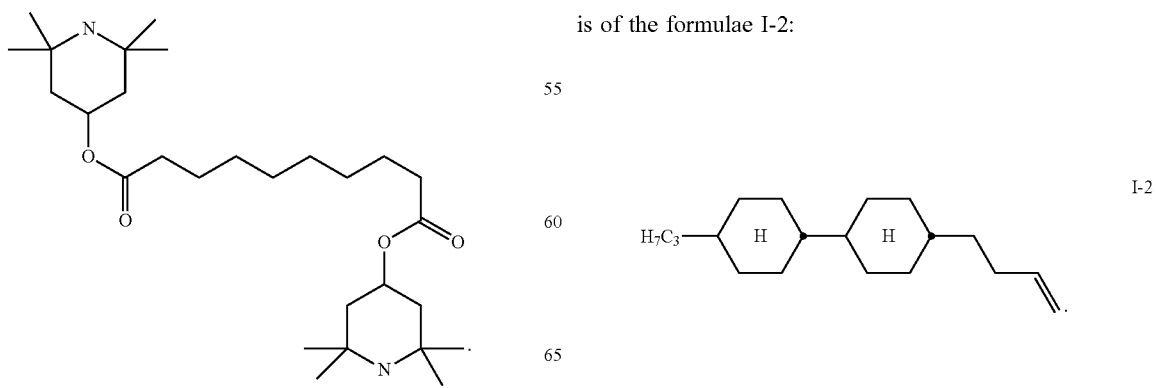

* * * * *